US012810834B2

(12) United States Patent
Goto et al.

(10) Patent No.: US 12,810,834 B2
(45) Date of Patent: Nov. 24, 2026

(54) SOUND ABSORPTION APPARATUS

(71) Applicant: KABUSHIKI KAISHA TOSHIBA, Tokyo (JP)

(72) Inventors: Tatsuhiko Goto, Kawasaki Kanagawa (JP); Osamu Nishimura, Kawasaki Kanagawa (JP); Akihiko Enamito, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 387 days.

(21) Appl. No.: 18/450,644

(22) Filed: Aug. 16, 2023

(65) Prior Publication Data

US 2024/0265904 A1 Aug. 8, 2024

(30) Foreign Application Priority Data

Feb. 2, 2023 (JP) ................................ 2023-014637

(51) Int. Cl.
*G10K 11/172* (2006.01)

(52) U.S. Cl.
CPC .................................. *G10K 11/172* (2013.01)

(58) Field of Classification Search
CPC ............................ G10K 11/172; G10K 11/162
USPC .................................................. 181/207, 208
See application file for complete search history.

(56) References Cited

U.S. PATENT DOCUMENTS 2,541,159 A * 2/1951 Geiger ...................... E04B 1/84 181/208
4,373,608 A * 2/1983 Holmes ..................... F16F 7/10 181/208
5,241,512 A * 8/1993 Argy .................... G10K 11/172 181/207
8,025,124 B2 * 9/2011 Levit ........................ F16F 7/108 181/284
8,172,036 B2 * 5/2012 Tanielian ............. G10K 11/162 428/116

(Continued)

FOREIGN PATENT DOCUMENTS

JP 2003-36084 A 2/2003
JP 2006-308679 A 11/2006

(Continued)

OTHER PUBLICATIONS

Japan Patent Office, Decision to Grant a Patent in JP App. No. 2023-014637 (Jan. 20, 2026).

*Primary Examiner* — Jeremy A Luks

(74) *Attorney, Agent, or Firm* — Finnegan, Henderson, Farabow, Garrett & Dunner, LLP

(57) ABSTRACT

According to one embodiment, a sound absorption apparatus includes a front plate, a back plate, a diaphragm, a supporting member, a second frame, and a third frame. The front plate has a sound hole. The back plate faces the front plate. The diaphragm is provided between the front plate and the back plate. The supporting member supports the diaphragm. The supporting member includes a first frame attached to the diaphragm, a first member located inside the first frame and attached to the diaphragm, and a connecting member connecting the first frame and the first member. The second frame forms a first space between the front plate and the diaphragm. The third frame forms a second space between the back plate and the diaphragm.

14 Claims, 71 Drawing Sheets

(56) References Cited

U.S. PATENT DOCUMENTS

| | | | | |
|---|---|---|---|---|
| 8,857,563 | B1 * | 10/2014 | Chang | G10K 11/172 181/286 |
| 8,869,933 | B1 * | 10/2014 | McKnight | E04B 1/8404 181/207 |
| 9,275,622 | B2 * | 3/2016 | Claeys | G10K 11/172 |
| 10,854,183 | B2 | 12/2020 | Yamazoe et al. | |
| 10,923,094 | B2 | 2/2021 | Hakuta et al. | |
| 10,923,095 | B2 | 2/2021 | Hakuta et al. | |
| 11,021,870 | B1 * | 6/2021 | McKnight | E04B 1/84 |
| 11,168,474 | B2 | 11/2021 | Koga et al. | |
| 12,211,476 | B2 * | 1/2025 | Ishii | F16F 15/06 |
| 12,300,207 | B2 * | 5/2025 | Li | G10K 11/36 |
| 2011/0240402 | A1 * | 10/2011 | Chou | F16F 15/04 181/207 |
| 2013/0087407 | A1 * | 4/2013 | McKnight | G10K 11/172 181/287 |
| 2014/0116802 | A1 * | 5/2014 | Ma | G10K 11/18 181/286 |
| 2019/0035373 | A1 * | 1/2019 | Chunren | G10K 11/162 |
| 2019/0333495 | A1 * | 10/2019 | Lee | G10K 11/22 |
| 2020/0143784 | A1 * | 5/2020 | Huang | G10K 11/04 |
| 2020/0342844 | A1 * | 10/2020 | Hakuta | B32B 3/26 |
| 2020/0349915 | A1 * | 11/2020 | Hakuta | G10K 11/168 |
| 2021/0039361 | A1 | 2/2021 | Koshitouge et al. | |
| 2023/0343317 | A1 | 10/2023 | Goto et al. | |
| 2025/0292756 | A1 * | 9/2025 | Goto | G10K 11/172 |

FOREIGN PATENT DOCUMENTS

| | | | | |
|---|---|---|---|---|
| JP | 2010-97145 | A | 4/2010 | |
| JP | 5056385 | B2 | 10/2012 | |
| JP | 5326486 | B2 | 10/2013 | |
| JP | 5872155 | B2 | 3/2016 | |
| JP | 6450003 | B2 | 1/2019 | |
| JP | 6510653 | B2 | 5/2019 | |
| JP | 6570641 | B2 | 9/2019 | |
| JP | WO2019/167572 | A1 | 10/2019 | |
| JP | 6610684 | B2 | 11/2019 | |
| JP | 6852835 | B2 | 3/2021 | |
| JP | 6932252 | B2 | 9/2021 | |
| JP | 2023-160087 | A | 11/2023 | |
| KR | 20210090893 | A | 7/2021 | |
| WO | WO-2023206644 | A1 * | 11/2023 | H04R 7/24 |

* cited by examiner

SOUND ABSORPTION APPARATUS

CROSS-REFERENCE TO RELATED APPLICATION

This application is based upon and claims the benefit of priority from Japanese Patent Application No. 2023-014637, filed Feb. 2, 2023, the entire contents of which are incorporated herein by reference.

FIELD

Embodiments described herein relate generally to a sound absorption apparatus.

BACKGROUND

A Helmholtz resonator is known as a sound absorption apparatus that reduces sound such as noise. The Helmholtz resonator is a container in which an internal space communicates with an external space via one sound hole. The Helmholtz resonator can generate resonance in the internal space by sound that has entered in the internal space through the sound hole, thereby attenuating vibration energy of the sound at a resonance frequency. The Helmholtz resonator has a one-degree-of-freedom system, and thus has unimodal sound absorption characteristics.

From the viewpoint of widening the band of the sound absorption characteristics, a Helmholtz resonator of a two-degree-of-freedom system has been proposed. The Helmholtz resonator of the two-degree-of-freedom system has a structure in which an elastic plate is added to the Helmholtz resonator of the one-degree-of-freedom system so as to separate the internal space into two spaces. The elastic plate has a one-degree-of-freedom system, the Helmholtz resonator has the one-degree-of-freedom system, and the Helmholtz resonator and the elastic plate are coupled to form the two-degree-of-freedom system. The Helmholtz resonator of the two-degree-of-freedom system has sound absorption characteristics with two separate sound absorption coefficient peaks.

In the Helmholtz resonator of the two-degree-of-freedom system, a valley characteristic (decrease in the sound absorption coefficient) occurs between the two sound absorption coefficient peaks. In order to suppress the valley characteristic, a method for attaching a damping material to the elastic plate has been proposed. However, trial and error is required to appropriately attach the damping material to the elastic plate.

DETAILED DESCRIPTION

Figure 1:
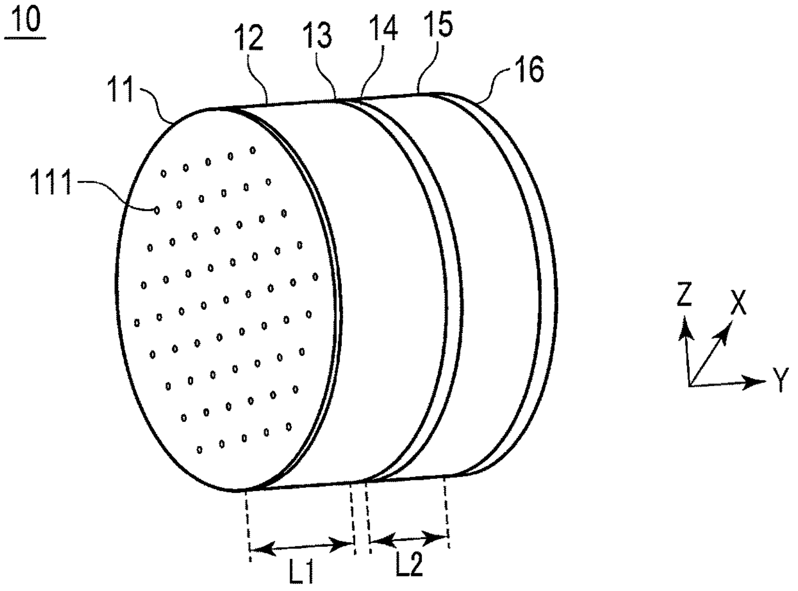
FIG. 1 is a perspective view showing a sound absorption apparatus according to an embodiment.

According to one embodiment, a sound absorption apparatus includes a front plate, a back plate, a diaphragm, a supporting member, a second frame, and a third frame. The front plate has a sound hole. The back plate faces the front plate. The diaphragm is provided between the front plate and the back plate. The supporting member supports the diaphragm. The supporting member includes a first frame attached to the diaphragm, a first member located inside the first frame and attached to the diaphragm, and a connecting member connecting the first frame and the first member. The second frame forms a first space between the front plate and the diaphragm. The third frame forms a second space between the back plate and the diaphragm.

Hereinafter, embodiments will be described with reference to the accompanying drawings. Like reference numerals denote like components throughout the drawings, and redundant description will be omitted.

First, a sound absorption apparatus according to a related art will be briefly described.

Figure 78:
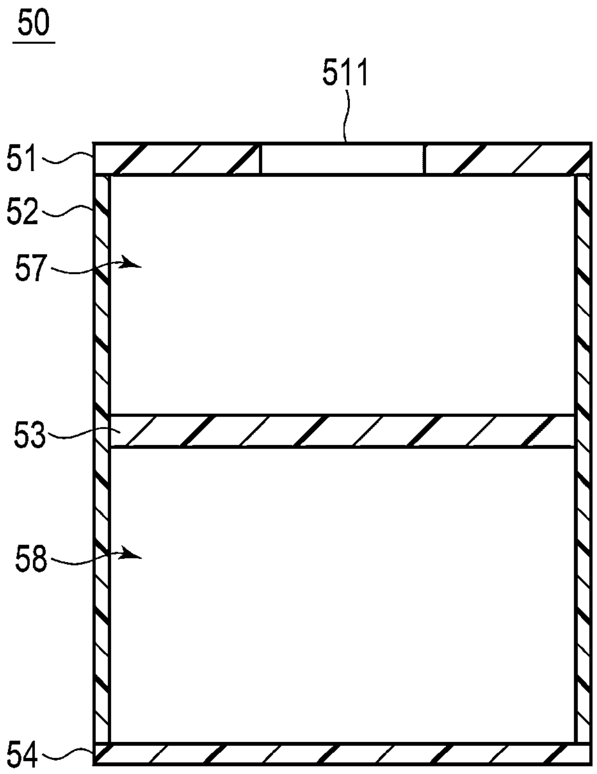
FIG. 78 is a cross-sectional view showing a sound absorption apparatus according to a related art.

FIG. 78 schematically shows the sound absorption apparatus 50 according to the related art. As shown in FIG. 78, the sound absorption apparatus 50 includes a front plate 51, a frame 52, an elastic plate 53, and a back plate 54. The front plate 51 has a sound hole 511. The back plate 54 faces the front plate 51. The front plate 51 is connected to the frame 52 so as to close a first opening end of the frame 52, and the back plate 54 is connected to the frame 52 so as to close a second opening end of the frame 52. The elastic plate 53 is provided between the front plate 51 and the back plate 54, and is supported by the frame 52 so as to vibrate. An internal space 57 is formed by the front plate 51, the frame 52, and the elastic plate 53, and an internal space 58 is formed by the back plate 54, the frame 52, and the elastic plate 53. The internal space 57 communicates with an external space via the sound hole 511. The sound hole 511 functions as a path through which sound generated in the external space enters the internal space 57 of the sound absorption apparatus 50.

The sound absorption apparatus 50 has a two-degree-of-freedom system. Specifically, a combination of the sound hole 511 and the internal space 57 forms a one-degree-of-freedom vibration system, and a combination of the back plate 54 and the internal space 58 forms a one-degree-of-freedom vibration system.

Figure 79:
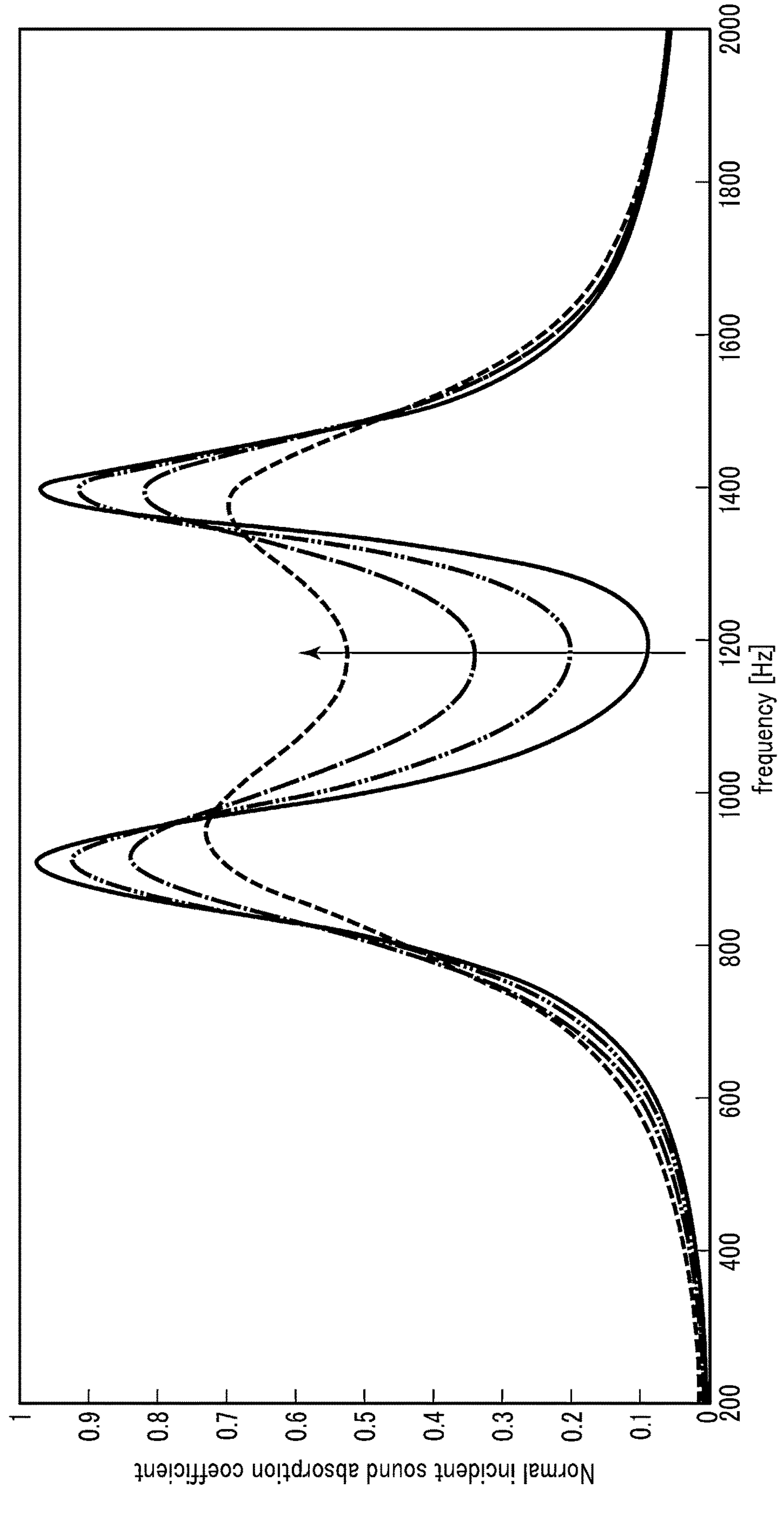
FIG. 79 is a graph showing sound absorption characteristics of the sound absorption apparatus according to the related art.

FIG. 79 schematically shows sound absorption characteristics of the sound absorption apparatus 50. Since the sound absorption apparatus 50 has the two-degree-of-freedom system, as shown in FIG. 79, the sound absorption apparatus 50 has a sound absorption characteristic in which two sound absorption coefficient peaks are present and a valley characteristic (decrease in the sound absorption coefficient) is present between the two sound absorption coefficient peaks. The valley characteristic can be suppressed as indicated by an arrow in FIG. 79 by attaching a damping material to the elastic plate 53. In a case where the damping material is attached to the elastic plate 53, the damping effect is improved, whereby the valley characteristic is suppressed.

In a case where the damping material is attached to the elastic plate 53, a natural frequency changes together with the damping effect. The natural frequency indicates a frequency at which a sound absorption coefficient peak is obtained. In particular, in a case where the elastic plate 53 is thin, the damping effect and the change in the natural frequency increase. Therefore, trial and error is required to design the sound absorption apparatus 50.

Next, a sound absorption apparatus according to an embodiment will be described.

Figure 2:
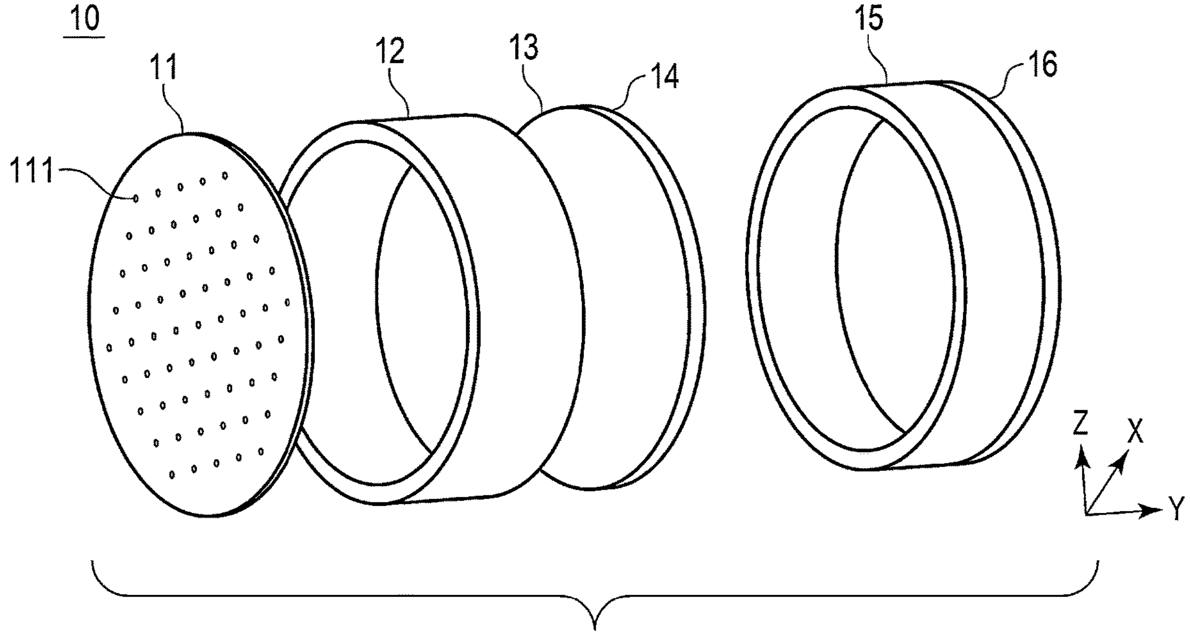
FIG. 2 is an exploded view showing the sound absorption apparatus according to the embodiment.
Figure 3:
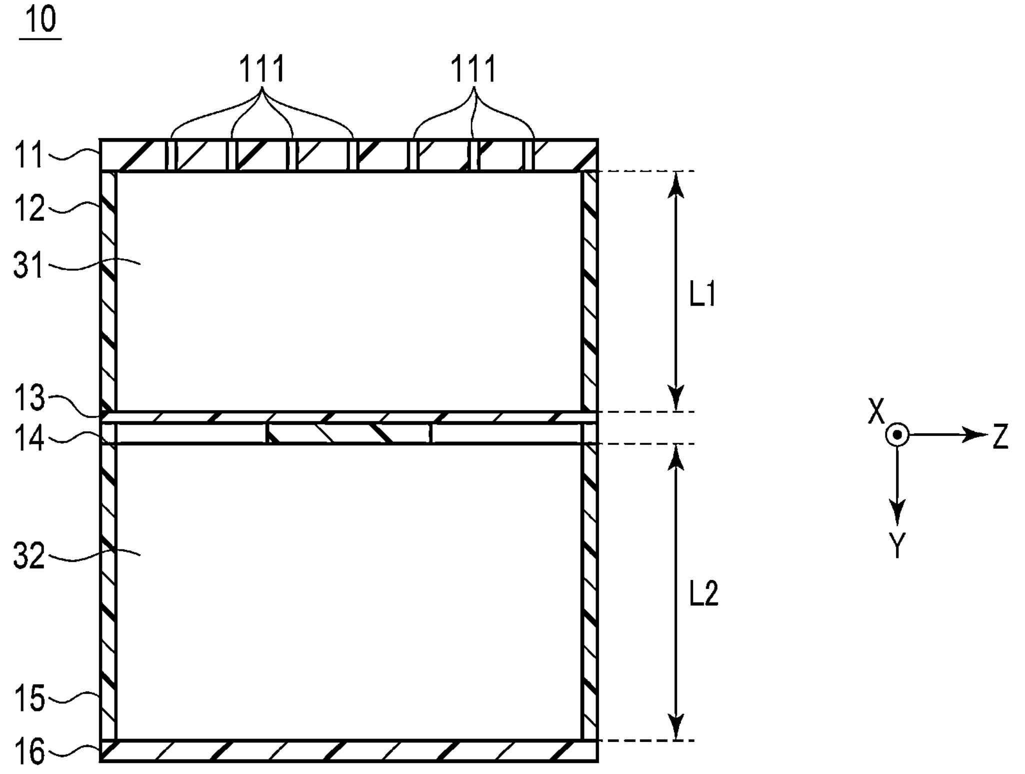
FIG. 3 is a cross-sectional view showing the sound absorption apparatus according to the embodiment.

FIGS. 1 to 3 schematically show an overall configuration of the sound absorption apparatus 10 according to the embodiment. Specifically, FIG. 1 shows an external appearance of the sound absorption apparatus 10, FIG. 2 shows the sound absorption apparatus 10 in a disassembled state, and FIG. 3 shows a cross section of the sound absorption apparatus 10. The sound absorption apparatus 10 is configured to absorb at least a part of sound generated in an external space.

As shown in FIGS. 1 to 3, the sound absorption apparatus 10 includes a front plate 11, a frame 12, a diaphragm 13, a supporting member 14, a frame 15, and a back plate 16.

The front plate 11 is a perforated plate, specifically, a circular flat plate provided with a plurality of sound holes 111. The number of sound holes 111 provided in the front plate 11 may be one. Here, an XYZ orthogonal coordinate system is introduced for description. A Y axis is defined in a direction perpendicular to a main surface of the front plate 11, and an X axis and a Z axis are defined in a direction parallel to the main surface of the front plate 11. Hereinafter, thicknesses and heights refer to dimensions in the Y-axis direction (direction parallel to the Y axis).

The back plate 16 is a circular flat plate and is provided to face the front plate 11 in the Y-axis direction. The frames 12 and 15 are cylindrical members. The thickness of the frame 12 is denoted by L1, and the thickness of the frame 15 is denoted by L2.

Figure 4:
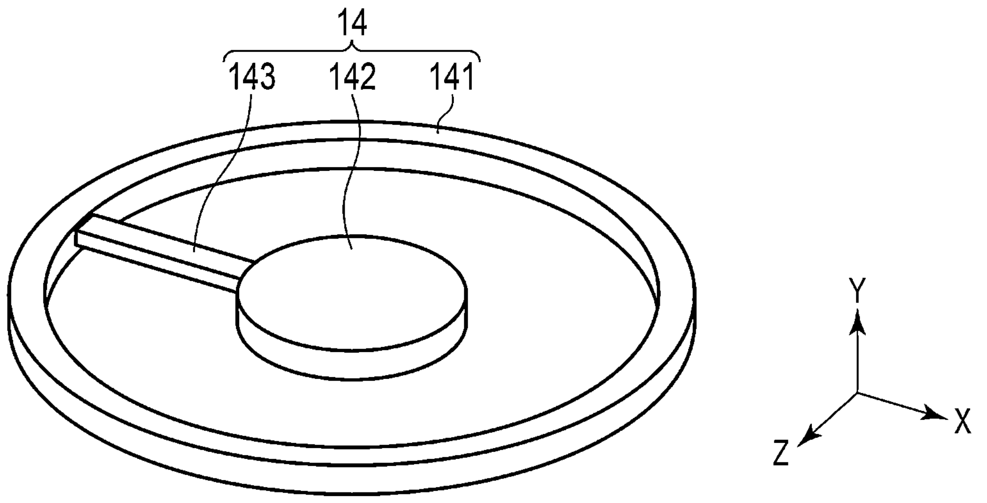
FIG. 4 is a perspective view showing a supporting member according to the embodiment.

The diaphragm 13 is a circular thin diaphragm and is provided between the front plate 11 and the back plate 16. The diaphragm 13 is also called a membrane. The supporting member 14 supports the diaphragm 13. As shown in FIG. 4, the supporting member 14 includes a frame 141, a central member 142 located inside the frame 141, and a connecting member 143 connecting the frame 141 and the central member 142. The frame 141 and the central member 142 are attached to the diaphragm 13 by, for example, an adhesive or a double-sided tape. The frame 141 has an annular shape, and the central member 142 has a columnar shape. The connecting member 143 may be a beam member extending in a radial direction (in a direction perpendicular to the Y axis). The connecting member 143 supports the central member 142 so as to vibrate with respect to the frame 141. The central member 142 is supported by the connecting member 143 so as to vibrate in the Y-axis direction.

The frame 12 forms an internal space 31 between the front plate 11 and the diaphragm 13. The internal space 31 is a space surrounded by the front plate 11, the frame 12, and the diaphragm 13. The front plate 11 is connected to the frame 12 so as to close a first opening end of the frame 12. The diaphragm 13 attached to the supporting member 14 is connected to the frame 12 so as to close a second opening end of the frame 12. Accordingly, the front plate 11 and the diaphragm 13 are separated from each other by the length L1. The internal space 31 communicates with the external space via the sound holes 111. The sound holes 111 function as paths through which sound generated in the external space enters the internal space 31 of the sound absorption apparatus 10.

The frame 15 forms an internal space 32 between the back plate 16 and the diaphragm 13. The internal space 32 is a space surrounded by the back plate 16, the frame 15, the diaphragm 13, and the supporting member 14. The diaphragm 13 is connected to the frame 15 via the supporting member 14 so as to close a first opening end of the frame 15. The back plate 16 is connected to the frame 15 so as to close a second opening end of the frame 15. Thereby, a combination of the diaphragm 13 and the supporting member 14 is separated from the back plate 16 by the length L2. The internal space 32 is separated from the internal space 31 and the external space.

A connection between two members (for example, the connection between the front plate 11 and the frame 12) may be implemented by, for example, an adhesive. The frame 15 and the back plate 16 may be integrally molded.

In the example shown in FIG. 3, the diaphragm 13 is provided on the surface side of the supporting member 14 facing the frame 12. Alternatively, the diaphragm 13 may be provided on the surface side of the supporting member 14 facing the frame 15. The diaphragm 13 may be provided on both sides of the supporting member 14. Specifically, the diaphragm 13 may include a first diaphragm provided on the surface side of the supporting member 14 facing the frame 12 and a second diaphragm provided on the surface side of the supporting member 14 facing the frame 15.

Figure 5:
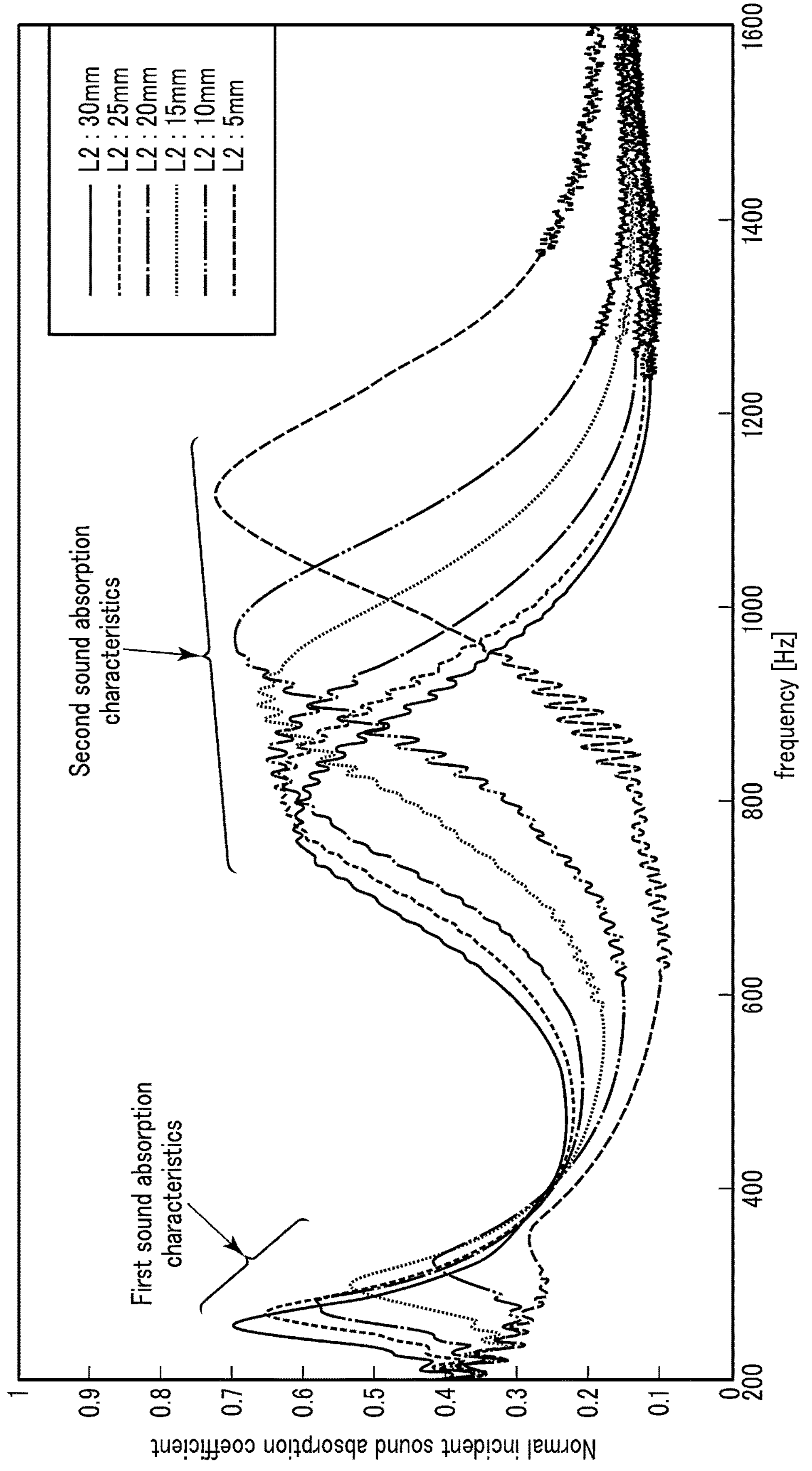
FIG. 5 is a graph showing sound absorption characteristics of a combination of a diaphragm and the supporting member according to the embodiment.
Figure 6:
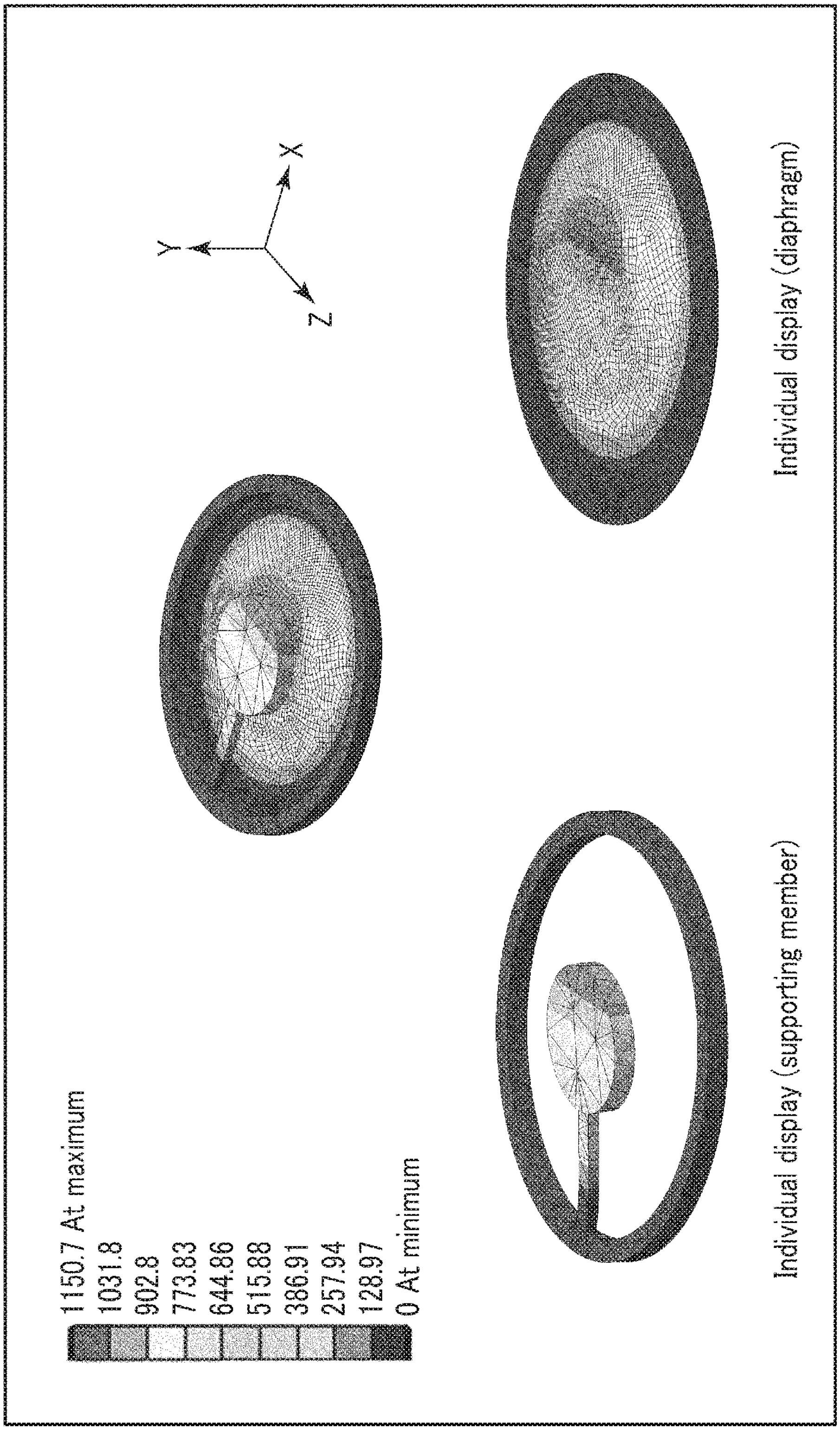
FIG. 6 is a diagram showing vibration of the combination of the diaphragm and the supporting member according to the embodiment.
Figure 7:
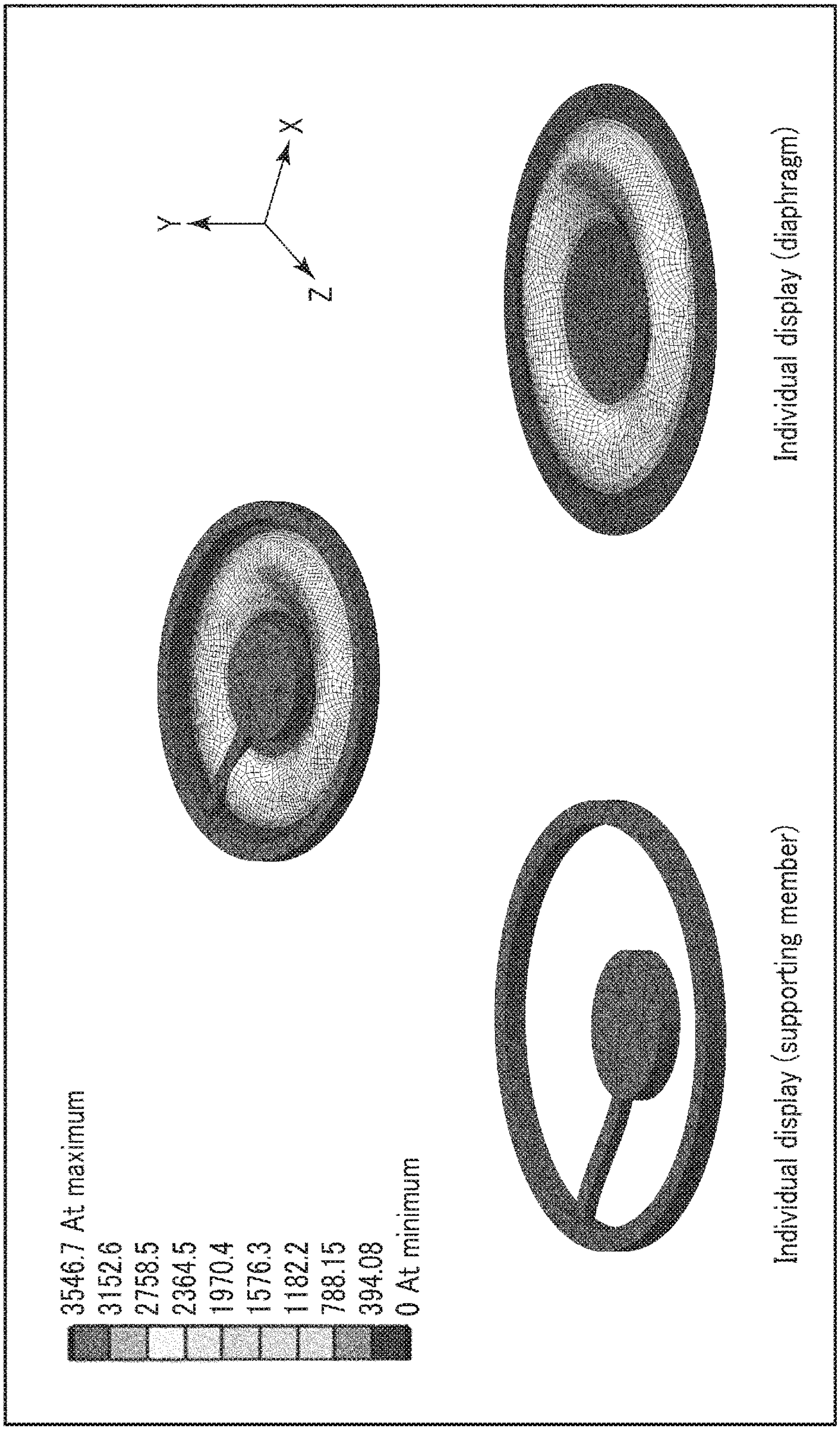
FIG. 7 is a diagram showing vibration of the combination of the diaphragm and the supporting member according to the embodiment.

In the embodiment, the combination of the diaphragm 13 and the supporting member 14 is used instead of the elastic plate 53 used in the related art. The combination of the diaphragm 13 and the supporting member 14 has sound absorption characteristics including a first sound absorption characteristic and a second sound absorption characteristic as shown in FIG. 5. As shown in FIG. 6, the first sound absorption characteristic is obtained by vibrating the central member 142 in the Y-axis direction and vibrating the diaphragm 13 in accordance with the vibration of the central member 142. As shown in FIG. 7, the second sound absorption characteristic is obtained by vibration (diaphragm vibration) of the diaphragm 13 itself. A partial region of the diaphragm 13 is bonded to the supporting member 14, and the diaphragm vibration is possible in the remaining region of the diaphragm 13. Hereinafter, a mode in which the first sound absorption characteristic is mainly used is referred to as a first mode, and a mode in which the second sound absorption characteristic is mainly used is referred to as a second mode. The structure of the supporting member 14 in the first mode can be similar to that in the second mode.

Figure 8:
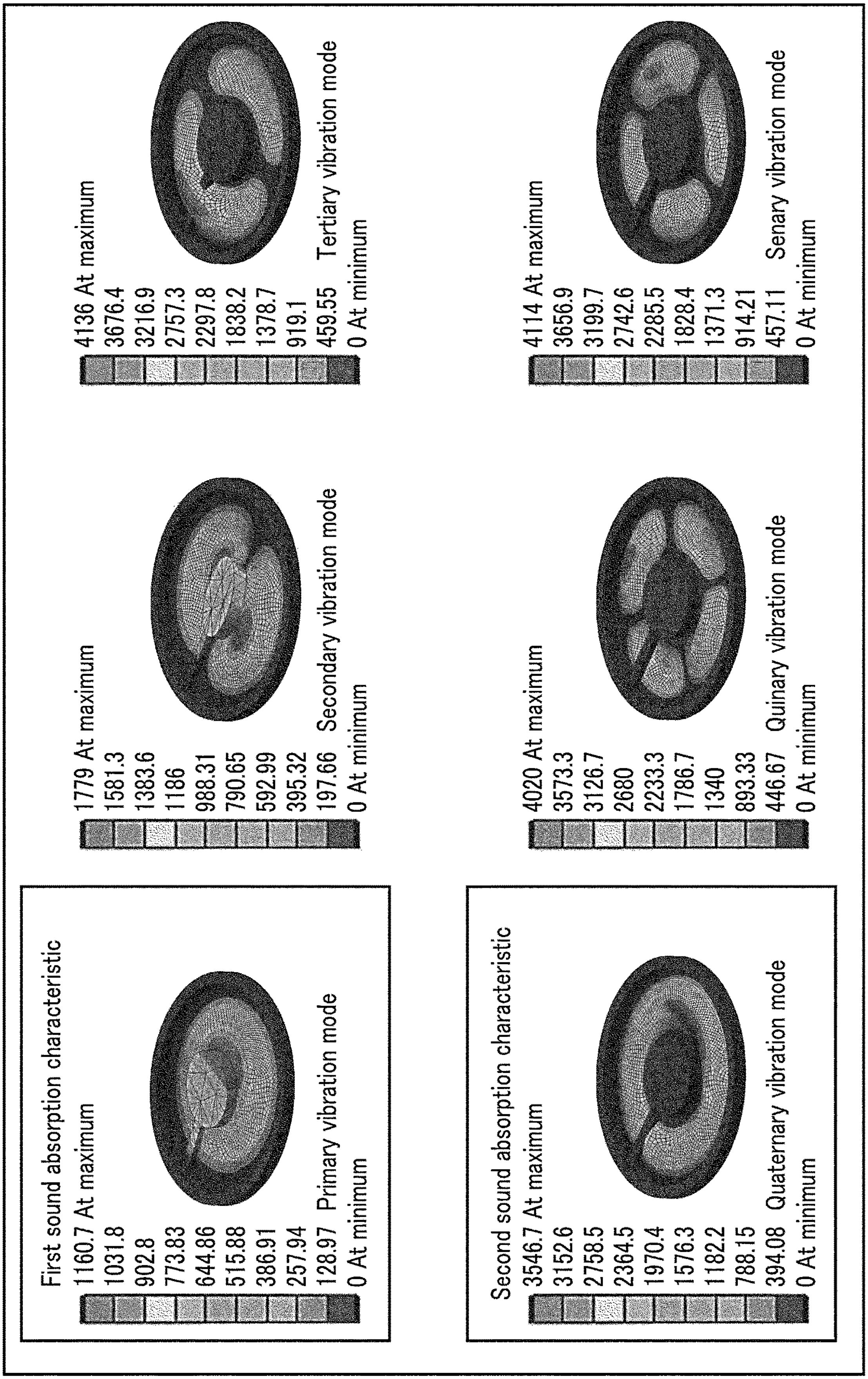
FIG. 8 is a diagram showing vibration modes of the combination of the diaphragm and the supporting member according to the embodiment.

FIG. 8 is a diagram showing vibration modes of the combination of the diaphragm 13 and the supporting member 14. As shown in FIG. 8, a large number of vibration modes occur. A vibration mode in which the sound absorption characteristics can be obtained is a mode in which the entire diaphragm 13 vibrates in the same direction without the division of the region of the diaphragm 13 as in the primary vibration mode and the quaternary vibration mode. This is because, in the mode, the vibration is likely to be excited when a sound wave vertically enters. The first sound absorption characteristic is obtained by the primary vibration mode, and the second sound absorption characteristic is obtained by the quaternary vibration mode. On the other hand, for example, in the secondary vibration mode, the diaphragm 13 is divided into two regions, and the two regions have different phases. Therefore, vibration is hardly excited by a sound wave that vertically enters, and sound absorption characteristics cannot be obtained. The same applies to a sound wave that obliquely enters.

The first mode will be described in detail.

As described above, the supporting member 14 includes the frame 141, the central member 142 located inside the frame 141, and the connecting member 143 that supports the central member 142 so as to vibrate with respect to the frame 141, and the frame 141 and the central member 142 are bonded to the diaphragm 13. In this configuration, due to the mass of the central member 142, the stiffness of the diaphragm 13, the stiffness of the connecting member 143, and the stiffness of an air spring by the internal space 32 corresponding to an air layer, a one-degree-of-freedom system similar to that of the sound absorption apparatus 50 according to the related art can be formed. Therefore, as compared with the related art described above, the design of a natural frequency is facilitated, and the design of a low frequency band is also possible. Furthermore, the damping effect that most affects the sound absorption effect can be produced by the viscoelasticity of the diaphragm 13, and an additional damping material does not need to be attached.

The design of the one-degree-of-freedom system can be implemented based on the mass of the central member 142, the stiffness of the diaphragm 13, the stiffness of the connecting member 143, and the stiffness of the air spring by the internal space 32. The damping effect can be adjusted based on the material and thickness of the diaphragm 13. In particular, the thickness of the diaphragm 13 has a small effect on the natural frequency, and the damping effect can be adjusted by adjusting the thickness of the diaphragm 13 without almost changing the natural frequency. The mass of the central member 142 can be changed based on the shape of the central member 142, and the stiffness of the connecting member 143 can be changed based on the shape of the connecting member 143. Therefore, the natural frequency of the one-degree-of-freedom system can be easily adjusted. In the sound absorption apparatus 10 using the combination of the diaphragm 13 and the supporting member 14, the effect of the stiffness of the air spring by the internal space 32 is large as compared with the related art using the elastic plate 53, and the stiffness of the air spring by the internal space 32 can be effectively used as a parameter for adjusting the natural frequency. The stiffness of the air spring by the internal space 32 depends on the thickness L2 of the frame 15.

In summary, the sound absorption apparatus 10 according to the first mode has the following features.

It is easy to perform design and adjustment. For example, the natural frequency can be determined by designing the central member 142 and the connecting member 143 of the supporting member 14, and the diaphragm 13.

Damping application can be implemented by attaching the diaphragm 13 to the supporting member 14. From the viewpoint of energy dissipation, the combination of the diaphragm 13 and the supporting member 14 is more desirable than the elastic plate 53 used in the related art, and attachment of a damping material is also unnecessary.

The diaphragm 13 plays two roles of an acoustic wall effect (acoustically separating the internal space 31 and the internal space 32) and the above-described damping application. In order to adjust the damping effect, it is effective to change the thickness of the diaphragm 13.

Variations of the supporting member 14 will be described. As a variation of the supporting member 14, a variation of the shape of the connecting member 143 is conceivable.

Figure 9:
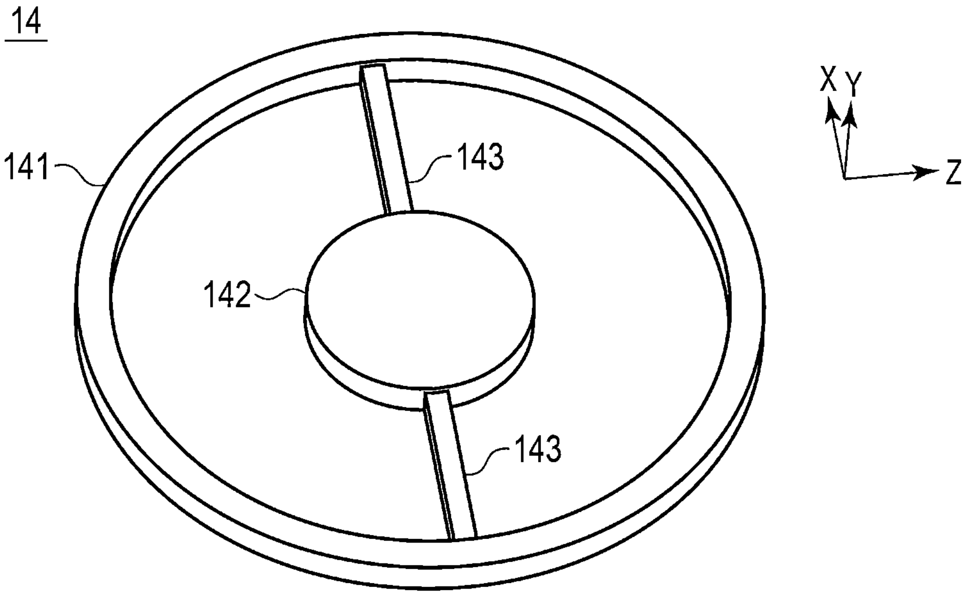
FIG. 9 is a perspective view showing a supporting member according to the embodiment.
Figure 10:
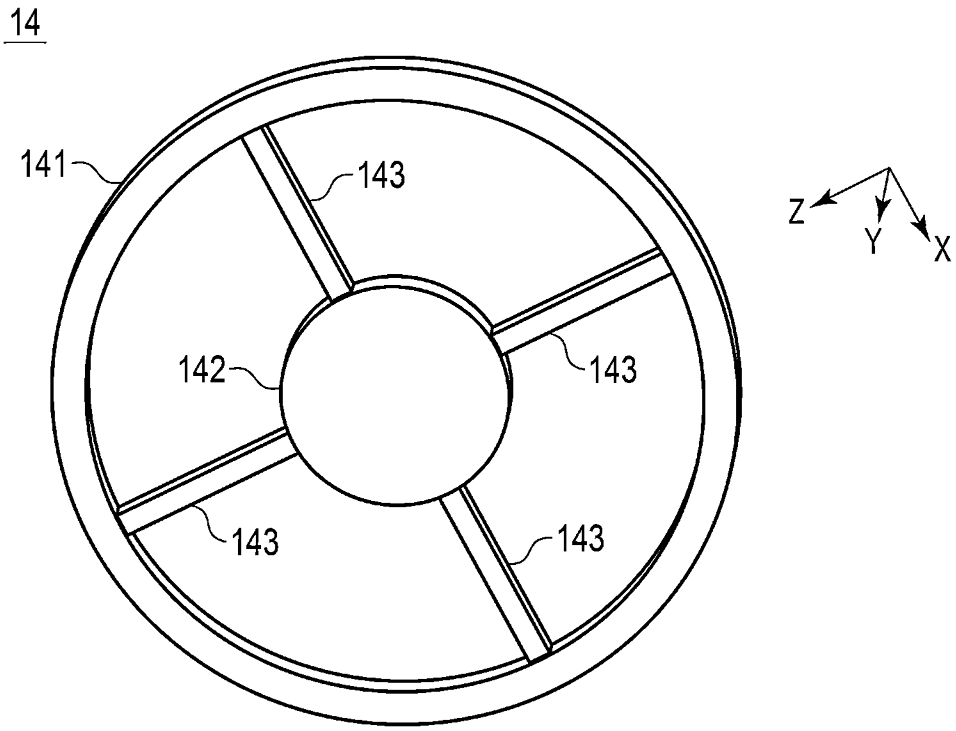
FIG. 10 is a perspective view showing a supporting member according to the embodiment.

As shown in FIGS. 4, 9, and 10, in the supporting member 14 according to the first variation, the connecting member 143 is a linear beam member. In an example shown in FIG. 9, a supporting member 14 includes two connecting members 143. In an example shown in FIG. 10, a supporting member 14 includes four connecting members 143.

In the sound absorption apparatus 10 having the supporting member 14 according to the first variation, design parameters include the following.

The radius and thickness of the central member 142

The width, thickness, and number of connecting members 143

The material and thickness of the diaphragm 13

The thickness L2 of the frame 15

The radius and thickness of the central member 142 contribute to the mass parameter of the one-degree-of-freedom system. The shape of the central member 142 is not limited to a cylindrical shape, and may be another shape such as an annular shape. The width, thickness, and number of connecting members 143 contribute to the stiffness parameter of the one-degree-of-freedom system. The material and thickness of the diaphragm 13 contribute to the stiffness parameter and the viscosity parameter of the one-degree-of-freedom system. In a case where the diaphragm 13 is used alone (that is, the supporting member 14 is not used), the mass parameter and the stiffness parameter of the one-degree-of-freedom system strongly depend on the material and thickness of the diaphragm 13, and it becomes difficult to design the mass parameter and the stiffness parameter of the one-degree-of-freedom system. The combination of the diaphragm 13 and the supporting member 14 facilitates the design of the mass parameter and the stiffness parameter of the one-degree-of-freedom system. The thickness L2 of the frame 15 is the thickness of the internal space 32, and contributes to the stiffness parameter of the one-degree-of-freedom system.

Note that the connecting members 143 do not need to be bonded to the diaphragm 13. Further, fine adjustment of the mass of the central member 142 can also be performed by attaching a thick tape, a metal piece, or the like to the central member 142.

In the first mode, the primary vibration mode is used. Therefore, the number of connecting members 143 is not limited. As the number of connecting members 143 is increased, the stiffness of the one-degree-of-freedom system naturally increases, and the natural frequency increases. In the design of the sound absorption apparatus 10, the natural frequency is determined according to a sound absorption band (frequency band of sound to be absorbed), and the above-described design parameters including the number of connecting members 143 are determined based on the determined natural frequency.

Figure 11:
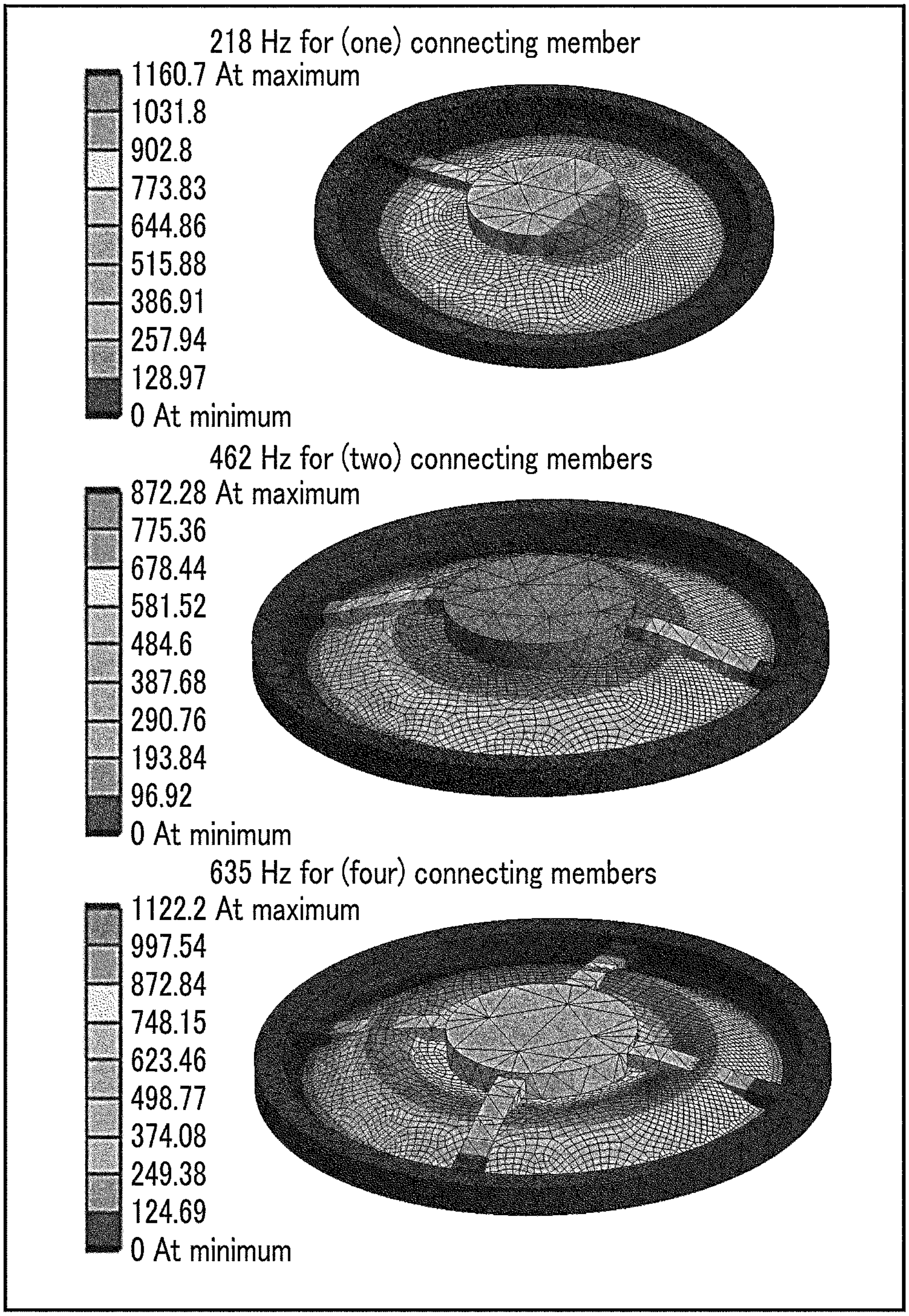
FIG. 11 is a diagram showing vibration of combinations of the diaphragm and the supporting members according to the embodiment.

FIG. 11 shows results of analyzing the vibration of combinations of the diaphragm 13 and the supporting member 14 including the one connecting member 143 shown in FIG. 4, the supporting member 14 including the two connecting members 143 shown in FIG. 9, and the supporting member 14 including the four connecting members 143 shown in FIG. 10. In the results of the vibration analysis shown in FIG. 11, the natural frequency is 218 Hz for the supporting member 14 including the one connecting member 143 shown in FIG. 4, 462 Hz for the supporting member 14 including the two connecting members 143 shown in FIG. 9, and 635 Hz for the supporting member 14 including the four connecting members 143 shown in FIG. 10. From the results of analyzing the vibration, it can be confirmed that the natural frequency increases as the number of connecting members 143 is increased.

Figure 12:
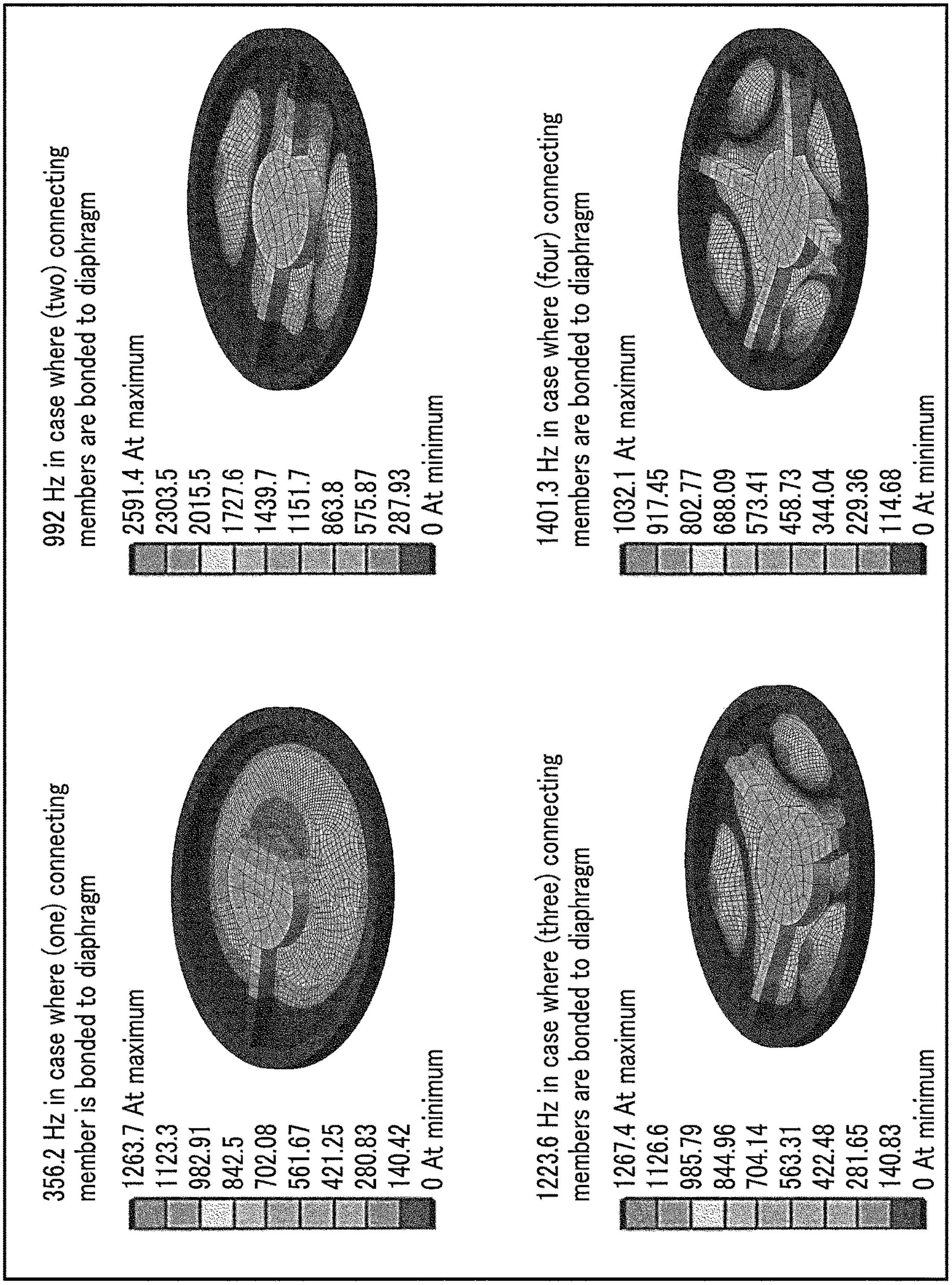
FIG. 12 is a diagram showing vibration of combinations of the diaphragm and supporting members according to the embodiment.

The connecting members 143 may be bonded to the diaphragm 13. Also in a case where each connecting member 143 is bonded to the diaphragm 13, and as the number of connecting members 143 is increased, the stiffness increases and the natural frequency increases as shown in FIG. 12. In the results of the vibration analysis shown in FIG. 12, the natural frequencies are larger than the values shown in FIG. 11 because the height of each of the connecting members 143 is doubled.

Figure 13:
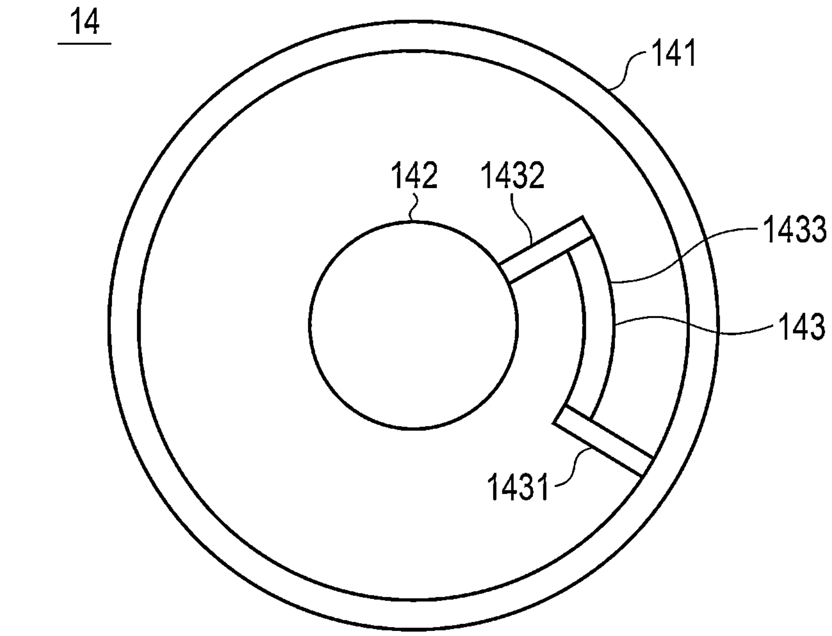
FIG. 13 is a plan view showing a supporting member according to the embodiment.
Figure 14:
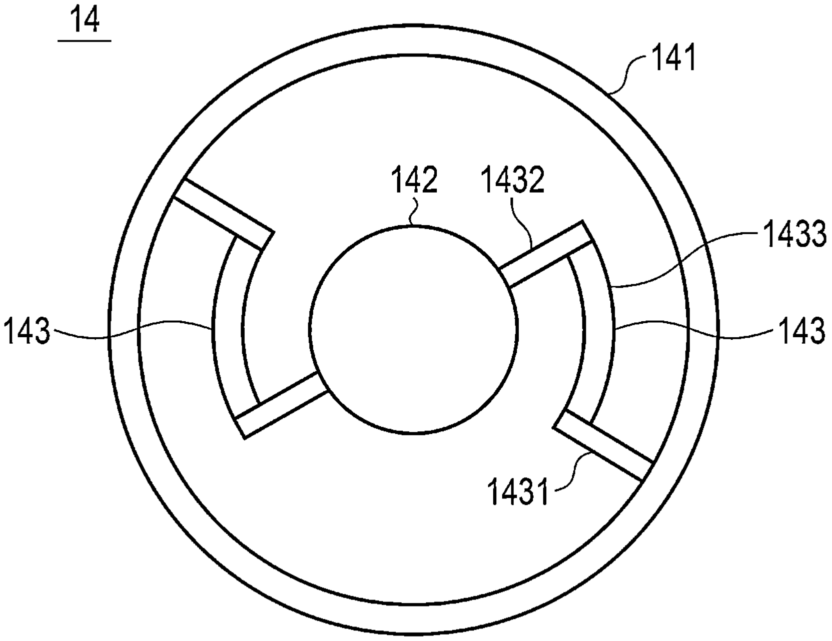
FIG. 14 is a plan view showing a supporting member according to the embodiment.
Figure 15:
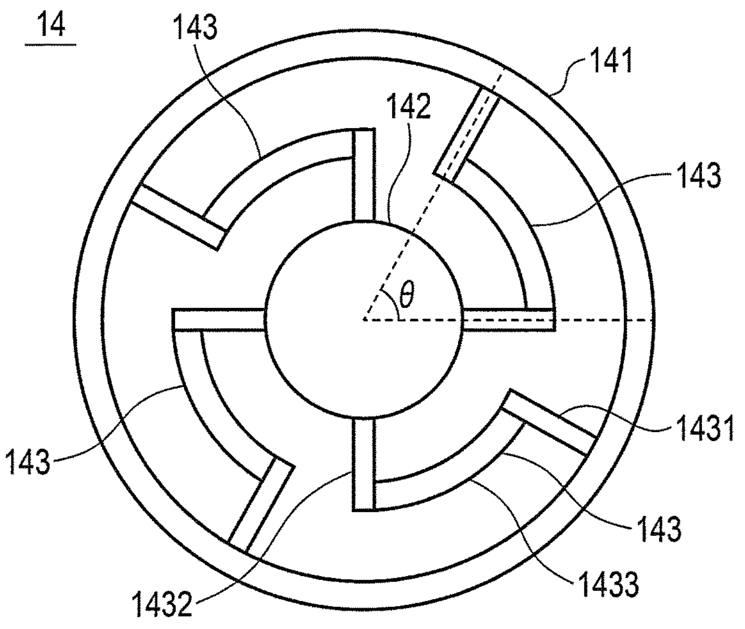
FIG. 15 is a plan view showing a supporting member according to the embodiment.

In a supporting member 14 according to the second variation, as shown in FIGS. 13 to 15, a connecting member 143 includes linear beam members 1431 and 1432 and an arc-shaped beam member 1433, a first end of the beam member 1431 is connected to the frame 141, a second end of the beam member 1431 is connected to a first end of the beam member 1433, a first end of the beam member 1432 is connected to a second end of the beam member 1433, and a second end of the beam member 1432 is connected to the central member 142. In an example shown in FIG. 13, a supporting member 14 includes one connecting member 143. In an example shown in FIG. 14, a supporting member 14 includes two connecting members 143. In an example shown in FIG. 15, a supporting member 14 includes four connecting members 143.

In the sound absorption apparatus 10 having the supporting member 14 according to the second variation, design parameters include the following.

The radius and thickness of the central member 142

The width, thickness, and number of beam members 1431 and 1432

The width, thickness, angle θ, and number of beam members 1433

The material and thickness of the diaphragm 13

The thickness L2 of the frame 15

The radius and thickness of the central member 142 contribute to the mass parameter of the one-degree-of-freedom system. The shape of the central member 142 is not limited to a cylindrical shape, and may be another shape such as an annular shape. The width, thickness, and number of beam members 1431 and 1432 contribute to the stiffness parameter of the one-degree-of-freedom system. The width, thickness, angle θ, and number of beam members 1433 contribute to the stiffness parameter of the one-degree-of-freedom system. Since the beam member 1433 extends in the circumferential direction, the length of the beam member 1433 can be increased. The length of the beam member 1433 corresponds to the angle θ of the beam member 1433. In a case where the beam member 1433 is lengthened, the stiffness of the connecting member 143 decreases, and the natural frequency in the primary vibration mode decreases. Therefore, the natural frequency in the primary vibration mode in the second variation can be made lower than that in the primary vibration mode in the first variation, and the second variation is suitable for low-frequency design. The material and thickness of the diaphragm 13 contribute to the stiffness parameter and the viscosity parameter of the one-degree-of-freedom system. The thickness L2 of the frame 15 is the thickness of the internal space 32, and contributes to the stiffness parameter of the one-degree-of-freedom system.

Since force from the connecting member 143 against the central member 142 is applied obliquely with respect to the Y-axis direction, the central member 142 slight rotates and moves in translation in the Y-axis direction so as to able to appropriately vibrate the diaphragm 13 in the Y-axis direction.

Figure 16:
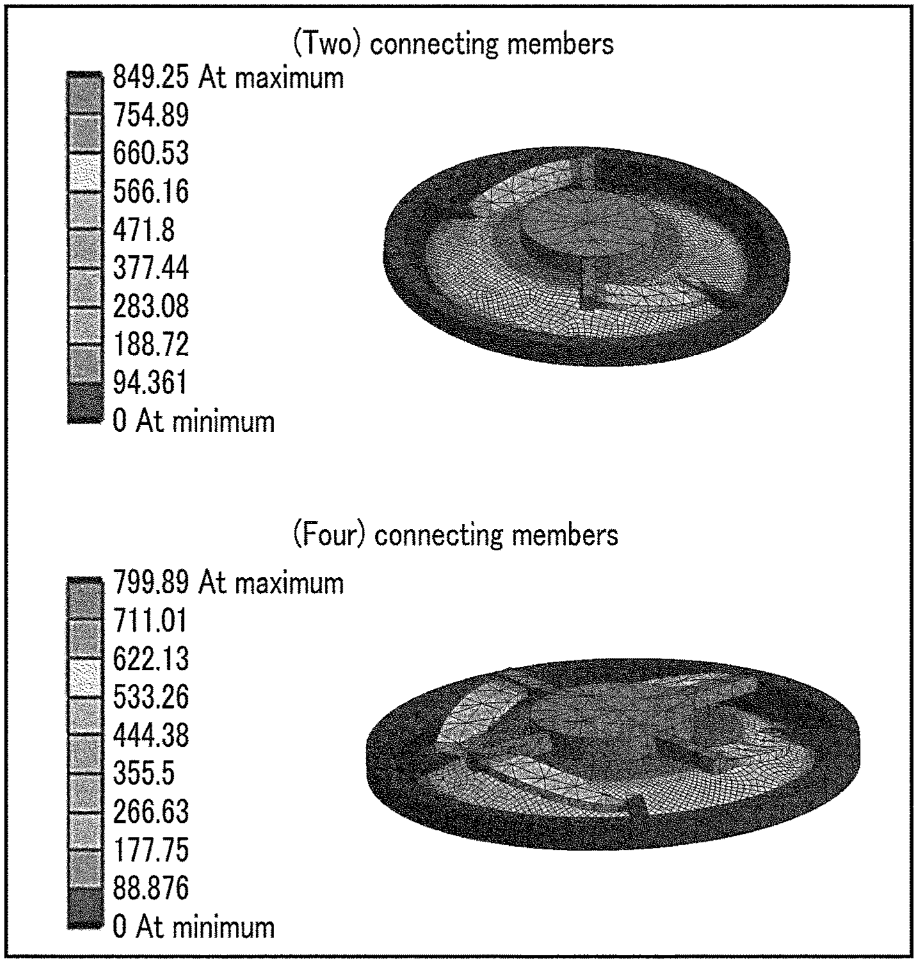
FIG. 16 is a diagram showing vibration of combinations of the diaphragm and the supporting members according to the embodiment.

FIG. 16 shows results of vibration analysis in a case where the supporting member 14 shown in FIG. 14 includes the two connecting members 143 and in a case where the supporting member 14 shown in FIG. 15 includes the four connecting members 143. It can be confirmed from FIG. 16 that the translational movement in the Y-axis direction appropriately occurs.

Although the example in which the central member 142 has a circular shape as viewed from the Y-axis direction has been described, the central member 142 may have an annular shape or a polygonal shape as viewed from the Y-axis direction.

Next, the second mode will be described in detail.

As described above, the supporting member 14 includes the frame 141, the central member 142 located inside the frame 141, and the connecting member 143 that supports the central member 142 so as to vibrate with respect to the frame 141, and the frame 141 and the central member 142 are bonded to the diaphragm 13. In this configuration, due to the mass of the diaphragm 13, the stiffness of the diaphragm 13, the dimensions of the central member 142, and the stiffness of the air spring by the internal space 32 corresponding to the air layer, a one-degree-of-freedom system similar to that of the sound absorption apparatus 50 according to the related art can be formed. The effective area of the diaphragm 13 can be changed based on the dimensions of the central member 142, whereby it is possible to change the mass and stiffness of the diaphragm 13. The effective area of the diaphragm 13 indicates the area of a region where the diaphragm vibration is possible. Therefore, as compared with the sound absorption apparatus 50 according to the related art, the design of the natural frequency is facilitated, and a low frequency band can also be designed. In addition, the damping effect that most affects the sound absorption effect can be produced by the viscoelasticity of the diaphragm 13, and an additional damping material does not need to be attached. The damping effect can be adjusted by providing the diaphragm 13 on both surfaces of the supporting member 14 or changing support conditions of the diaphragm 13. The support conditions of the diaphragm 13 will be described below. Since the diaphragm 13 is bonded to the central member 142, a boundary condition for the diaphragm vibration varies depending on the vibration mode of the central member 142. This change can be used to adjust the damping effect. Specifically, the boundary condition varies according to the frequency of the vibration mode. As the frequency of the vibration mode decreases, the diaphragm 13 is less constrained by the central member 142 (the diaphragm 13 is more likely to move), and the damping effect increases. On the other hand, as the frequency of the vibration mode increases, the diaphragm 13 is more likely to be constrained by the central member 142 (the diaphragm 13 is less likely to move), and the damping effect decreases. As described above, in the second mode, since the diaphragm vibration is used, a change in the natural frequency due to a change in the shape of the connecting member 143 is minute, but the change in the shape of the connecting member 143 affects as a change in the boundary condition for the diaphragm vibration, and can be included in design elements as fine adjustment of the damping effect.

The design of the one-degree-of-freedom system can be implemented based on the mass of the diaphragm 13, the stiffness of the diaphragm 13, the stiffness of the central member 142, and the stiffness of the air spring by the internal space 32. Further, since the diaphragm 13 has viscoelasticity, no additional damping is required. Further, the damping effect can be finely adjusted by changing the shape of the connecting member 143. That is, depending on the shape of the central member 142 and the thickness and material of the diaphragm 13, the mass and stiffness of the diaphragm 13 can be changed and the natural frequency of the one-degree-of-freedom system can be easily changed. Further, the damping effect can be finely adjusted by changing the shape of the connecting member 143. Note that the effect of the stiffness of the air spring by the internal space 32 is larger than that of the elastic plate 53 used in the related art, and the stiffness of the air spring by the internal space 32 can be effectively used as a parameter for adjusting the natural frequency. It is also possible to bond the connecting member 143 to the diaphragm 13 to divide the diaphragm 13, thereby changing the natural frequency. The number of divisions varies depending on the number of connecting members 143 bonded to the diaphragm 13, and the natural frequency can be changed.

The sound absorption apparatus 10 according to the second mode has the following features.

It is easy to perform design and adjustment. For example, the natural frequency can be determined by designing the shape of the central member 142 and the material and thickness of the diaphragm 13. It is also possible to change the natural frequency by bonding the connecting member 143 to the diaphragm 13.

Damping application can be implemented by attaching the diaphragm 13 to the supporting member 14. From the viewpoint of energy dissipation, the combination of the diaphragm 13 and the supporting member 14 is more desirable than the elastic plate 53 used in the related art, and attachment of a damping material is also unnecessary. The damping effect can also be adjusted by changing the boundary condition of the diaphragm 13 by the central member 142 and the connecting member 143. The design of the supporting member 14 regarding the adjustment of the damping effect by the change in the boundary condition of the diaphragm 13 by the central member 142 and the connecting member 143 can be implemented in a variation of the connecting member 143 as in the first mode.

The diaphragm 13 plays two roles of an acoustic wall effect and the above-described damping application. By providing the diaphragm 13 on both surfaces of the supporting member 14, it is possible to improve the damping effect.

Figure 17:
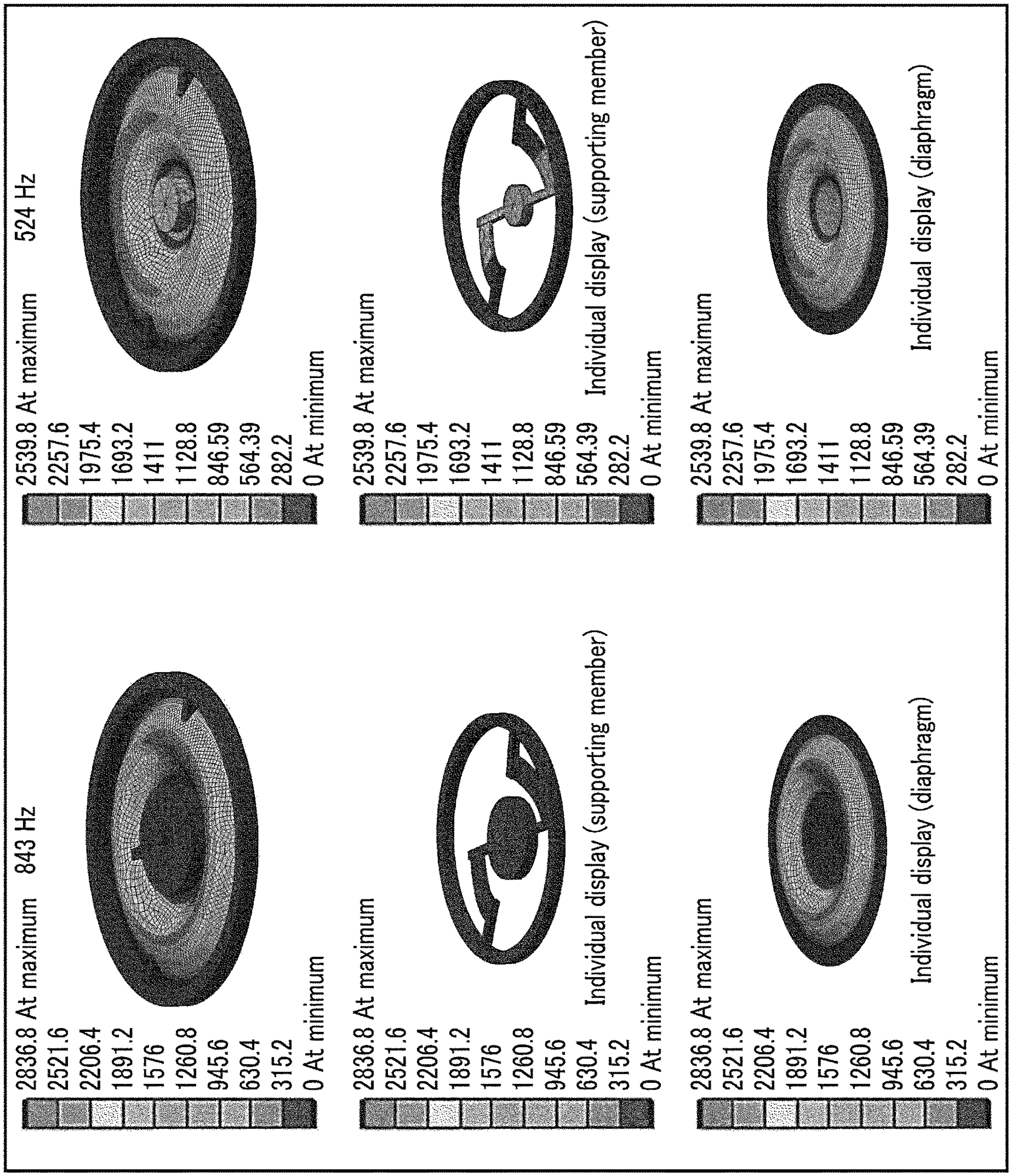
FIG. 17 is a diagram showing vibration of combinations of the diaphragm and supporting members according to the embodiment.

FIG. 17 shows results of analyzing vibration of combinations of the diaphragm 13 and supporting members 14. In FIG. 17, analysis results in a case where the effective area of the diaphragm 13 is small are shown on the left side, and analysis results in a case where the effective area of the diaphragm 13 is large are shown on the right side. The smaller the dimensions of the central member 142, the larger the effective area of the diaphragm 13. It can be confirmed from FIG. 17 that the natural frequency of the diaphragm vibration is lower as the effective area of the diaphragm 13 is larger.

Figure 18:
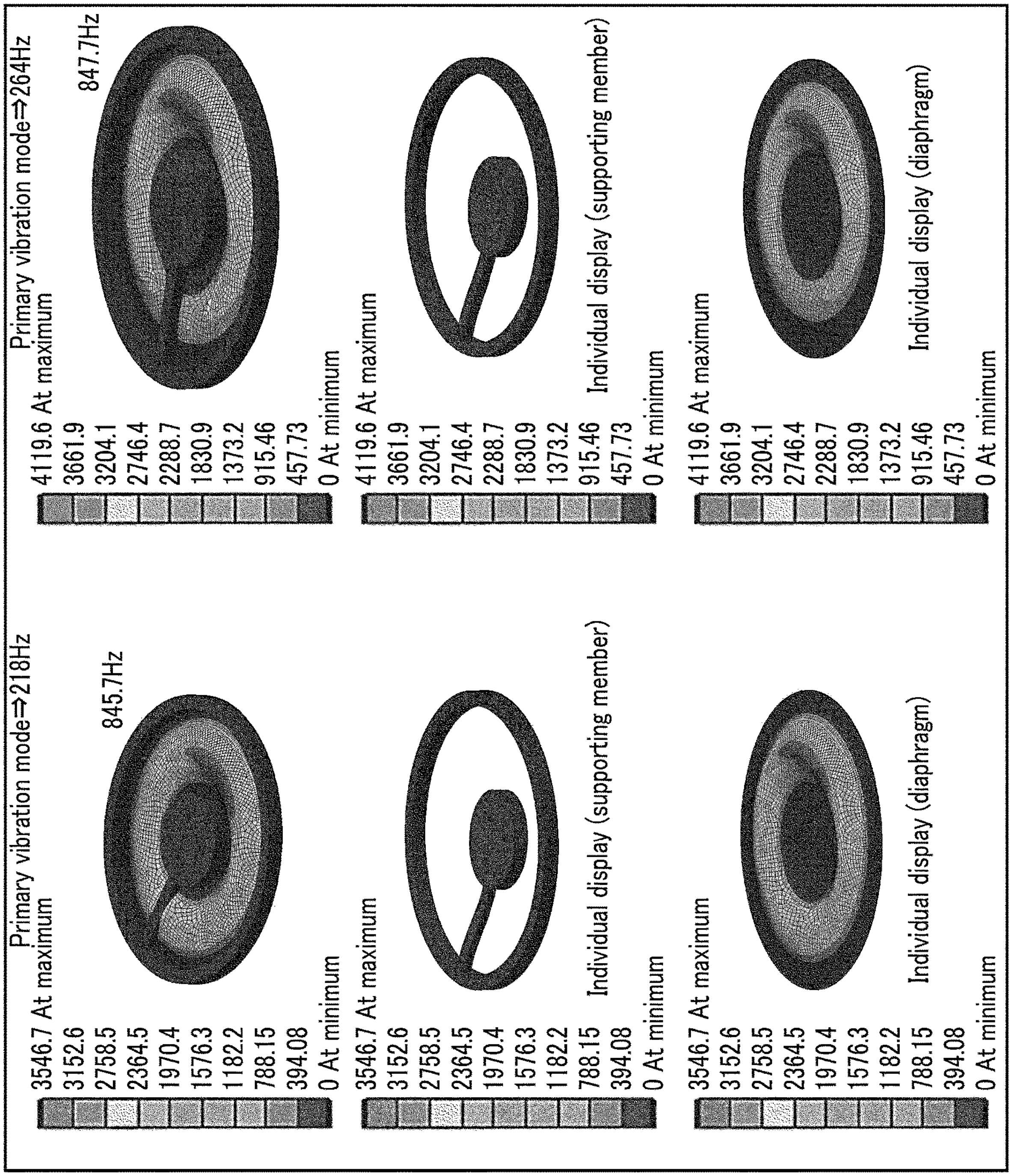
FIG. 18 is a diagram showing vibration of combinations of the diaphragm and supporting members according to the embodiment.

FIG. 18 shows results of analyzing vibration of combinations of the diaphragm 13 and supporting members 14 for two connecting members 143 having different shapes. The left side of FIG. 18 shows the results of analyzing the vibration of the combination of the diaphragm 13 and the supporting member 14 in a case where the thickness of the connecting member 143 is small, and the right side of FIG. 18 shows the results of analyzing the vibration of the combination of the diaphragm 13 and the supporting member 14 in a case where the thickness of the connecting member 143 is large. In a case where the thickness of the connecting member 143 is small, the frequency of the first sound absorption characteristic is 218 Hz and the frequency of the second sound absorption characteristic is 845.7 Hz. In a case where the thickness of the connecting member 143 is large, the frequency of the first sound absorption characteristic is 264 Hz and the frequency of the second sound absorption characteristic is 847.7 Hz. In this manner, the frequency of the first sound absorption characteristic changes due to the difference between the shapes of the connecting members 143, but the frequency of the second sound absorption characteristic hardly changes. It can be confirmed from FIG. 18 that the diaphragm vibration is inhibited and displacement in the vicinity of the connecting member 143 decreases in a case where the frequency of the first sound absorption characteristic is higher. That is, it can be confirmed that the bonding condition of the diaphragm 13 is further strengthened in a case where the thickness of the connecting member 143 is larger, which results in a higher frequency of the first sound absorption characteristic. The vibration speed of the diaphragm decreases due to the strengthening of the bonding condition of the diaphragm 13, and the damping effect decreases. In this manner, by changing the frequency of the first sound absorption characteristic by changing the shape of the connecting member 143, fine adjustment of the damping effect can be performed without almost changing the frequency of the second sound absorption characteristic utilized in the second mode.

Figure 19:
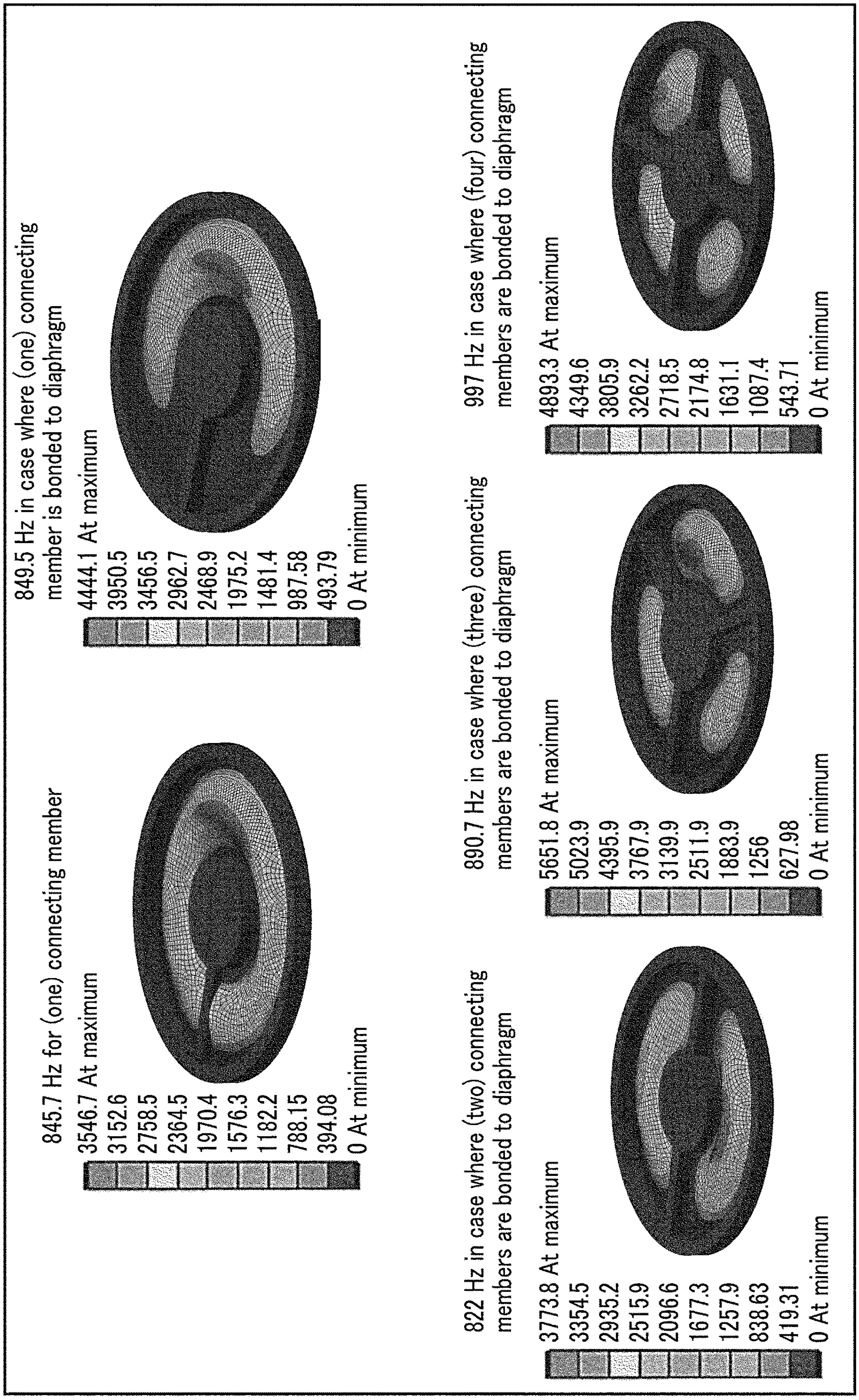
FIG. 19 is a diagram showing vibration of the combinations of the diaphragm and the supporting members according to the embodiment.

FIG. 19 shows results of analyzing vibration of the combinations of the diaphragm 13 and the supporting members 14 in a case where each connecting member 143 is bonded to the diaphragm 13. It can be confirmed from FIG. 19 that the number of divisions of the diaphragm 13 changes according to the number of connecting members 143 bonded to the diaphragm 13, and the natural frequency changes.

Figure 20:
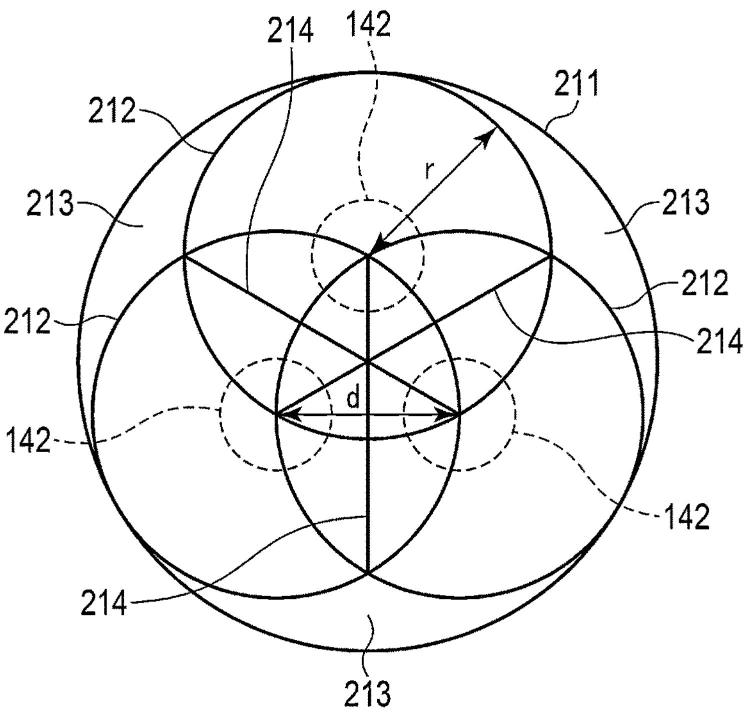
FIG. 20 is a diagram showing arrangement of central members of a supporting member according to the embodiment.
Figure 25:
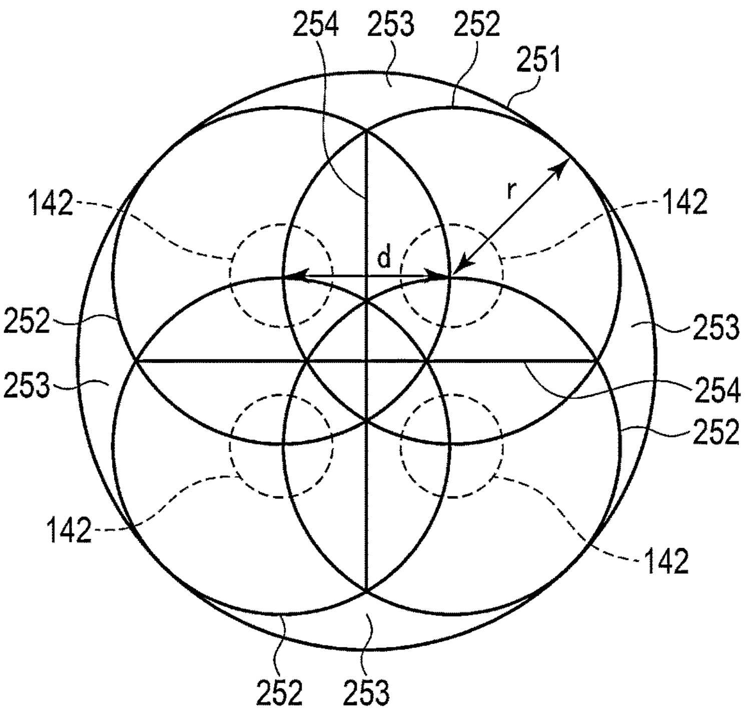
FIG. 25 is a diagram showing arrangement of central members of a supporting member according to the embodiment.

A supporting member 14 according to the third variation has a shape according to each of design methods shown in FIGS. 20 and 25. As described above, the natural frequency of the diaphragm vibration depends on the effective area of the diaphragm 13. The supporting member 14 according to the third variation makes it possible to significantly change the effective area of the diaphragm 13 and thus to significantly change the natural frequency of the diaphragm vibration.

Figure 21:
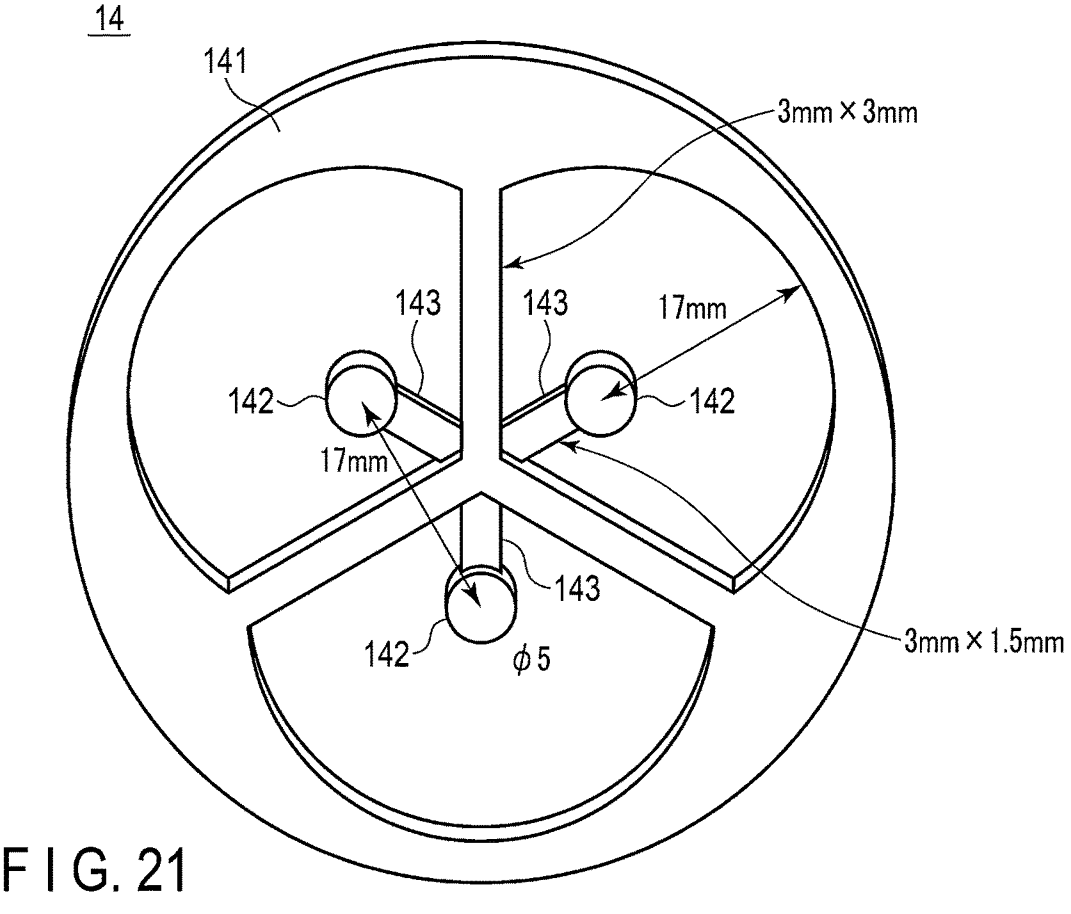
FIG. 21 is a perspective view showing the supporting member according to the embodiment.

FIG. 21 schematically shows an example of the supporting member 14 according to the third variation in accordance with the design method shown in FIG. 20. As shown in FIG. 21, the supporting member 14 includes a frame 141, three central members 142, and three connecting members 143. The central members 142 are disposed at positions equidistant from each other and equidistant from the center of the supporting member 14. Each of the central members 142 is supported by the corresponding connecting member 143 with respect to the frame 141.

In FIG. 20, the radius of a circle 211 corresponding to the inner peripheral circle of the frame 141 is denoted by R, the radius of each of three inscribed circles 212 inscribed in the circle 211 is denoted by r, and the distance between the centers of the inscribed circles 212 is denoted by d. The radius r is made equal to the distance d. In this case, $2R \approx 3.2d$. For example, in a case where $2R=54$ mm, $d=17$ mm as shown in FIG. 21. The frame 141 is extended to a region 213 between the circle 211 and the inscribed circles 212 shown in FIG. 21, and is further extended to the center of the circle 211 along boundary lines 214 between the inscribed circles 212. The cross sections of portions extended along the boundary lines 214 between the inscribed circles 212 are squares having a width of 3 mm and a height of 3 mm. The central members 142 are disposed at the centers of the inscribed circles 212. Each of the central members 142 is a cylinder having a diameter of 5 mm and a height of 3 mm. Each of the central members 142 is connected to the central portion of the frame 141 via the connecting member 143 corresponding to the central member 142. The cross sections of the connecting members 143 are rectangles having a width of 3 mm and a height of 1.5 mm.

Figure 22:
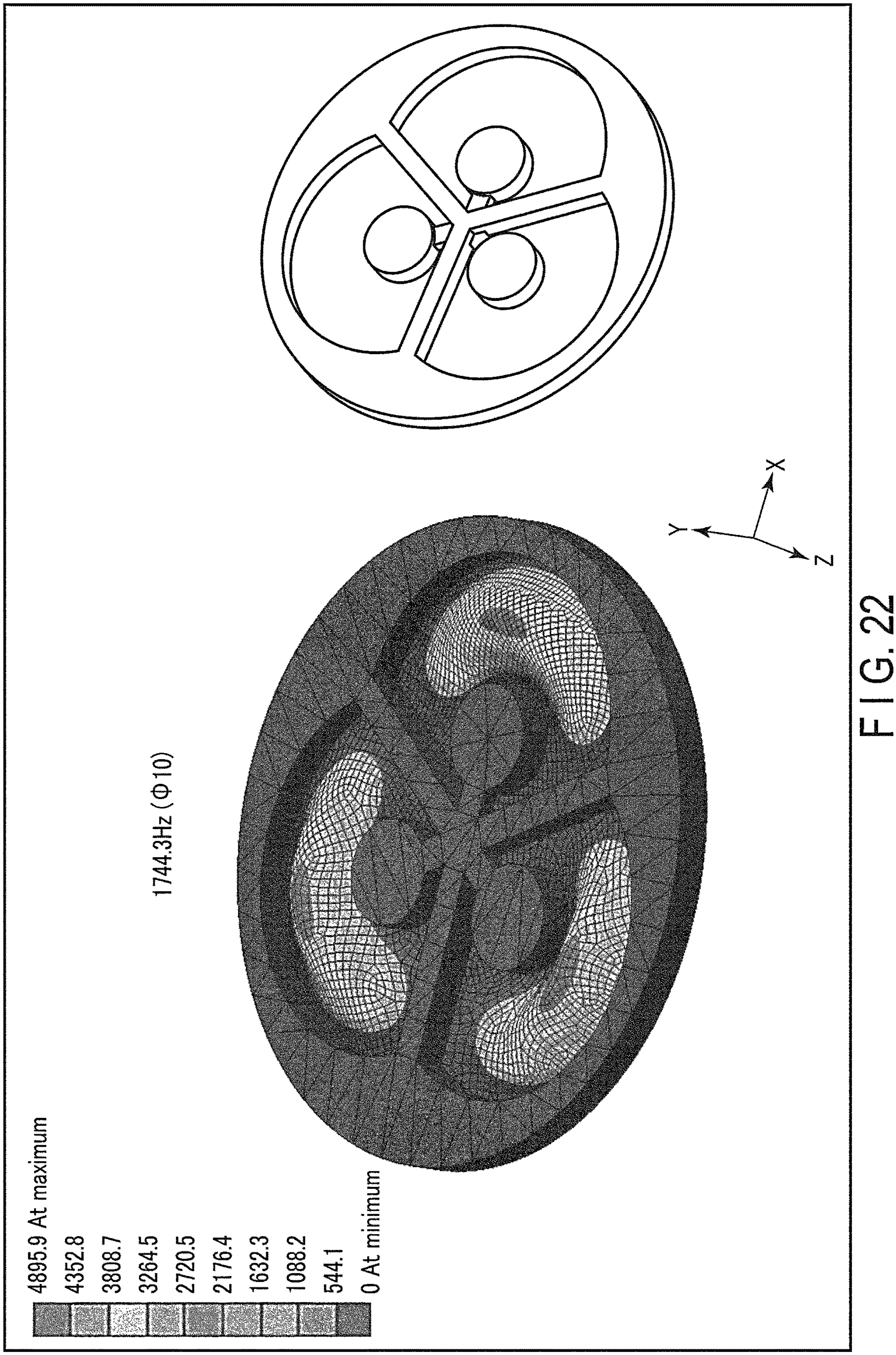
FIG. 22 is a diagram showing vibration of a combination of the diaphragm and a supporting member according to the embodiment.
Figure 23:
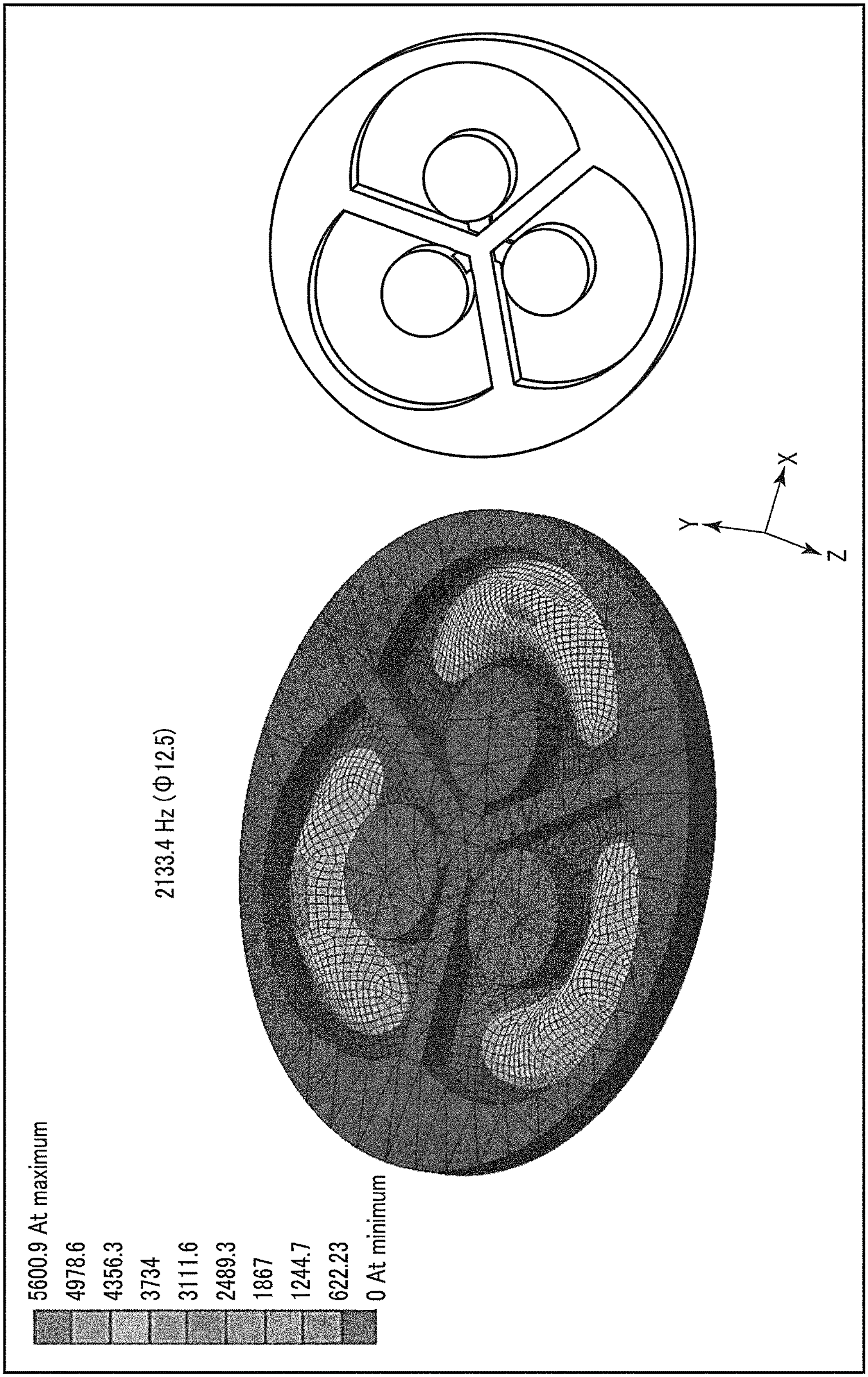
FIG. 23 is a diagram showing vibration of a combination of the diaphragm and a supporting member according to the embodiment.
Figure 24:
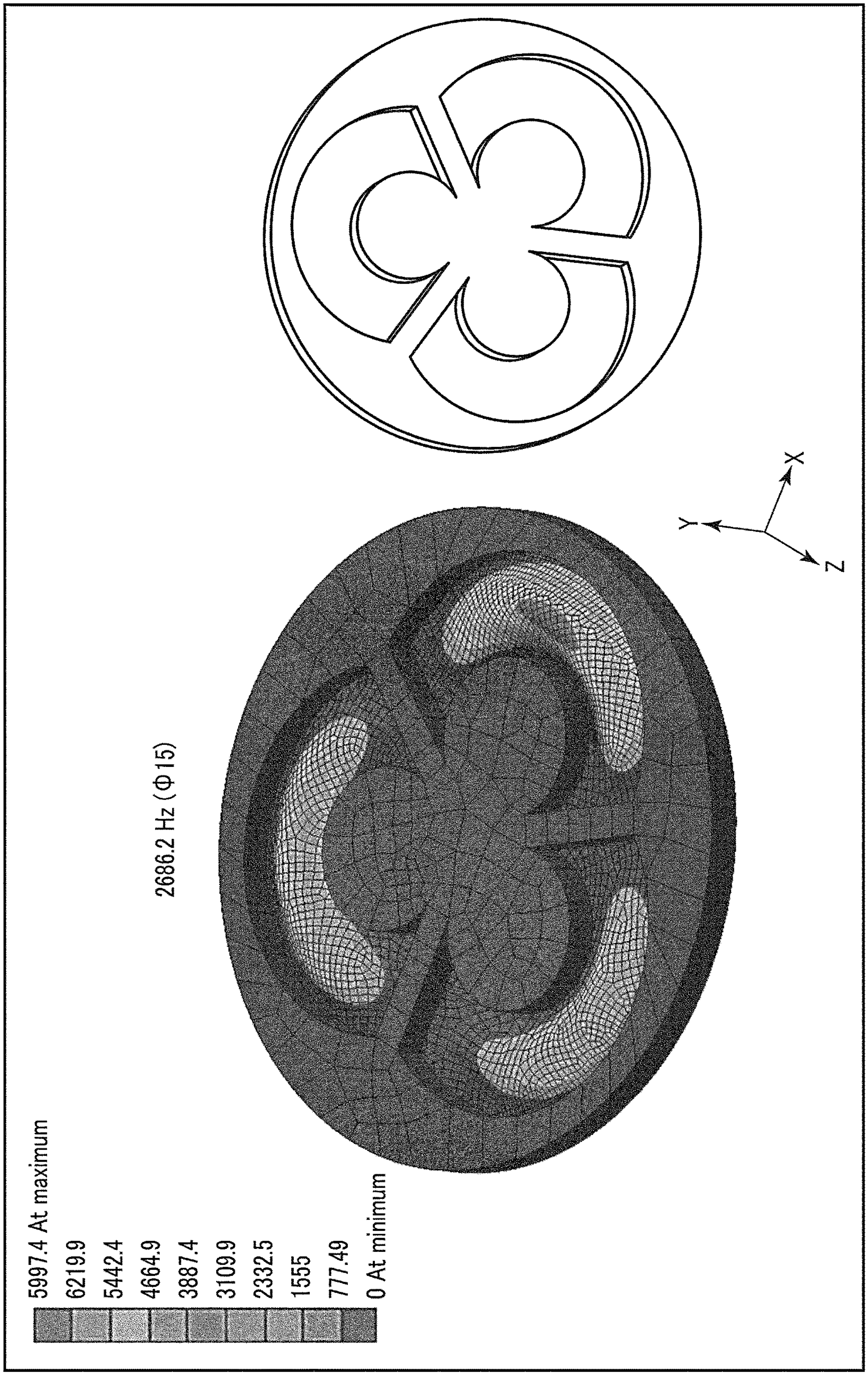
FIG. 24 is a diagram showing vibration of a combination of the diaphragm and a supporting member according to the embodiment.

FIGS. 22, 23, and 24 show results of analyzing vibration of the diaphragm 13 in a case where the diameter of each central member 142 is set to 10 mm, 12.5 mm, and 15 mm. The natural frequency of the diaphragm 13 is 1744.3 Hz in a case where the diameter of each central member 142 is 10 mm as shown in FIG. 22, 2133.4 Hz in a case where the diameter of each central member 142 is 12.5 mm as shown in FIG. 23, and 2686.2 Hz in a case where the diameter of each central member 142 is 15 mm as shown in FIG. 24. The larger the diameter of each central member 142, the higher the natural frequency of the diaphragm vibration. In this manner, by changing the diameter of each central member 142, it is possible to greatly change the natural frequency of the diaphragm vibration. Therefore, in a case where it is desired to greatly change the natural frequency of the diaphragm vibration, the third variation is desirable. Although a connecting member 143 is not included in the example shown in FIG. 24, such a case is also included in the scope of the claims.

Figure 26:
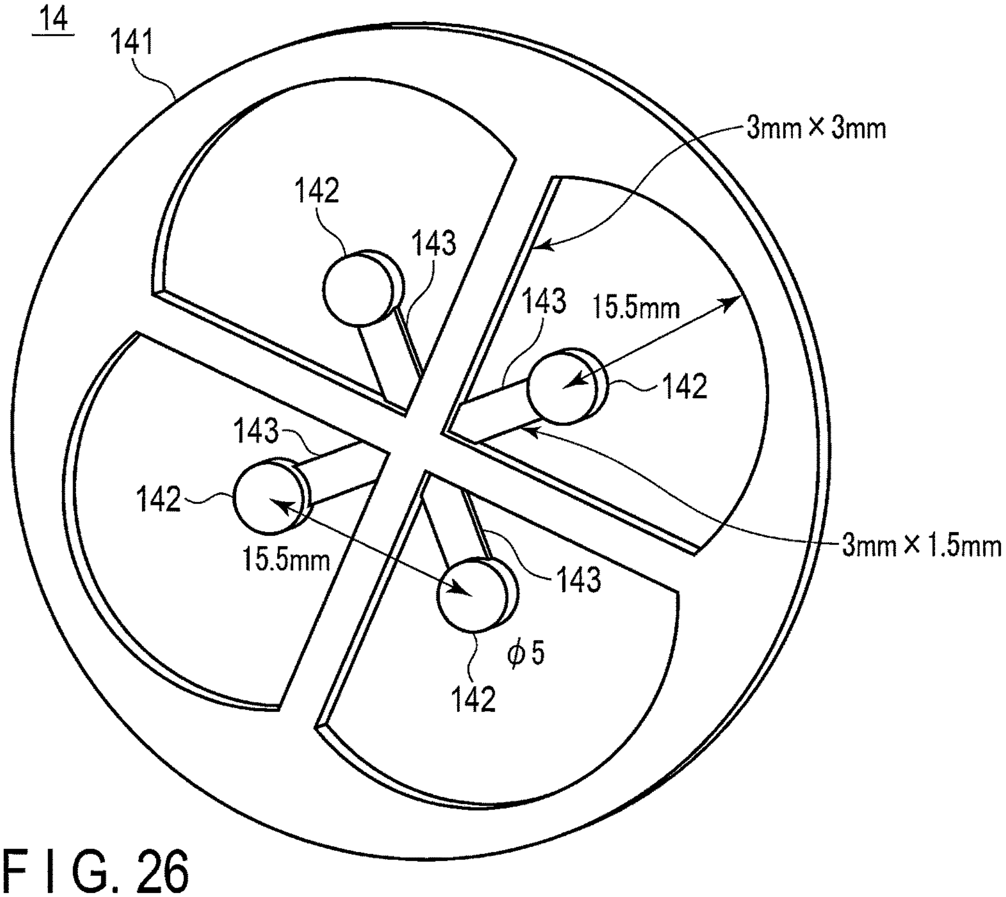
FIG. 26 is a perspective view showing the supporting member according to the embodiment.

FIG. 26 schematically shows an example of the supporting member 14 according to the third variation in accordance with the design method shown in FIG. 25. As shown in FIG. 26, the supporting member 14 includes a frame 141, four central members 142, and four connecting members 143. The central members 142 are disposed at positions equidistant from each other and equidistant from the center of the supporting member 14. Each of the central members 142 is supported by the corresponding connecting member 143 with respect to the frame 141.

In FIG. 25, the radius of a circle 251 corresponding to the inner peripheral circle of the frame 141 is denoted by R, the radius of each of four inscribed circles 252 inscribed in the circle 251 is denoted by r, and the distance between the centers of the inscribed circles 252 is denoted by d. The radius r is made equal to the distance d. In this case, $2R \approx 3.2d$. For example, in a case where $2R=54$ mm, $d=15.5$ mm as shown in FIG. 26. The frame 141 is extended to a region 253 between the circle 251 and the inscribed circles 252 shown in FIG. 25, and is further extended to the center of the circle 251 along boundary lines 254 between the inscribed circles 252. The cross sections of portions extended along the boundary lines 254 between the inscribed circles 252 are squares having a width of 3 mm and a height of 3 mm. The central members 142 are disposed at the centers of the inscribed circles 252. Each of the central members 142 is a cylinder having a diameter of 5 mm and a height of 3 mm. Each of the central members 142 is connected to the central portion of the frame 141 via the connecting member 143 corresponding to the central member 142. The cross sections of the connecting members 143 are rectangles having a width of 3 mm and a height of 1.5 mm.

Figure 27:
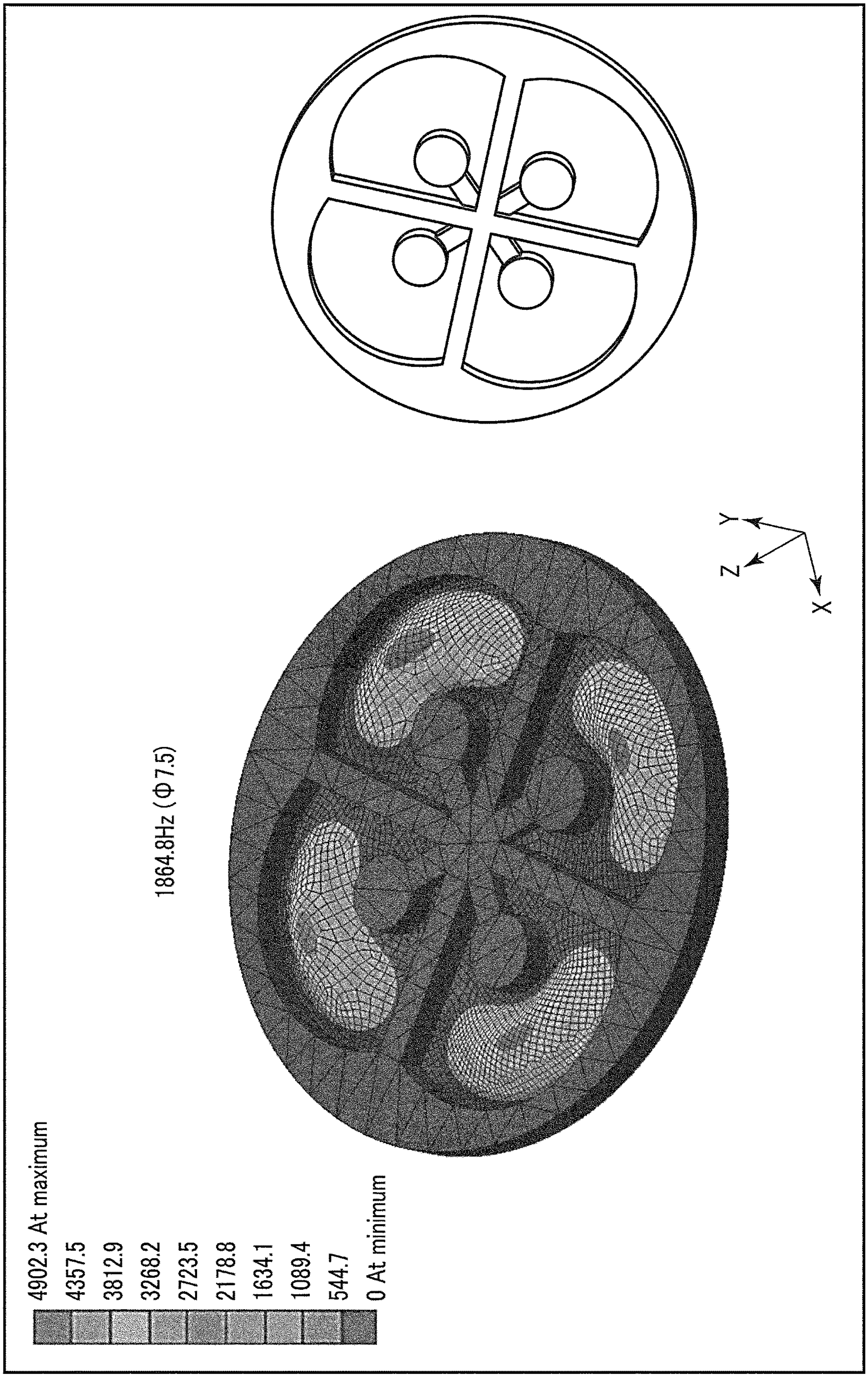
FIG. 27 is a diagram showing vibration of a combination of the diaphragm and the supporting member according to the embodiment.
Figure 28:
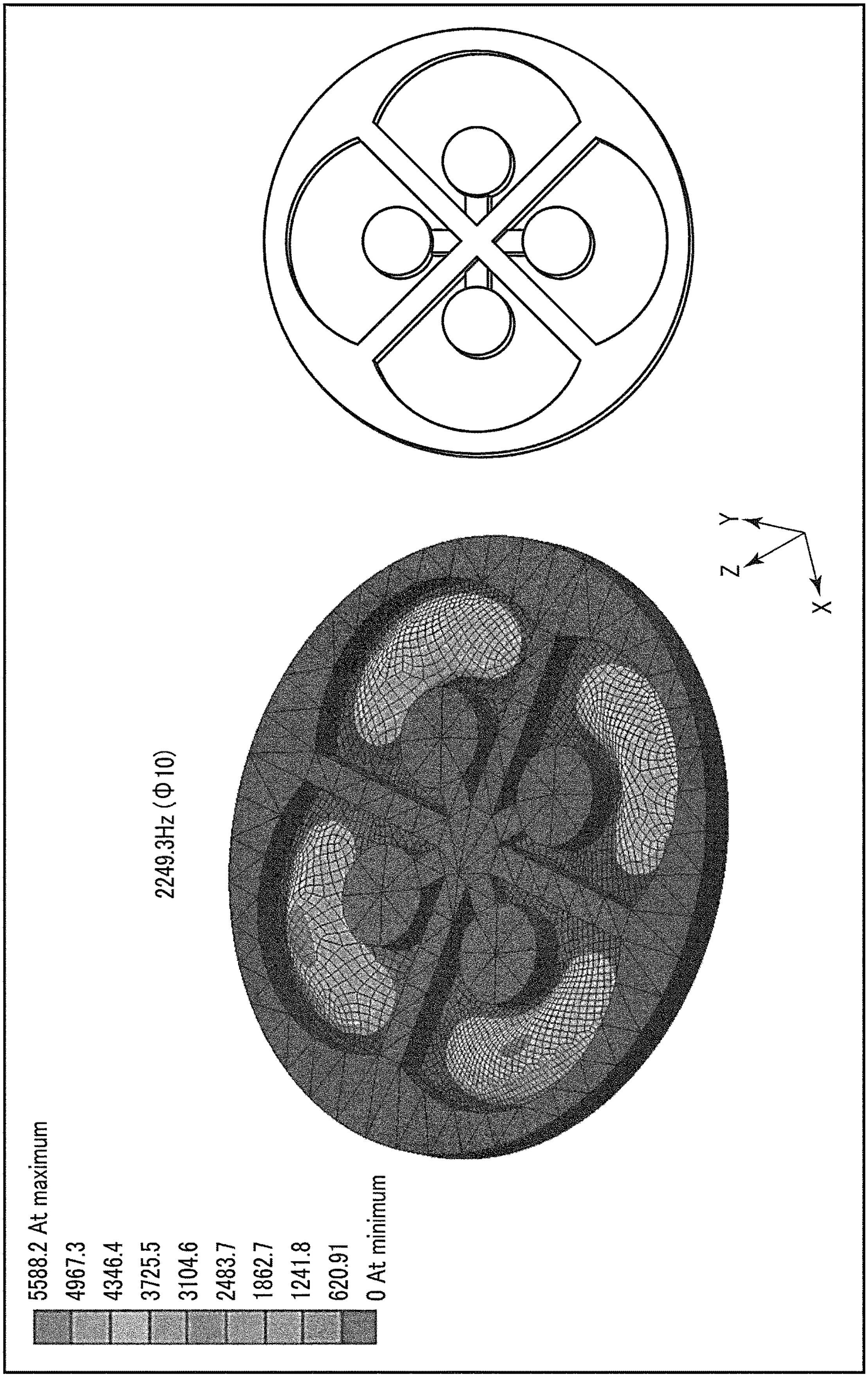
FIG. 28 is a diagram showing vibration of a combination of the diaphragm and a supporting member according to the embodiment.
Figure 29:
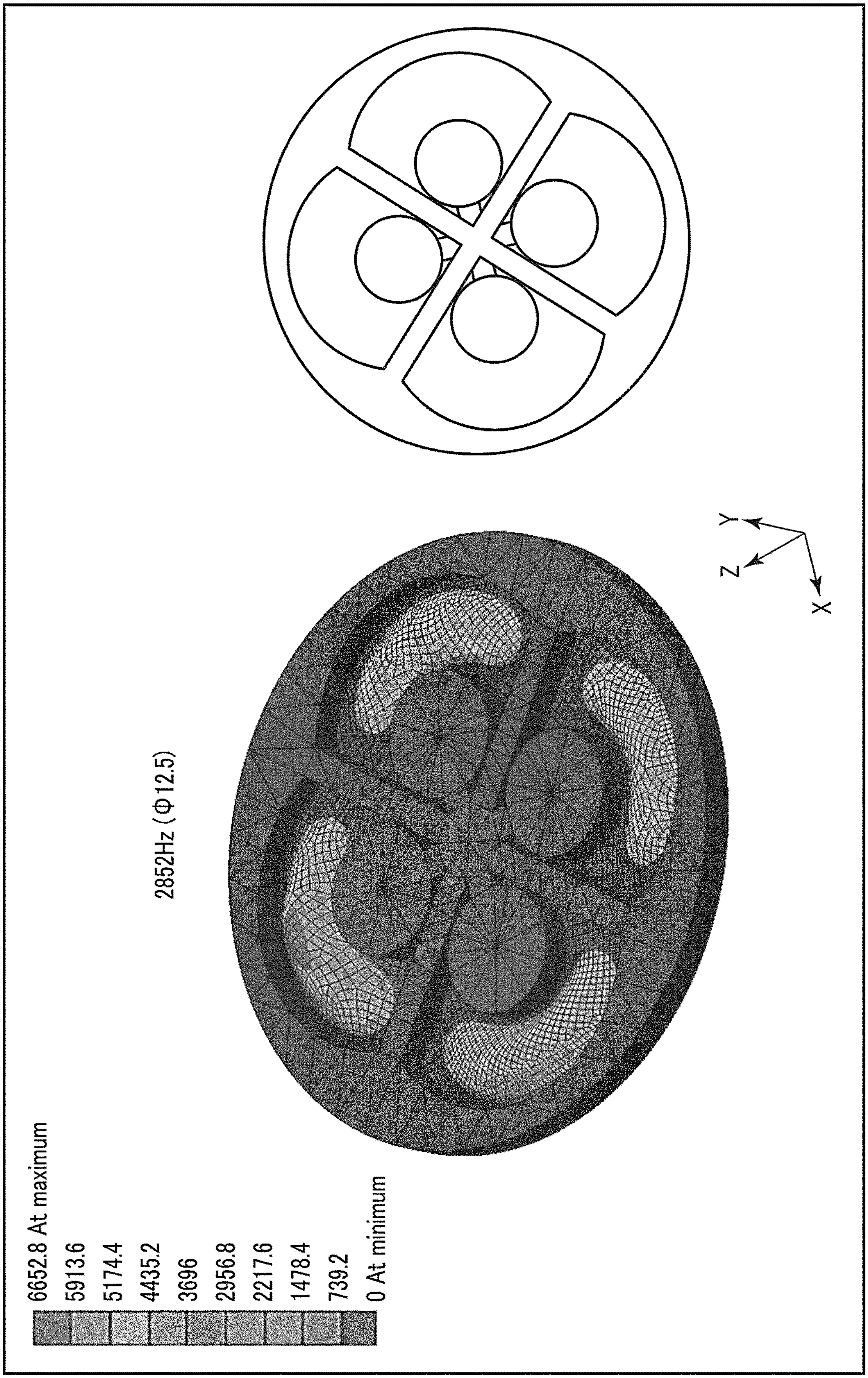
FIG. 29 is a diagram showing vibration of a combination of the diaphragm and a supporting member according to the embodiment.

FIGS. 27, 28, and 29 show results of analyzing vibration of the diaphragm 13 in a case where the diameter of each central member 142 is set to 7.5 mm, 10 mm, and 12.5 mm. The natural frequency of the diaphragm 13 is 1864.8 Hz in a case where the diameter of each central member 142 is 7.5 mm as shown in FIG. 27, 2249.3 Hz in a case where the diameter of each central member 142 is 10 mm as shown in FIG. 28, and 2852 Hz in a case where the diameter of each central member 142 is 12.5 mm as shown in FIG. 29. The larger the diameter of each central member 142, the higher the natural frequency of the diaphragm vibration. As described above, by changing the diameter of each central member 142, it is possible to greatly change the natural frequency of the diaphragm vibration. Therefore, in a case where it is desired to greatly change the natural frequency of the diaphragm vibration, the third variation is desirable.

The effect of finely adjusting the damping effect by changing the shape of the connecting member 143 is similar to that described above for the first variation and the second variation.

EXAMPLES

A method for designing the sound absorption apparatus 10 according to the embodiment will be described.

Figure 30A:
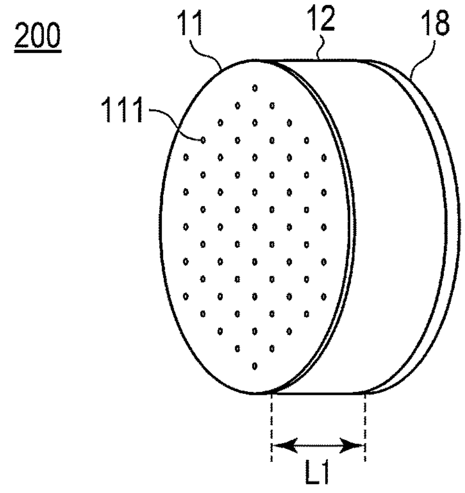
FIG. 30A is a perspective view showing a structure for measuring sound absorption characteristics of a front plate according to an example.
Figure 30B:
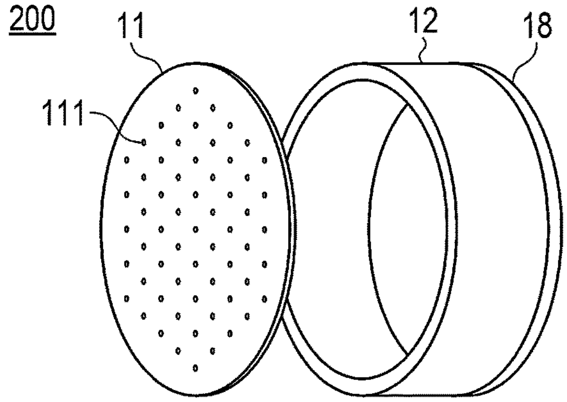
FIG. 30B is an exploded view showing the structure for measuring the sound absorption characteristics of the front plate according to the example.
Figure 30C:
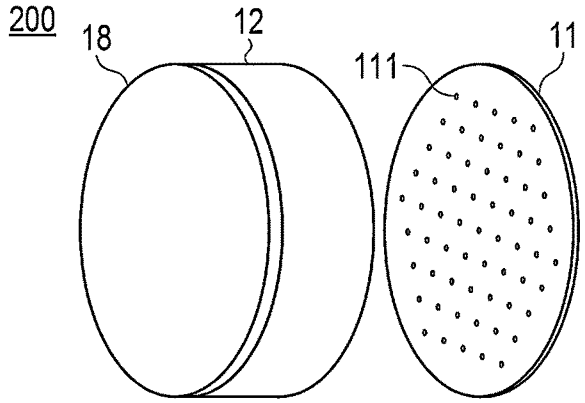
FIG. 30C is an exploded view showing the structure for measuring the sound absorption characteristics of the front plate according to the example.

The method for designing the sound absorption apparatus 10 includes measuring Helmholtz resonator characteristics of the front plate 11. FIGS. 30A, 30B, and 30C schematically show a structure (Helmholtz resonator) 200 for measuring the Helmholtz resonator characteristics of the front plate 11. As shown in FIGS. 30A, 30B, and 30C, the structure 200 includes the front plate 11, the frame 12, and a back plate 18. The front plate 11 is connected to the frame 12 so as to close the first opening end of the frame 12, and the back plate 18 is connected to the frame 12 so as to close the second opening end of the frame 12. The front plate 11 and the back plate 18 are separated from each other by a length L1, while facing each other. The front plate 11, the frame 12, and the back plate 18 form an internal space corresponding to the internal space 31 shown in FIG. 3. A plurality of frames 12 having different thicknesses L1 are prepared, and the normal incident sound absorption coefficient of the structure 200 is measured for each of the frames 12.

Figure 31:
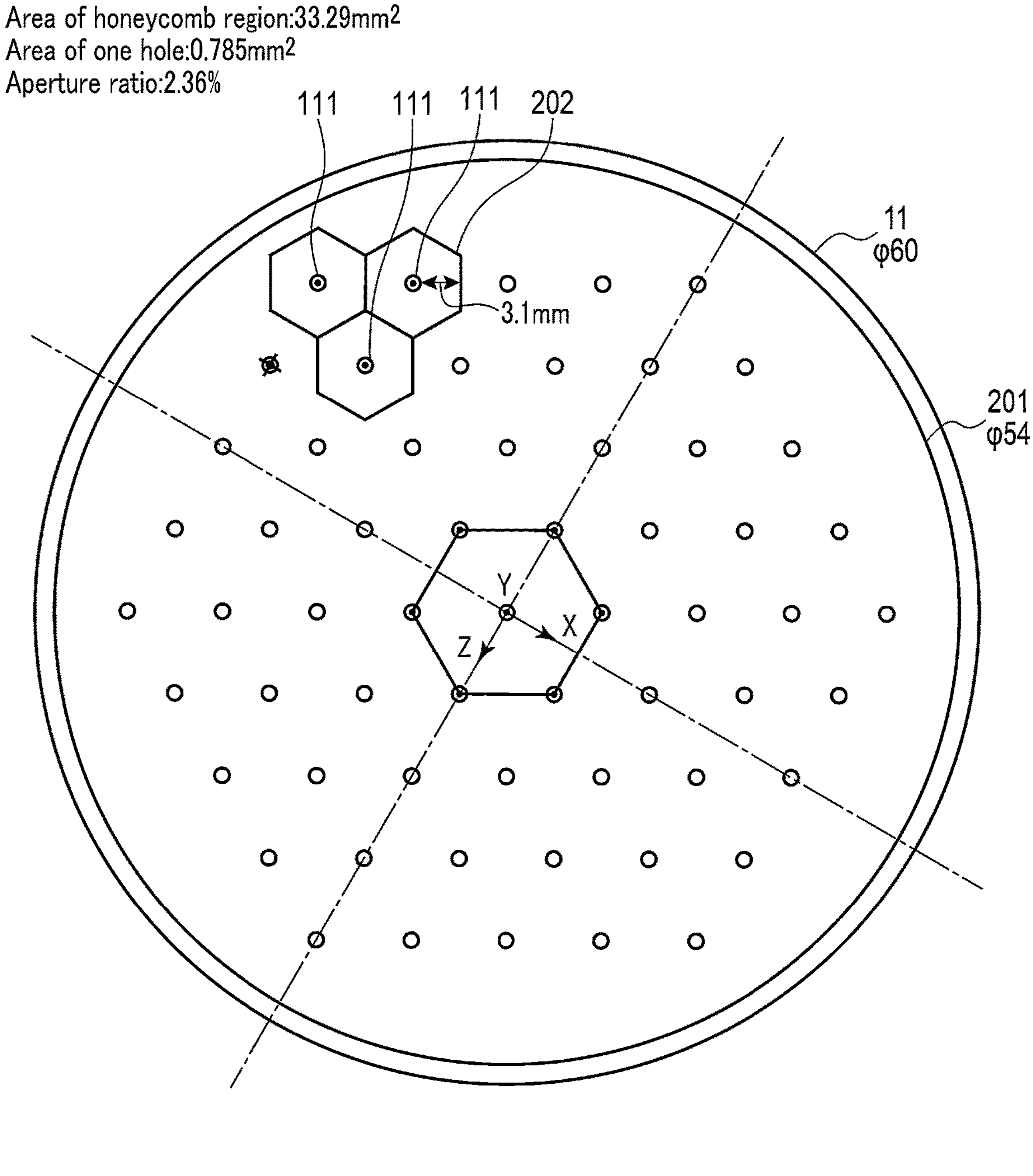
FIG. 31 is a plan view showing a structure of the front plate according to the example.

FIG. 31 schematically shows a structure of the front plate 11 commonly used in the following Examples. As shown in FIG. 31, the front plate 11 has a diameter of 60 mm and a thickness of 1 mm. 61 sound holes 111 are provided in a honeycomb arrangement in a circle 201 defined on the front plate 11 and having a diameter of 54 mm. The apothem of a regular hexagon (honeycomb region) 202 forming the honeycomb arrangement is 3.1 mm, and the area of the regular hexagon 202 is 33.29 $mm^2$. Each of the sound holes 111 has a diameter of 1 mm and an area of 0.758 $mm^2$. Therefore, the aperture ratio is 2.36%. The frame 12 is a cylinder having an inner diameter of 54 mm, an outer diameter of 60 mm, and a thickness of L1. The back plate 18 is a circular flat plate having a diameter of 60 mm.

Figure 32:
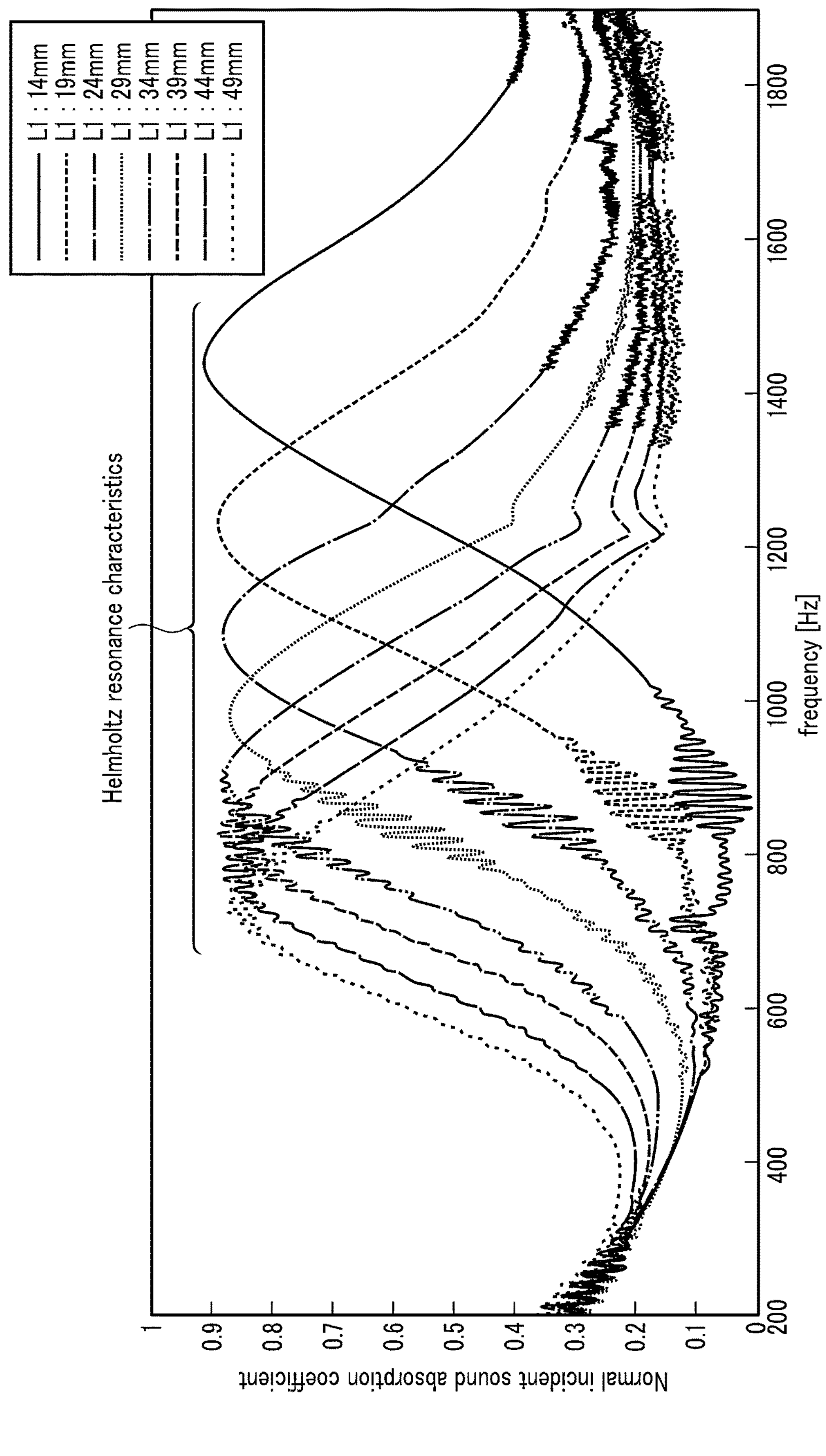
FIG. 32 is a graph showing results of measuring the sound absorption characteristics of the front plate according to the example.
Figure 33:
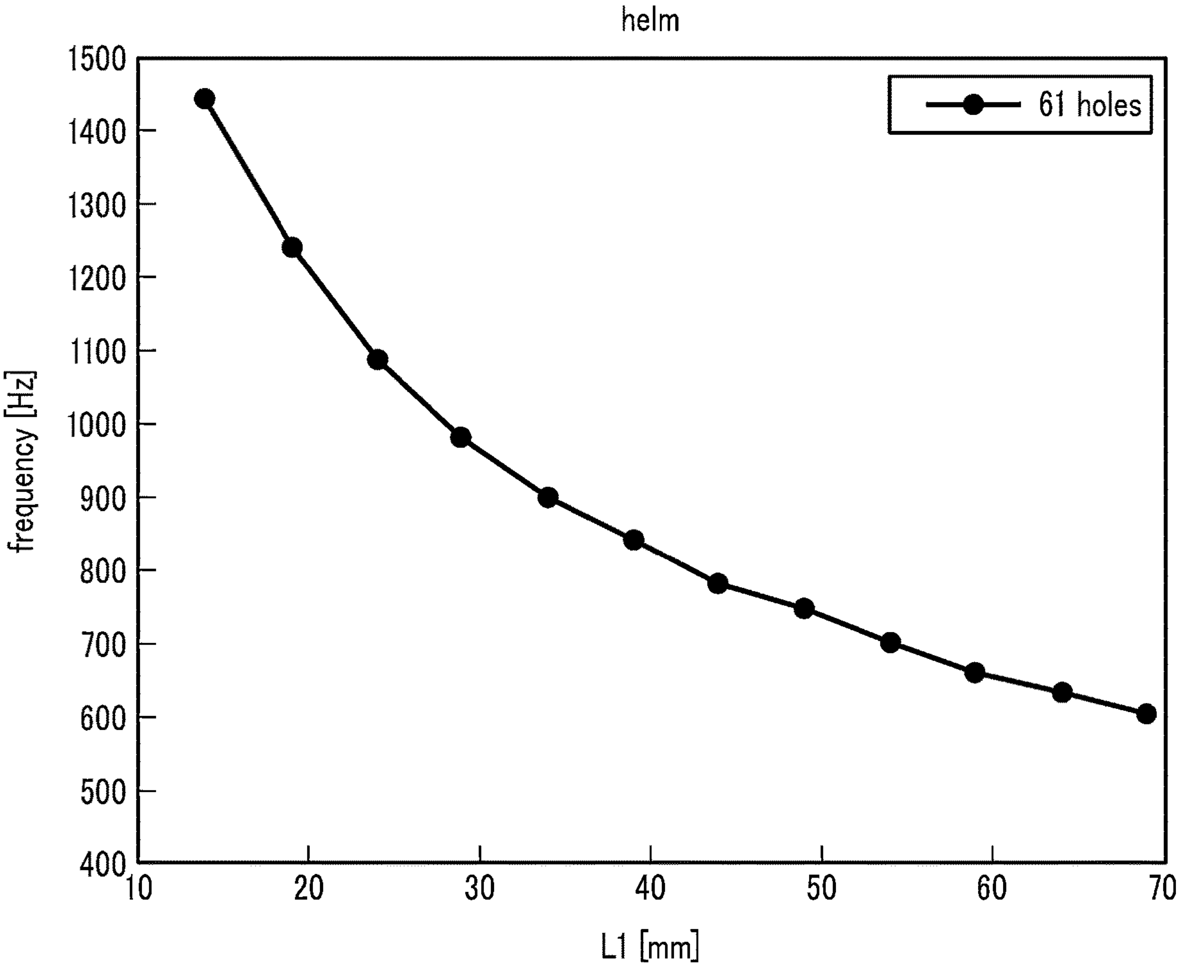
FIG. 33 is a graph showing a plot of a Helmholtz resonance frequency with respect to a thickness L1 obtained from FIG. 32.

FIG. 32 shows results of measuring sound absorption characteristics of the structure 200, and FIG. 33 shows a plot of the Helmholtz resonance frequency with respect to the thickness L1 of the frame 12. It can be confirmed from FIGS. 32 and 33 that the Helmholtz resonance frequency depends on the thickness L1 of the frame 12 (that is, the volume of the internal space). Therefore, the Helmholtz resonance frequency can be adjusted by adjusting the thickness L1 of the frame 12.

Figure 34A:
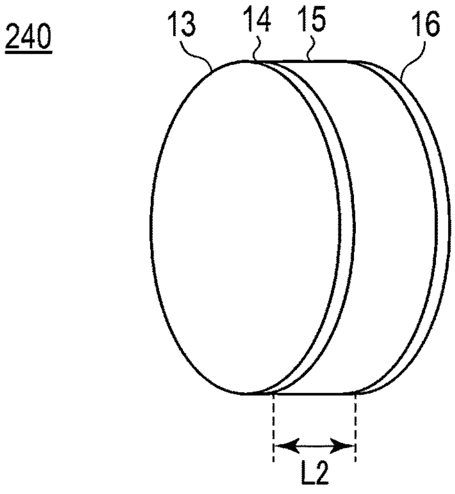
FIG. 34A is a perspective view showing a structure for measuring sound absorption characteristics of a combination of a diaphragm and a supporting member according to an example.
Figure 34B:
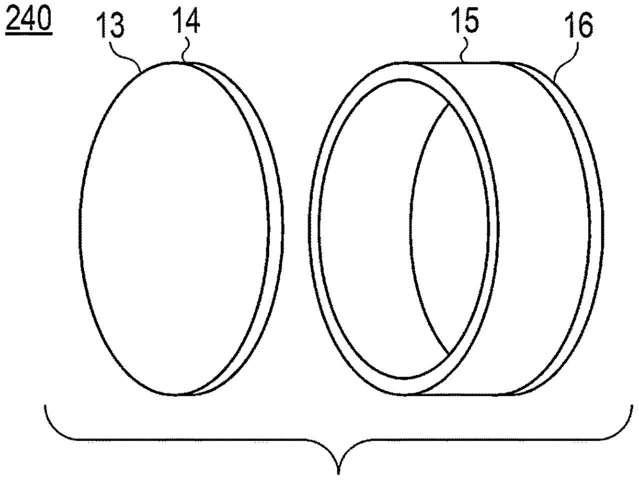
FIG. 34B is an exploded view showing the structure for measuring the sound absorption characteristics of the combination of the diaphragm and the supporting member according to the example.
Figure 34C:
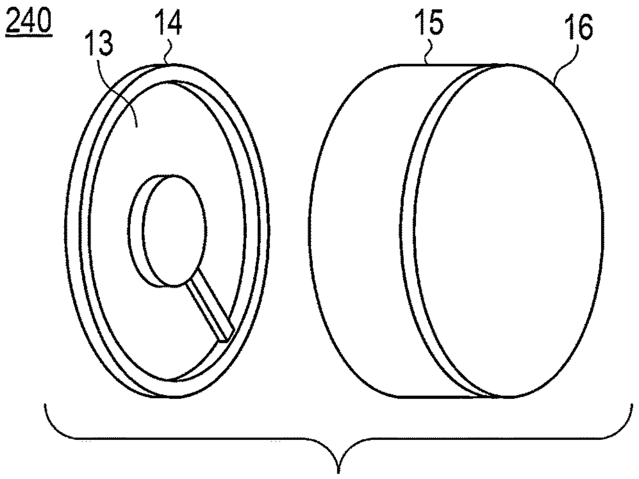
FIG. 34C is an exploded view showing the structure for measuring the sound absorption characteristics of the combination of the diaphragm and the supporting member according to the example.

The method for designing the sound absorption apparatus 10 further includes measuring sound absorption characteristics of the combination of the diaphragm 13 and the supporting member 14. FIGS. 34A, 34B, and 34C schematically show a structure 240 for measuring the sound absorption characteristics of the combination of the diaphragm 13 and the supporting member 14. As shown in FIGS. 34A, 34B, and 34C, the structure 240 includes the diaphragm 13, the supporting member 14, the frame 15, and the back plate 16. The combination of the diaphragm 13 and the supporting member 14 is connected to the frame 15 so as to close the first opening end of the frame 15, and the back plate 16 is connected to the frame 15 so as to close the second opening end of the frame 15. The combination of the diaphragm 13 and the supporting member 14 is separated from the back plate 16 by the length L2, while facing the back plate 16. The diaphragm 13, the supporting member 14, the frame 15, and the back plate 16 form an internal space corresponding to the internal space 32 shown in FIG. 3. A plurality of frames 15 having different thicknesses L2 are prepared, and the normal incident sound absorption coefficient of the structure 240 is measured for each of the frames 15.

In the following Examples, a hard vinyl chloride film having a thickness of 0.2 mm was used as the diaphragm 13, and the diaphragm 13 was attached to the supporting member 14 with a thin double-sided tape. The supporting member 14 was manufactured by fused deposition modeling using a 3D printer. ABS (Acrylonitrile Butadiene Styrene) was used as the material of the supporting member 14, and the lamination pitch and the density of the supporting member 14 were set to 0.127 mm and solid, respectively, in the 3D printer.

The method for designing the sound absorption apparatus 10 further includes determining, as a candidate, a combination of a frame 12 and a frame 15 that is likely to obtain desirable sound absorption characteristics, based on results of measuring the Helmholtz resonator characteristics of the front plate 11 and results of measuring the sound absorption characteristics of the combination of the diaphragm 13 and the supporting member 14.

The method for designing the sound absorption apparatus 10 further includes preparing a sound absorption apparatus 10 corresponding to each candidate, measuring sound absorption characteristics of the sound absorption apparatus 10 for each candidate, and determining a combination of a frame 12 and a frame 15 that can obtain the desirable sound absorption characteristics.

The above-described method for designing the sound absorption apparatus 10 makes it possible to easily select a combination of the thickness L1 of the frame 12 and the thickness L2 of the frame 15 that maximizes the sound absorption performance of the sound absorption apparatus 10.

Example 1

Figure 35:
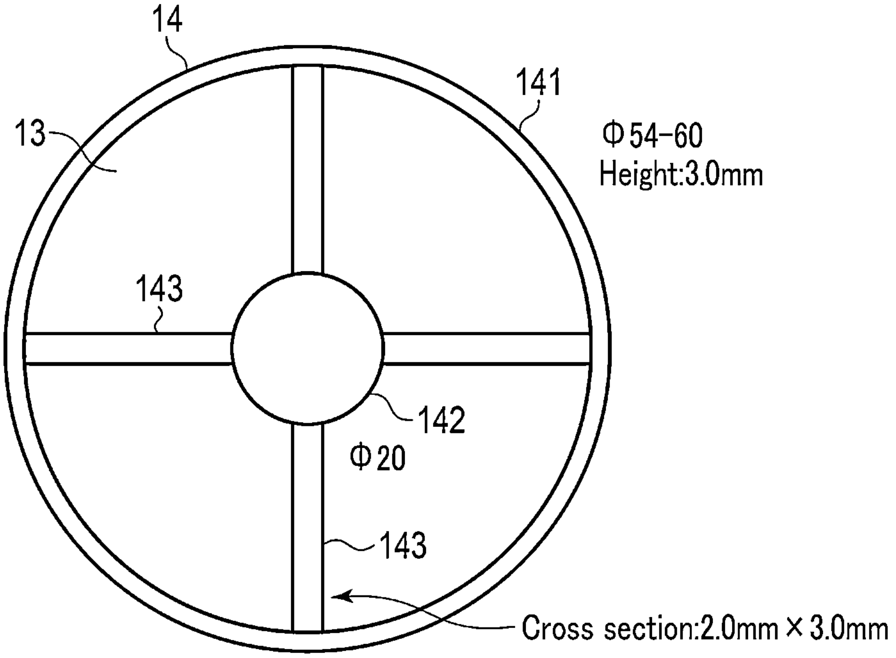
FIG. 35 is a plan view showing a combination of a diaphragm and a supporting member according to Example 1.

Example 1 relates to the first mode. In Example 1, a supporting member 14 has a structure shown in FIG. 35.

Specifically, the supporting member 14 includes a frame 141, a central member 142, and four connecting members 143. Each of the connecting members 143 is a linear beam member, and has a cross section that is a rectangle having a width of 3 mm and a height of 2 mm. The central member 142 is a cylindrical member having a diameter of 20 mm and a height of 3 mm. The frame 141 is an annular member having an inner diameter of 54 mm, an outer diameter of 60 mm, and a height of 3 mm. The frame 141, the central member 142, and the connecting members 143 were integrally molded with ABS using a 3D printer. In addition, in order to improve the damping effect, two hard vinyl chloride films having a thickness of 0.2 mm were stacked and used as the diaphragm 13.

Figure 36:
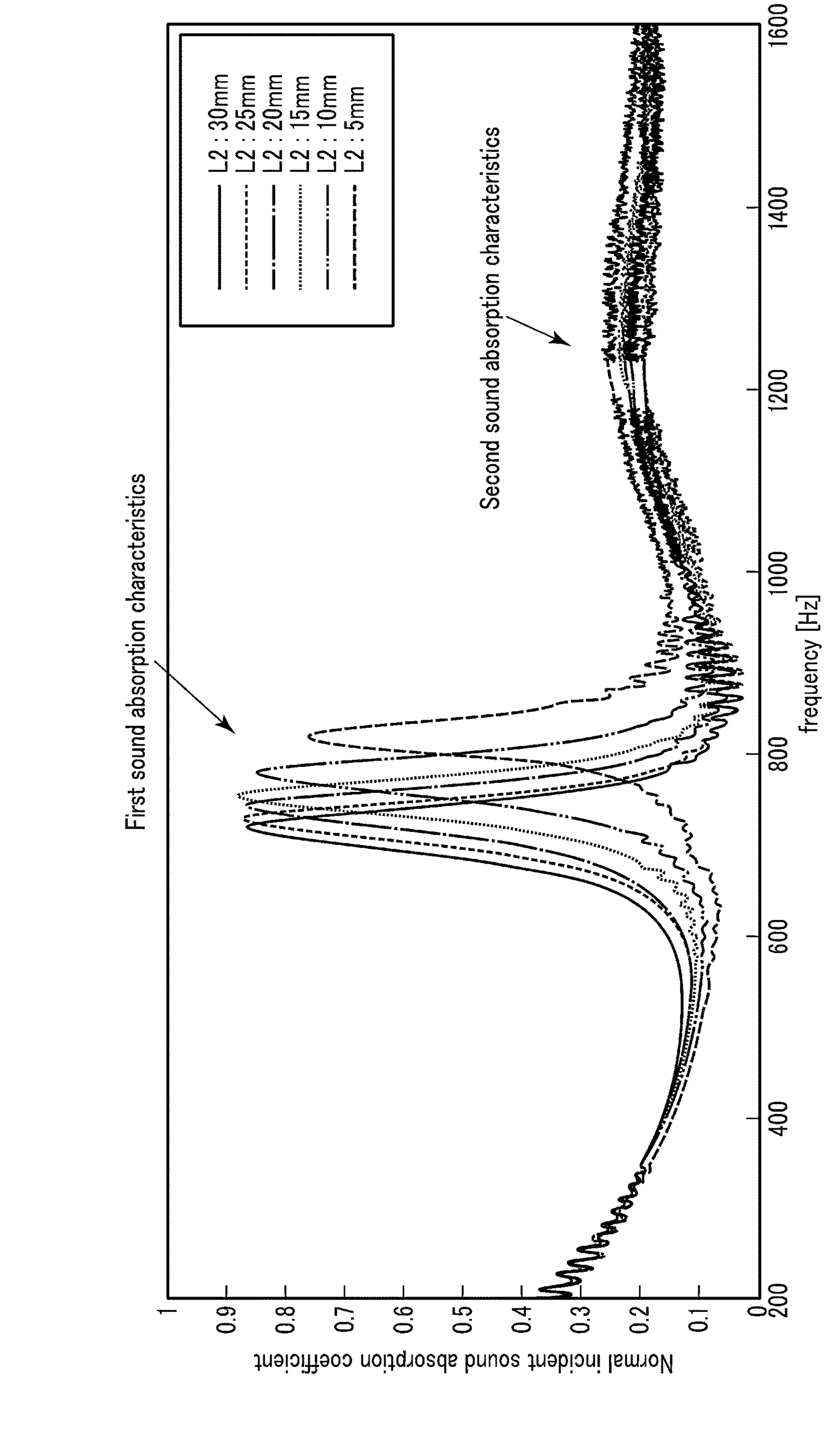
FIG. 36 is a graph showing results of measuring sound absorption characteristics of the combination of the diaphragm and the supporting member according to Example 1.
Figure 37:
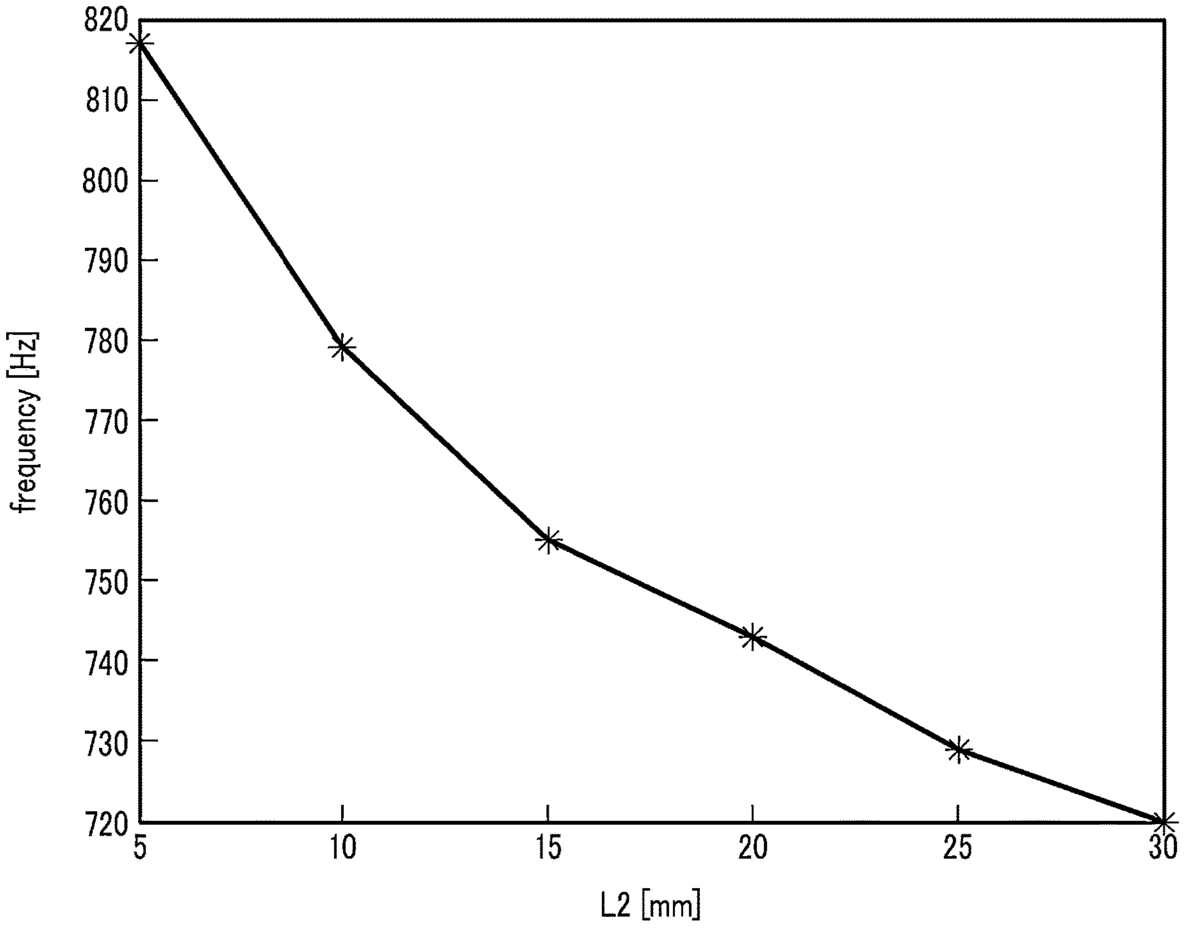
FIG. 37 is a graph showing a plot of a natural frequency of a first sound absorption characteristic with respect to a thickness L2 obtained from FIG. 36.

FIG. 36 shows results of measuring sound absorption characteristics of a combination of the diaphragm 13 and the supporting member 14 according to Example 1. From FIG. 36, the first sound absorption characteristic and the second sound absorption characteristic can be confirmed. FIG. 37 shows a plot of the natural frequency of the first sound absorption characteristic with respect to the thickness L2 of the frame 15. It can be confirmed from FIG. 37 that the natural frequency of the first sound absorption characteristic obtained by the combination of the diaphragm 13 and the supporting member 14 can be adjusted by adjusting the thickness L2 of the frame 15.

Figure 38:
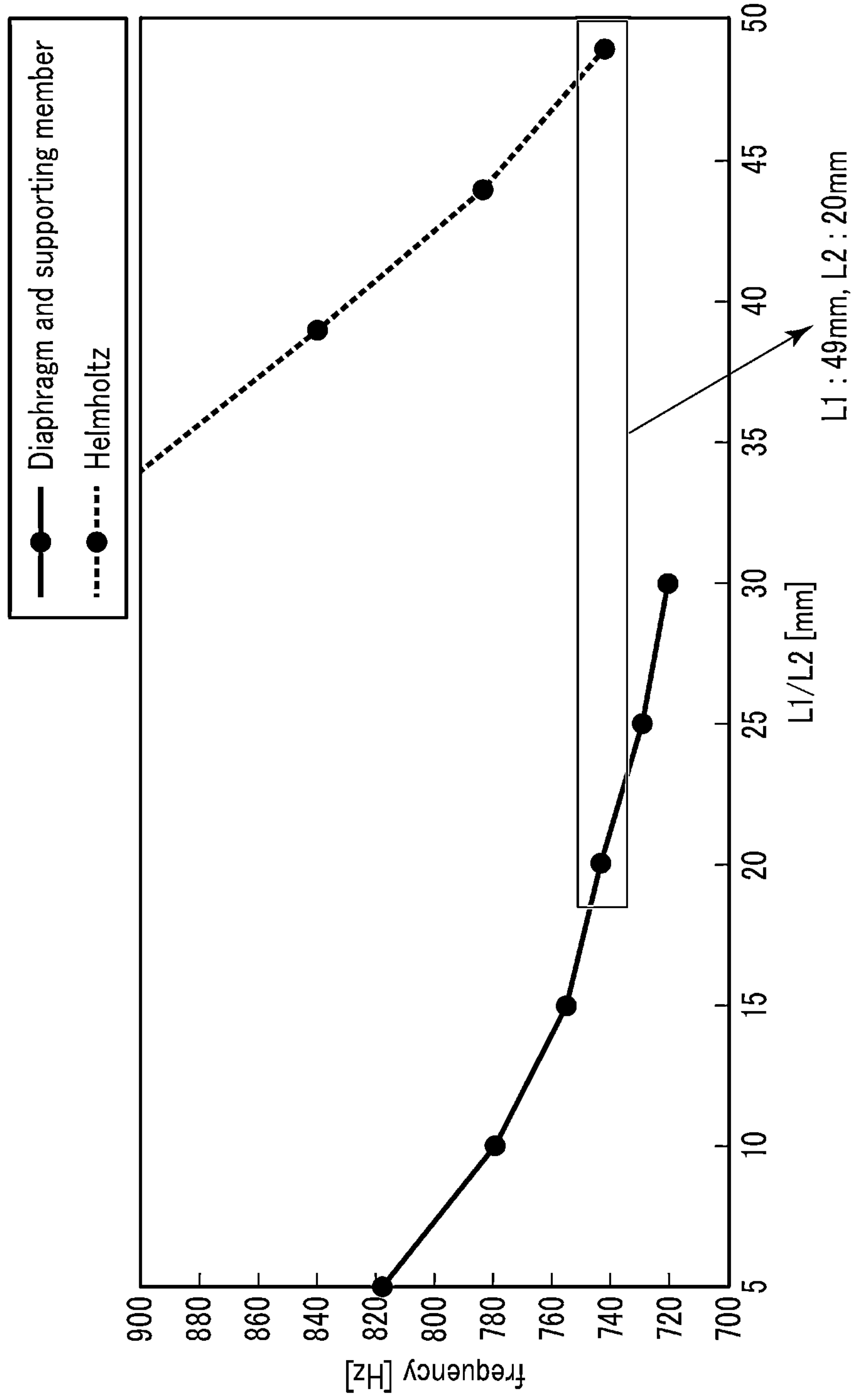
FIG. 38 is a diagram for explaining a method for determining a combination of a thickness L1 and a thickness L2 according to Example 1.

In the first mode, a combination of the thickness L1 of the frame 12 and the thickness L2 of the frame 15 is determined as a candidate according to a guideline for making the natural frequency of the first sound absorption characteristic and the Helmholtz resonance frequency approximately match each other. FIG. 38 shows both the graph shown in FIG. 33 and the graph shown in FIG. 37. As shown in FIG. 38, in a case where L1=49 mm and L2=20 mm, the natural frequency of the first sound absorption characteristic approximately matches the Helmholtz resonance frequency. Therefore, a combination of L1=49 mm and L2=20 mm is determined as a candidate. Based on this candidate, a further candidate is determined. For example, a frame 15 with L2=20 mm and some frames 12 with a thickness L1 close to 49 mm are combined. Specifically, a combination of L1=34 mm and L2=20 mm, a combination of L1=39 mm and L2=20 mm, a combination of L1=44 mm and L2=20 mm, a combination of L1=49 mm and L2=20 mm, and a combination of L1=54 mm and L2=20 mm are determined as candidates. Among these candidates, a candidate having two sound absorption coefficient peaks close to each other and a high value of the sound absorption coefficient at the valley between the two peaks is determined as a final combination.

Figure 39:
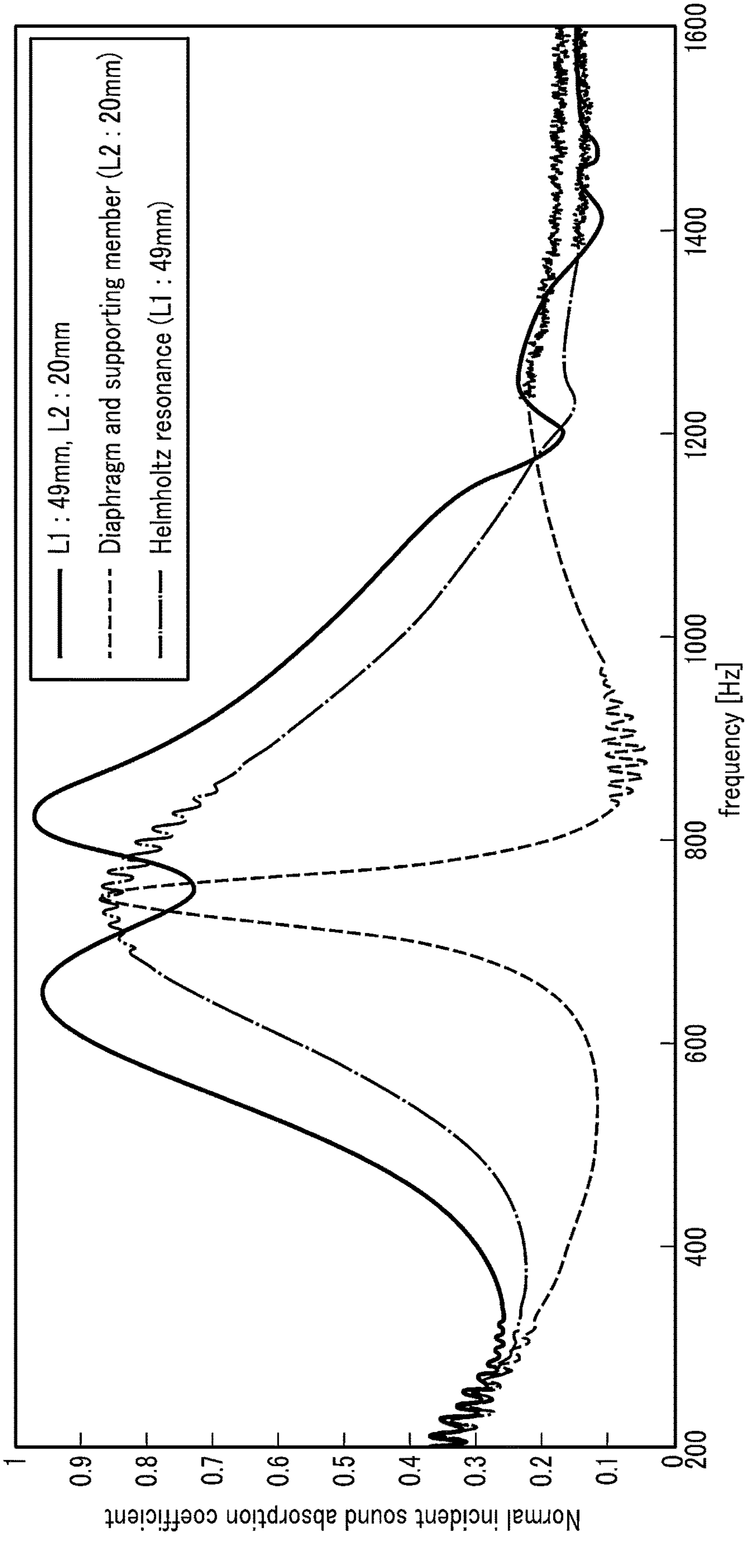
FIG. 39 is a graph showing results of measuring sound absorption characteristics of a sound absorption apparatus according to Example 1.

FIG. 39 shows results of measuring sound absorption characteristics of the sound absorption apparatus 10 according to Example 1 for a combination of L1=49 mm and L2=20 mm. In FIG. 39, a solid line indicates the sound absorption characteristics of the sound absorption apparatus 10. Two separate sound absorption coefficient peaks are obtained by the coupling of the Helmholtz resonance and the vibration of the combination of the diaphragm 13 and the supporting member 14, and a valley characteristic between the peaks shows a sound absorption coefficient of 0.7 or more. As compared with the sound absorption apparatus 50 according to the related art, it can be confirmed that the valley characteristic is significantly suppressed by the damping effect by the viscoelasticity of the diaphragm 13.

Figure 40:
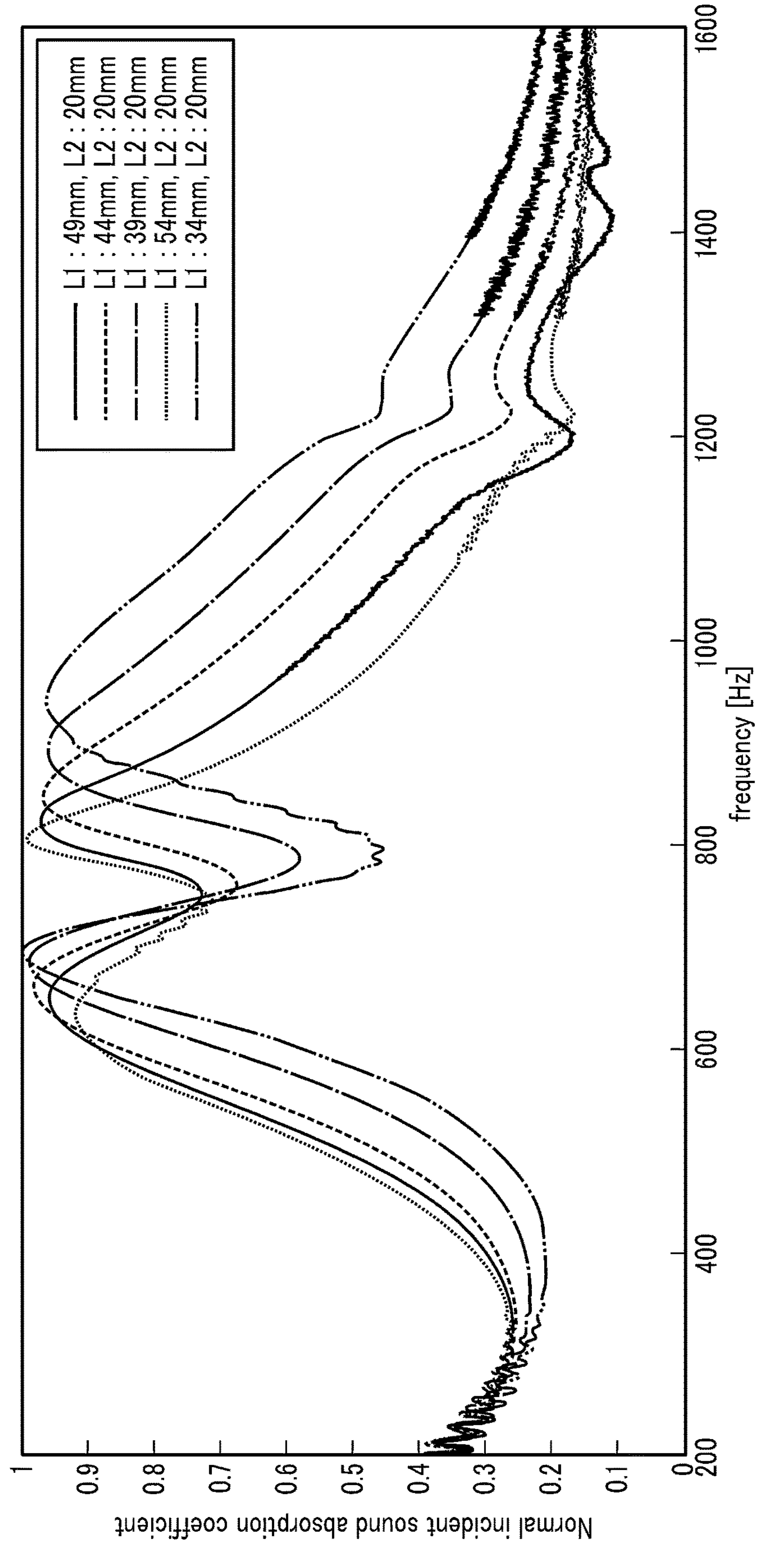
FIG. 40 is a graph showing results of measuring sound absorption characteristics of the sound absorption apparatus according to Example 1.

FIG. 40 shows results of measuring sound absorption characteristics of the sound absorption apparatus 10 according to Example 1 for each combination of the thickness L1 and the thickness L2. As shown in FIG. 40, in a case where L1=44 mm, the valley becomes slightly deeper as compared with the case of L1=49 mm, but the sound absorption performance in the high frequency range is improved. The final combination is determined according to the purpose.

Next, it is shown that the damping effect is increased by increasing the thickness of the diaphragm 13.

Figure 41:
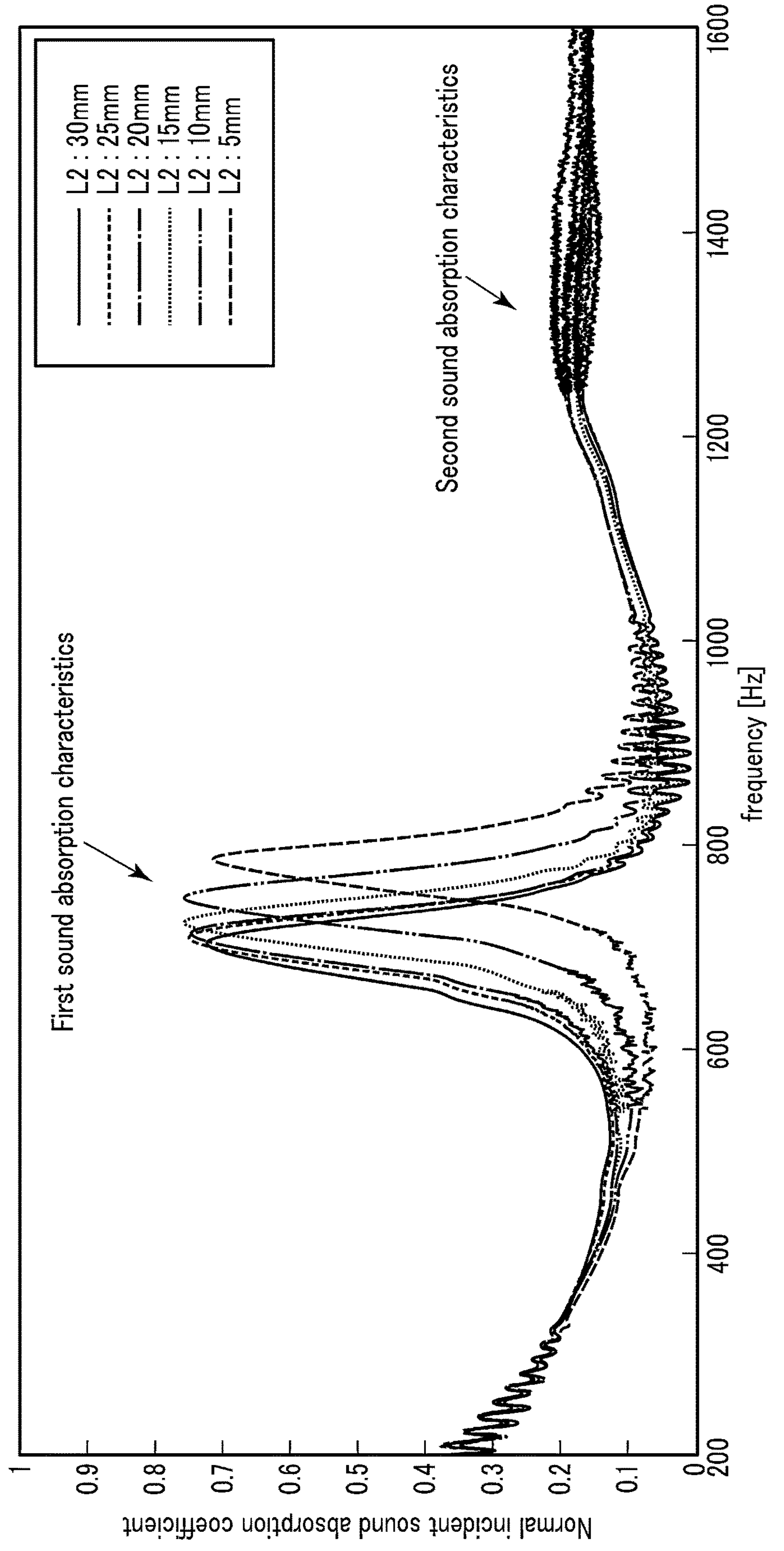
FIG. 41 is a graph showing results of measuring sound absorption characteristics of the combination of the diaphragm and the supporting member according to Example 1.
Figure 42:
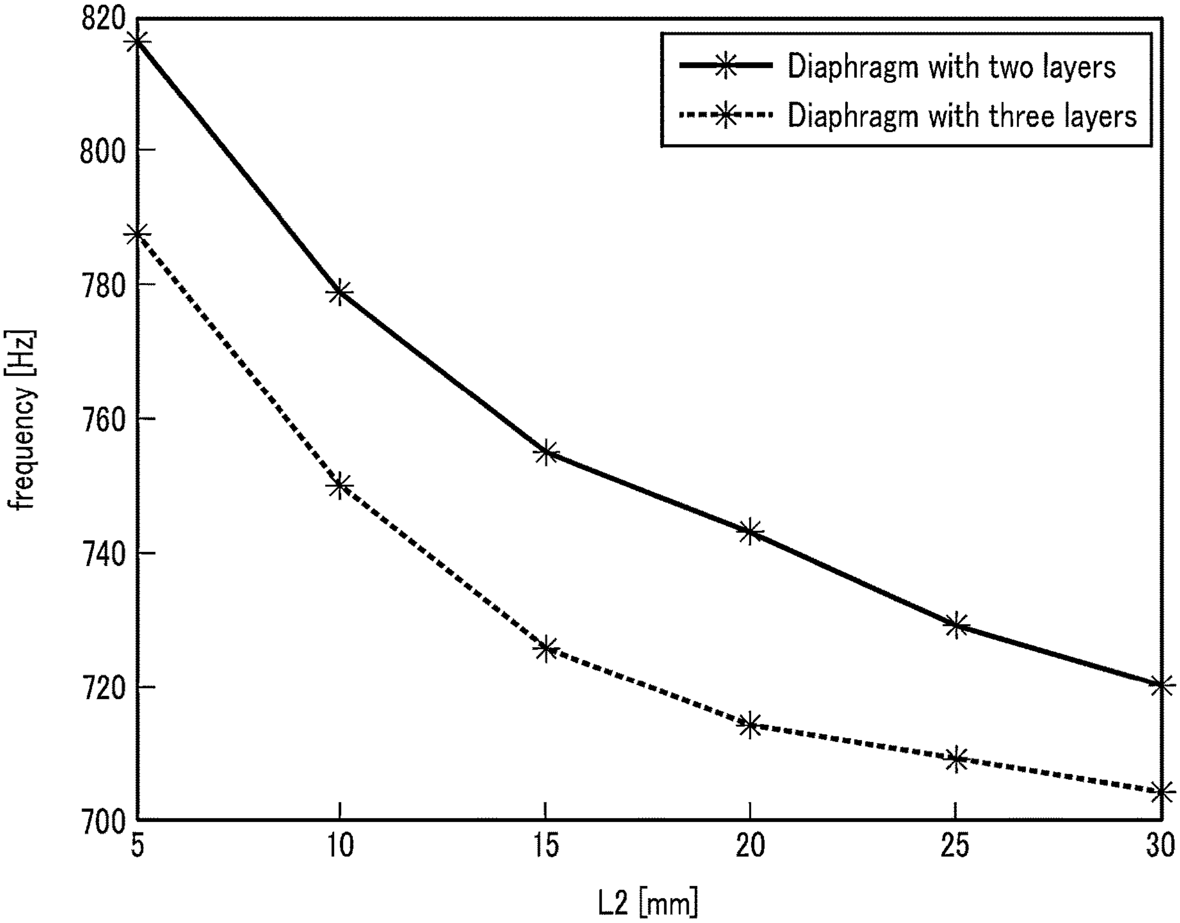
FIG. 42 is a graph showing a plot of a natural frequency of a first sound absorption characteristic with respect to the thickness L2 obtained from FIG. 41.

FIG. 41 shows results of measuring sound absorption characteristics of the combination of the diaphragm 13 and the supporting member 14 in the case of using three stacked hard vinyl chloride films having a thickness of 0.2 mm as the diaphragm 13. FIG. 42 shows a plot of the natural frequency of the first sound absorption characteristic with respect to the thickness L2 of the frame 15. In FIG. 42, the plot shown in FIG. 37 is also displayed. It can be confirmed from FIG. 42 that the natural frequency of the first sound absorption characteristic does not change much even in a case where the thickness of the diaphragm 13 is increased (even in a case where the film is changed from two stacked layers to three stacked layers). This is because the natural frequency of the first sound absorption characteristic is mainly determined based on the shapes of the central member 142 and the connecting members 143 of the supporting member 14. Therefore, by changing the thickness of the diaphragm 13, it is possible to suppress the change in the natural frequency and adjust the damping effect.

Figure 43:
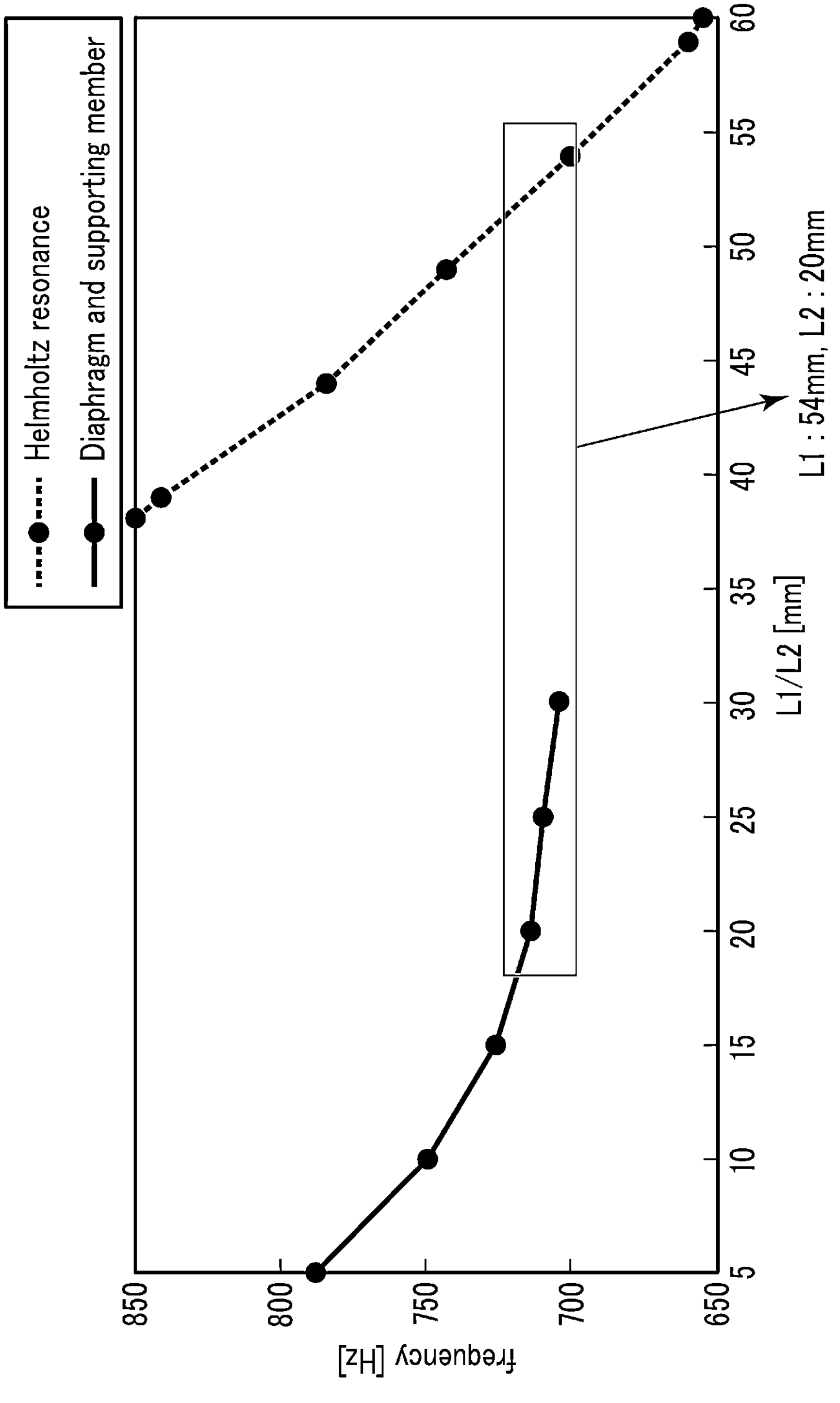
FIG. 43 is a diagram for explaining a method for determining a combination of the thickness L1 and the thickness L2 according to Example 1.

FIG. 43 shows both the graph shown in FIG. 33 and the graph shown in FIG. 42. As shown in FIG. 43, in a case where L1=54 mm and L2=20 mm, the natural frequency of the first sound absorption characteristic approximately matches the Helmholtz resonance frequency.

Figure 44:
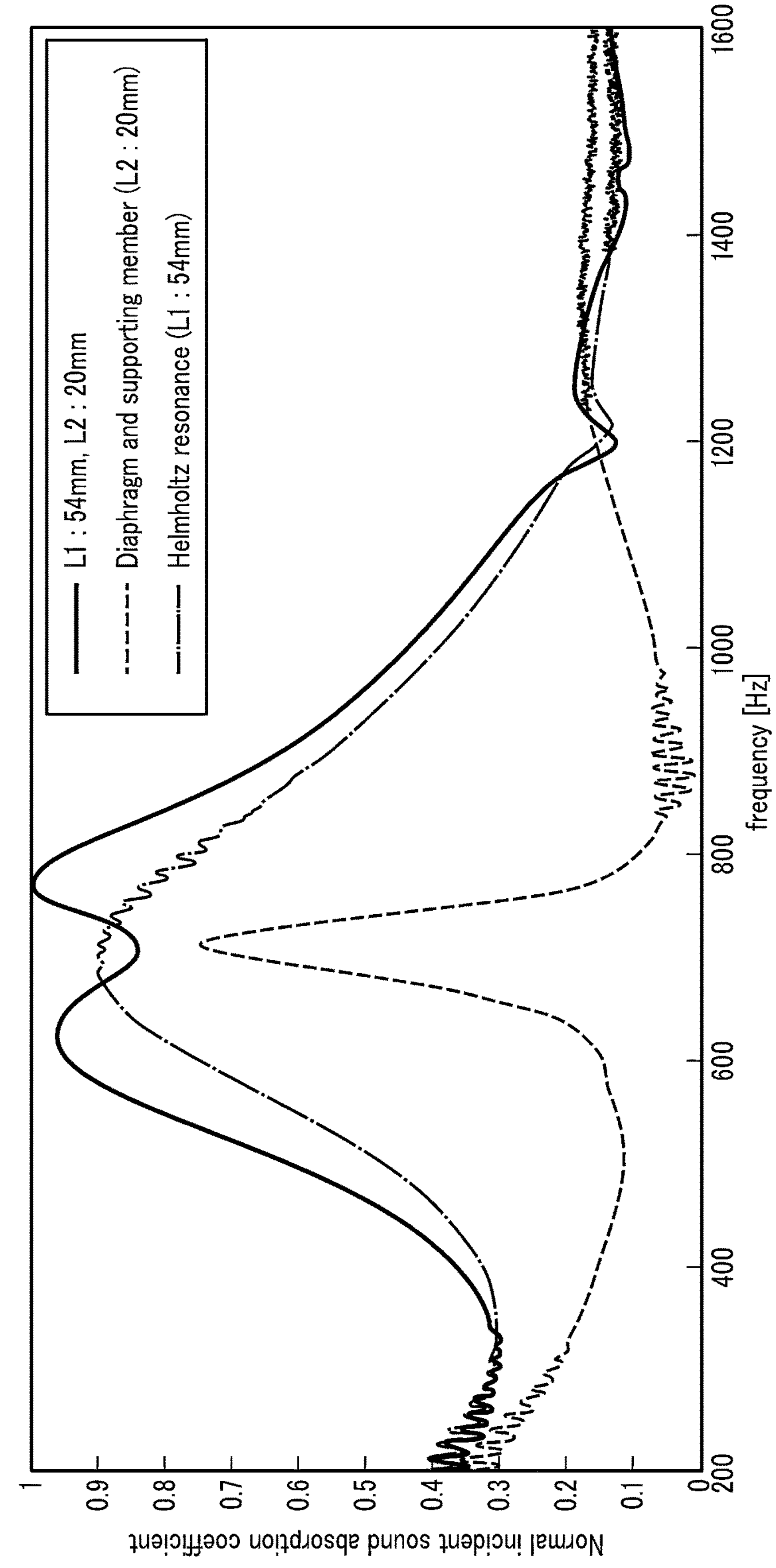
FIG. 44 is a graph showing results of measuring sound absorption characteristics of the sound absorption apparatus according to Example 1.
Figure 45:
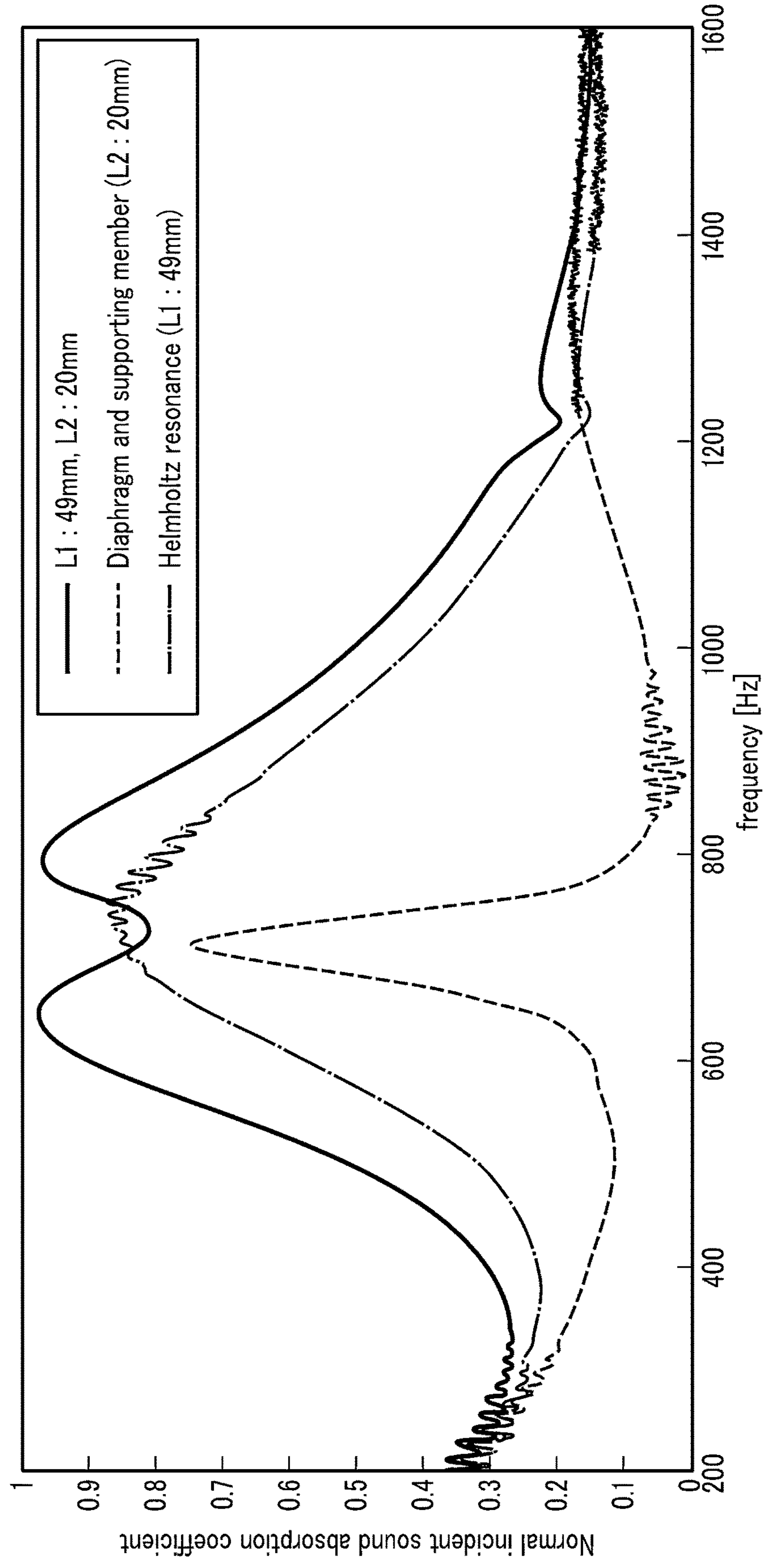
FIG. 45 is a graph showing results of measuring sound absorption characteristics of the sound absorption apparatus according to Example 1.

FIG. 44 shows results of measuring sound absorption characteristics of the sound absorption apparatus 10 for the combination of L1=54 mm and L2=20 mm, and FIG. 45 shows results of measuring sound absorption characteristics of the sound absorption apparatus 10 for the combination of L1=49 mm and L2=20 mm. In each of FIGS. 44 and 45, a solid line indicates the sound absorption characteristics of the sound absorption apparatus 10. Two separate absorption coefficient peaks are obtained by the coupling of the Helmholtz resonance and the vibration of the combination of the diaphragm 13 and the supporting member 14, and a valley characteristic between the sound absorption coefficient peaks indicates a sound absorption coefficient of 0.8 or more. As compared with the sound absorption apparatus 50 according to the related art, it can be confirmed that the valley characteristic can be significantly suppressed by the damping effect by the viscoelasticity of the diaphragm 13. In addition, it was shown that the damping effect was increased by increasing the thickness of the diaphragm 13, and the sound absorption coefficient at the valley was increased.

Figure 46:
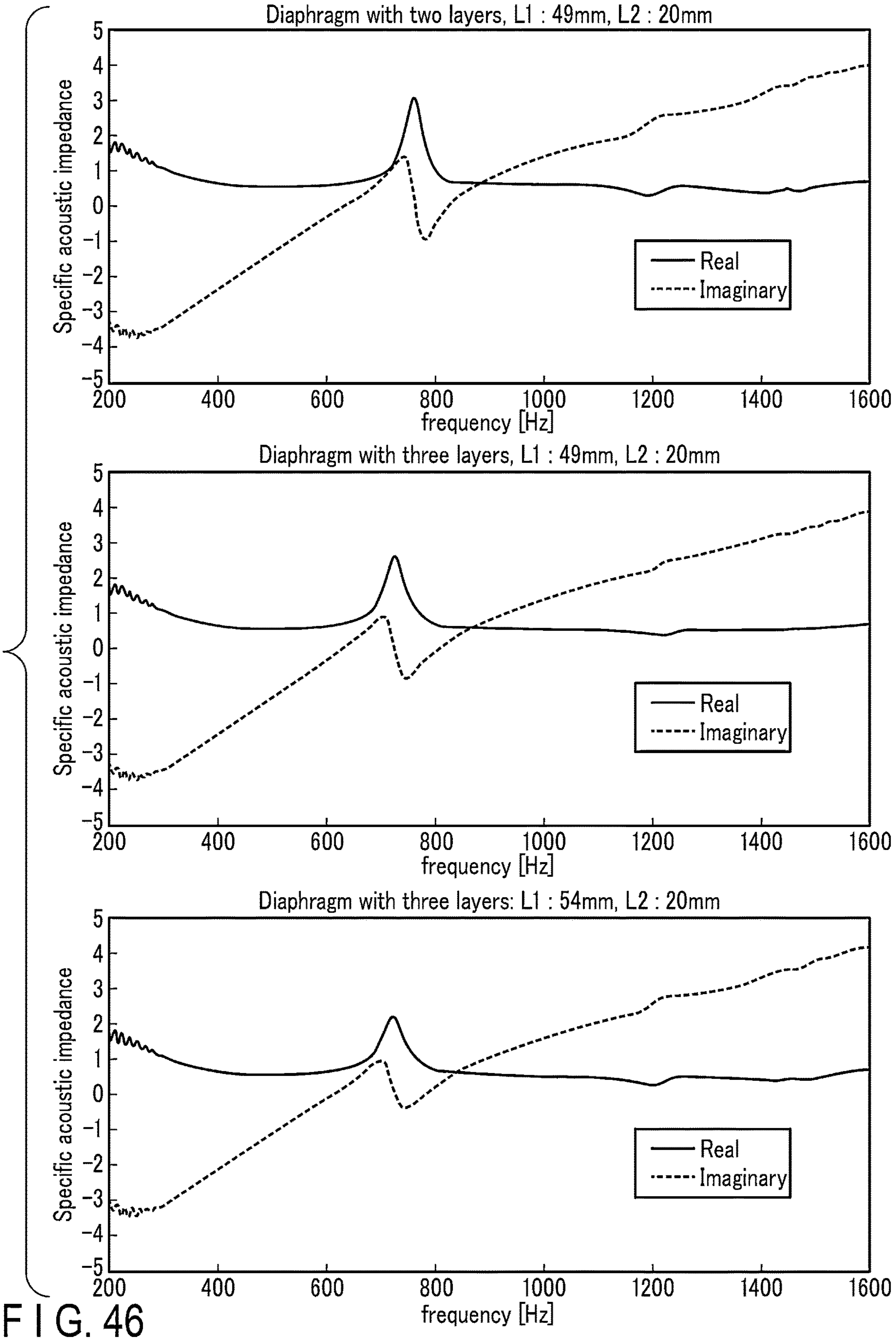
FIG. 46 is a diagram showing specific acoustic impedance in comparison between a case where the diaphragm has two layers and a case where the diaphragm has three layers according to Example 1.

FIG. 46 shows specific acoustic impedance of the sound absorption apparatus 10 according to Example 1. The fact that the value of the real part of the specific acoustic impedance is small in the sound absorption frequency band indicates that the damping effect is effective. It can be confirmed from FIG. 46 that the value of the real part of the specific acoustic impedance is small and the damping effect is more strongly produced in the case where the film has three stacked layers as compared with the case where the film has two stacked layers.

From the above, it was shown that it was possible to adjust the damping effect while suppressing the change in the natural frequency of the first sound absorption characteristic by changing the thickness of the diaphragm 13.

Figure 47:
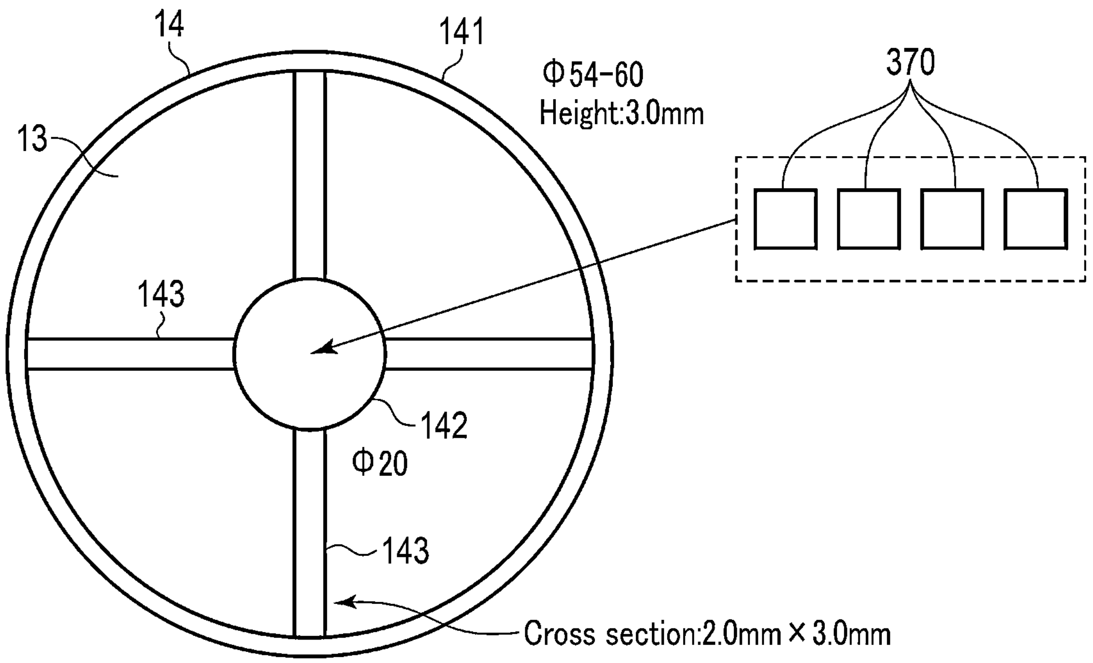
FIG. 47 is a plan view showing a situation where a weight is attached to the supporting member according to Example 1.

Further, as shown in FIG. 47, one or more weights 370 were attached to the central member 142, and the sound absorption characteristics of the combination of the diaphragm 13 and the supporting member 14 were measured. The supporting member 14 has the same structure as described above with reference to FIG. 35. The diaphragm 13 was formed by stacking three hard vinyl chloride films each having a thickness of 0.2 mm, and was attached to the supporting member 14.

Figure 48:
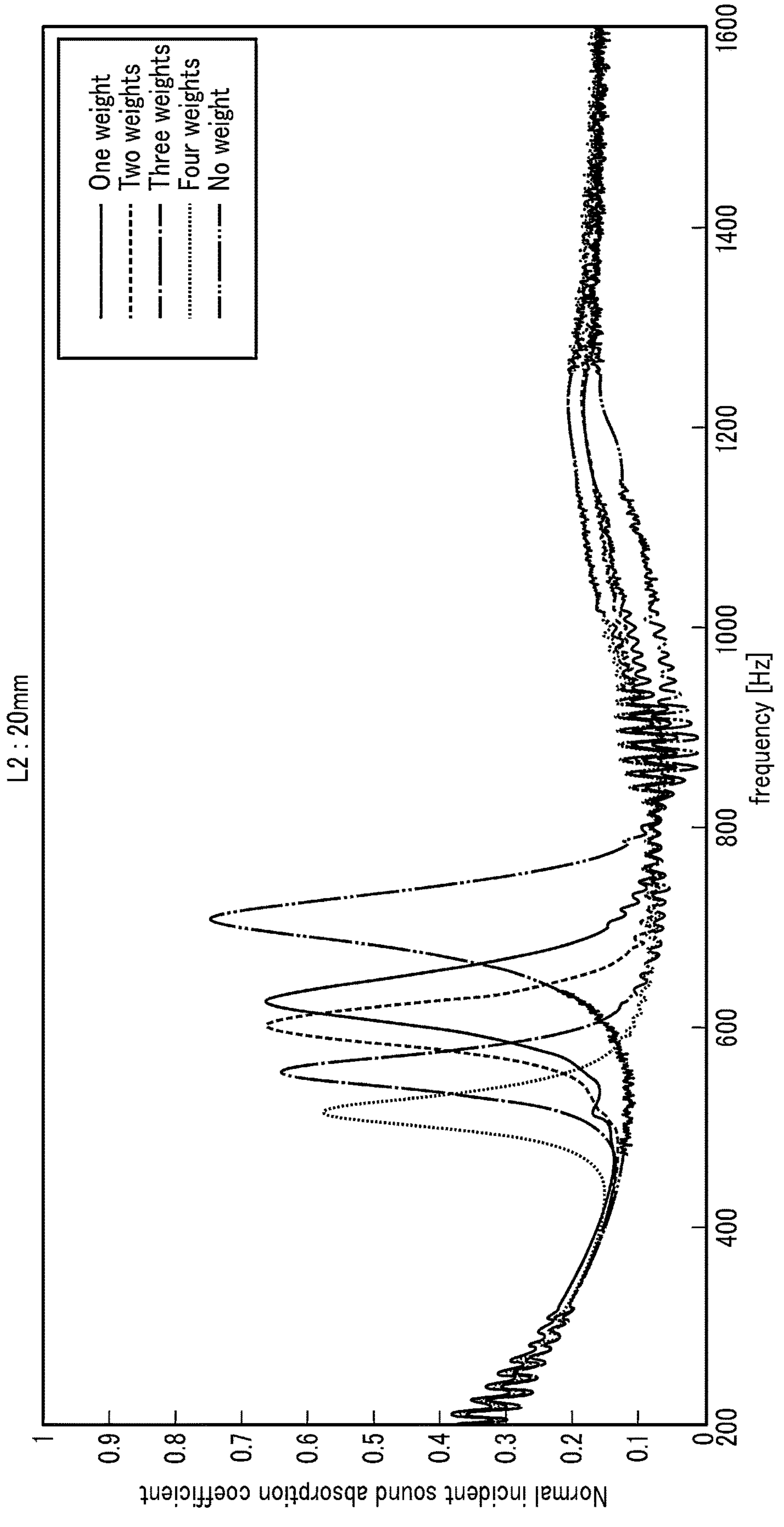
FIG. 48 is a graph showing results of measuring sound absorption characteristics of the combination of the diaphragm and the supporting member according to Example 1.

FIG. 48 shows results of measuring sound absorption characteristics of the combination of the diaphragm 13 and the supporting member 14. It can be confirmed from FIG. 48 that the natural frequency of the first sound absorption characteristic decreases as the mass added to the central member 142 increases. It is thus possible to use the mass added to the central member 142 as an element for adjusting the natural frequency.

Furthermore, a change in the natural frequency of the combination of the diaphragm 13 and the supporting member 14 due to a change in the shape of the connecting member 143 was verified. In this verification, one hard vinyl chloride film having a thickness of 0.2 mm was used as the diaphragm 13. In the verification, four types of supporting members 14 shown in FIG. 49 were used. The supporting member 14 shown in the upper left part of FIG. 49 includes four linear connecting members 143, and each of the connecting members 143 has a cross section that is a rectangle having a width of 3.0 mm and a height of 1.5 mm. The supporting member 14 shown in the upper right part of FIG. 49 includes four linear connecting members 143, and each of the connecting members 143 has a cross section that is a rectangle having a width of 3 mm and a height of 2 mm. The supporting member 14 shown in the lower left part of FIG. 49 includes two linear connecting members 143, and each of the connecting members 143 has a cross section that is a rectangle having a width of 3 mm and a height of 2 mm. The supporting member 14 shown in the lower right part of FIG. 49 includes four connecting members 143 including linear beam members 1431 and 1432 and a beam member 1433 extending in the circumferential direction, each of the beam members 1431 and 1432 has a cross section that is a rectangle having a width of 2 mm and a height of 2 mm, and the beam member 1433 has a cross section that is a rectangle having a width of 12 mm and a height of 1 mm. The beam member 1433 has a fan shape with an angle θ of 60° as viewed from the Y-axis direction.

Figure 49:
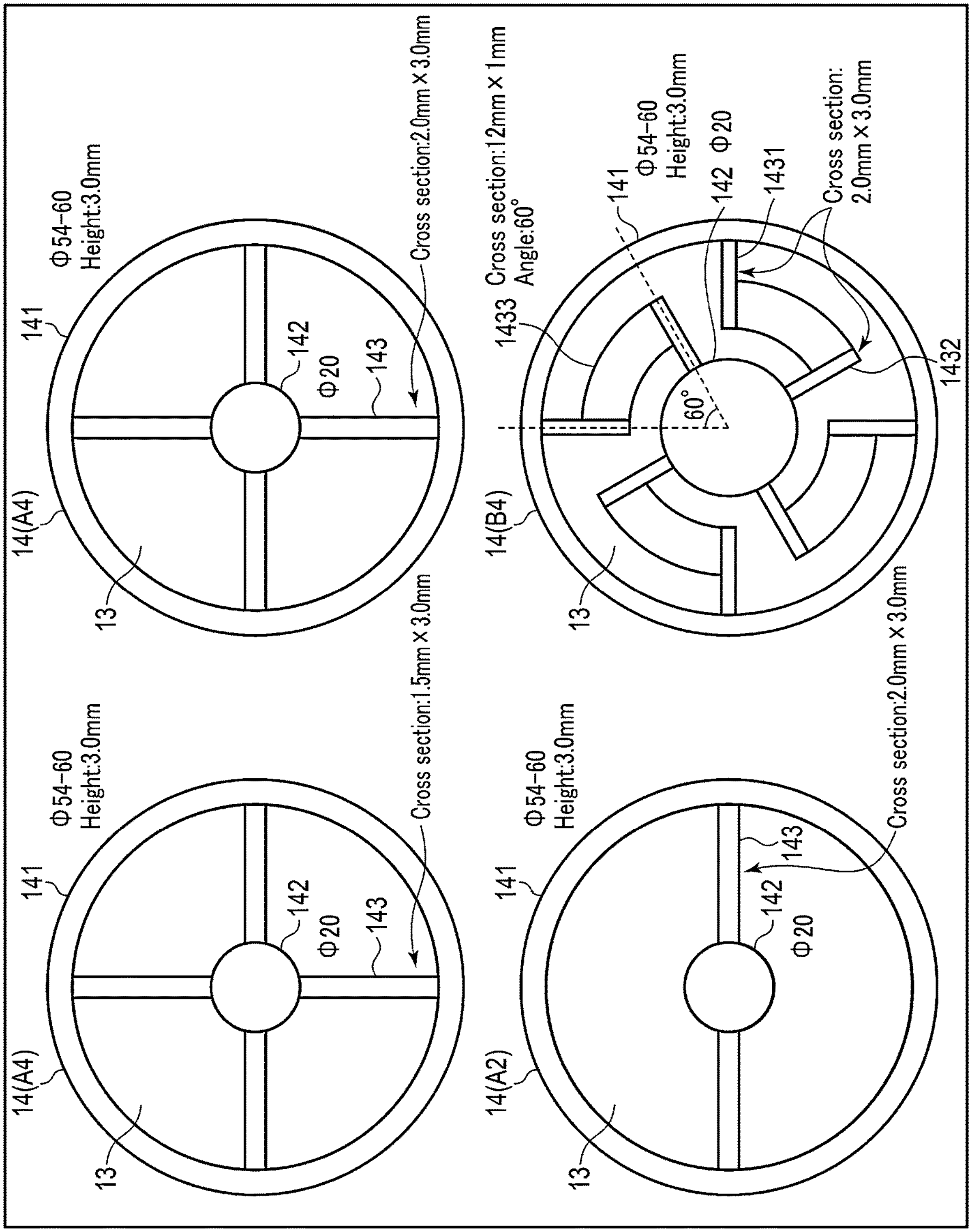
FIG. 49 is a plan view showing four types of supporting members used to verify a change in the natural frequency due to a change in shape of connecting members according to Example 1.
Figure 50:
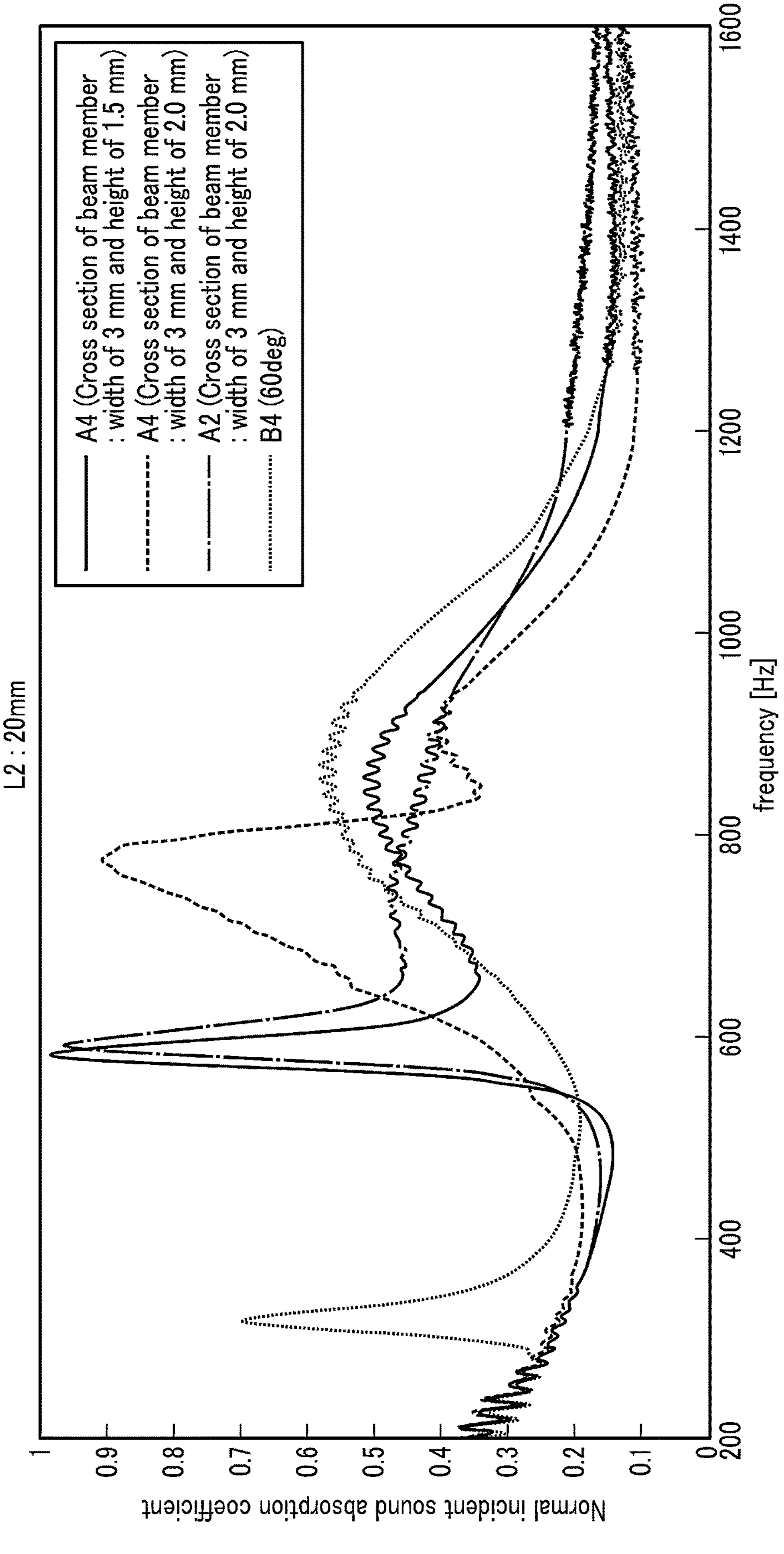
FIG. 50 is a graph showing results of measuring sound absorption characteristics of the combination of the diaphragm and the supporting members according to Example 1.

FIG. 50 shows results of measuring sound absorption characteristics of combinations of the diaphragm 13 and the four types of supporting members 14 shown in FIG. 49. It can be confirmed from FIG. 50 that the natural frequency can be lowered by reducing the number of connecting members 143 and lowering the stiffness of the connecting members 143.

As described above, in the sound absorption apparatus 10 according to Example 1, the sound absorption characteristics having two sound absorption coefficient peaks can be obtained by the coupling of the Helmholtz resonance and the vibration of the combination of the diaphragm 13 and the supporting member 14, and the valley characteristic between the sound absorption coefficient peaks can be suppressed with the damping effect by the viscoelasticity of the diaphragm 13. As a result, high sound absorption characteristics can be obtained in a wide frequency band. For example, representative two of the above-described measurement results are as follows.

In a case where two hard vinyl chloride films each having a thickness of 0.2 mm are stacked and used as the diaphragm 13, the thickness L1 of the frame 12 is 49 mm, and the thickness L2 of the frame 15 is 20 mm, the frequency bandwidth where the sound absorption coefficient is 0.7 or more is 382 Hz (550 Hz to 932 Hz).

In a case where three hard vinyl chloride films each having a thickness of 0.3 mm are stacked and used as the diaphragm 13, the thickness L1 of the frame 12 is 54 mm, and the thickness L2 of the frame 15 is 20 mm, the frequency bandwidth where the sound absorption coefficient is 0.7 or more is 350 Hz (524 Hz to 874 Hz). In addition, the frequency bandwidth where the sound absorption coefficient is 0.8 or more is 292 Hz (551 Hz to 843 Hz), and the sound absorption coefficient at the valley is 0.83.

Thus, the sound absorption apparatus 10 according to Example 1 exhibited high sound absorption performance, and the validity and superiority of the sound absorption apparatus 10 according to Example 1 were demonstrated.

From the above, it was shown that it was possible to adjust the damping effect while suppressing the change in the natural frequency of the first sound absorption characteristic by changing the thickness of the diaphragm 13. Furthermore, it was shown that the natural frequency (the natural frequency of the first sound absorption characteristic) of the combination of the diaphragm 13 and the supporting member 14 could be changed based on the shape of the connecting member 143 of the supporting member 14 and the mass added to the central member 142 of the supporting member 14.

Example 2

Figure 51:
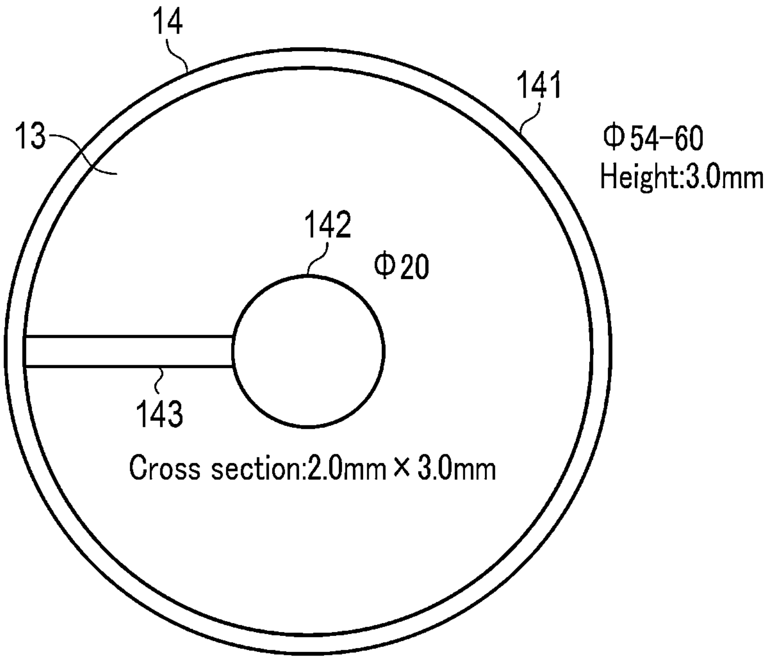
FIG. 51 is a plan view showing a combination of a diaphragm and a supporting member according to Example 2.

Example 2 relates to the second mode. In Example 2, a supporting member 14 has a structure shown in FIG. 51. Specifically, the supporting member 14 includes a frame 141, a central member 142, and one connecting member 143. The connecting member 143 is a linear beam member, and has a cross section that is a rectangle having a width of 3 mm and a height of 2 mm. The central member 142 is a cylindrical member having a diameter of 20 mm and a height of 3 mm. The frame 141 is an annular member having an inner diameter of 54 mm, an outer diameter of 60 mm, and a height of 3 mm. The frame 141, the central member 142, and the connecting member 143 were integrally molded with ABS using a 3D printer. A hard vinyl chloride film having a thickness of 0.2 mm was used as the diaphragm 13 and attached to the supporting member 14. In Example 2, as the diaphragm 13, one hard vinyl chloride film having a thickness of 0.2 mm was used.

Figure 52:
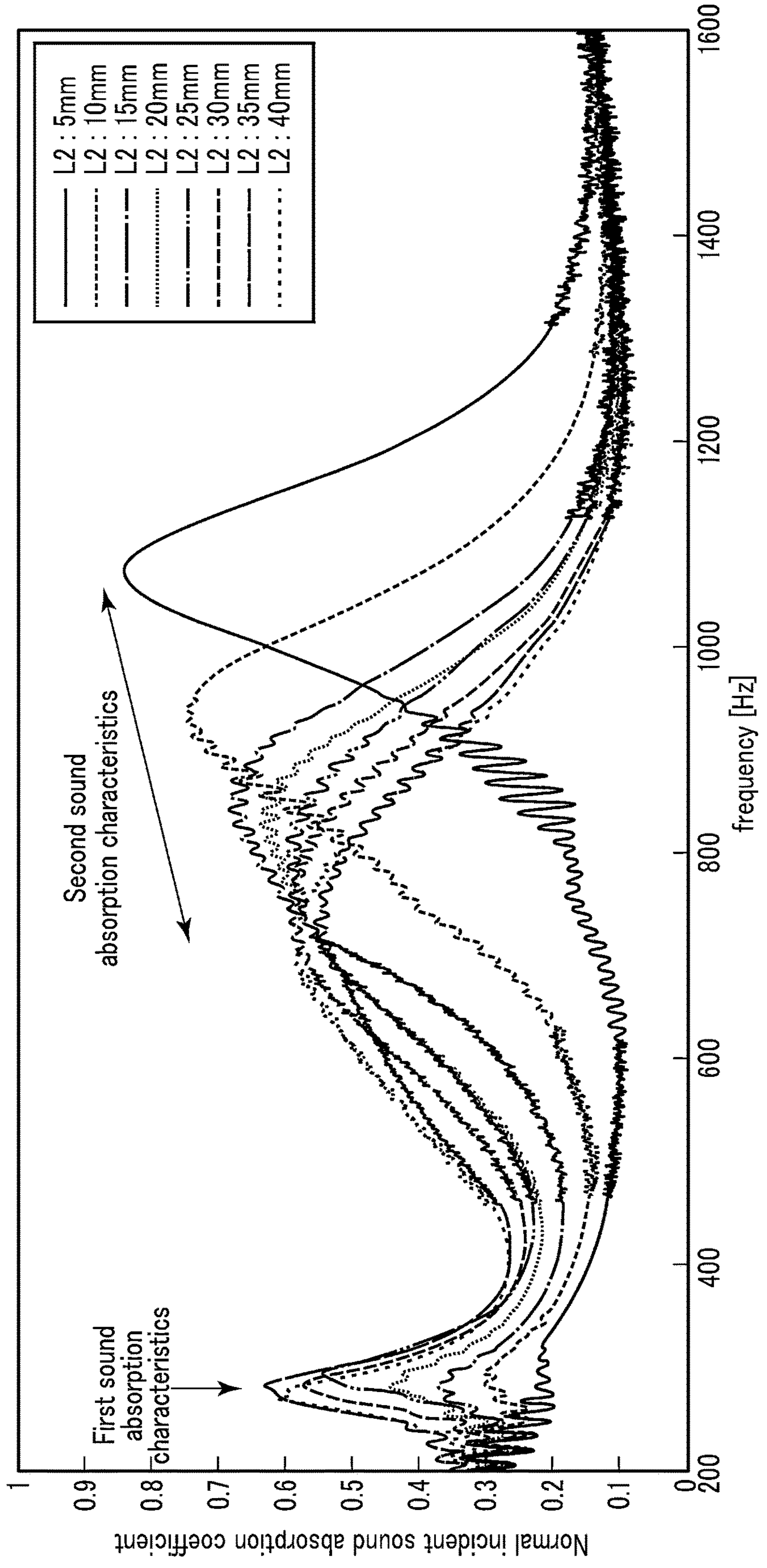
FIG. 52 is a graph showing results of measuring sound absorption characteristics of the combination of the diaphragm and the supporting member according to Example 2.
Figure 53:
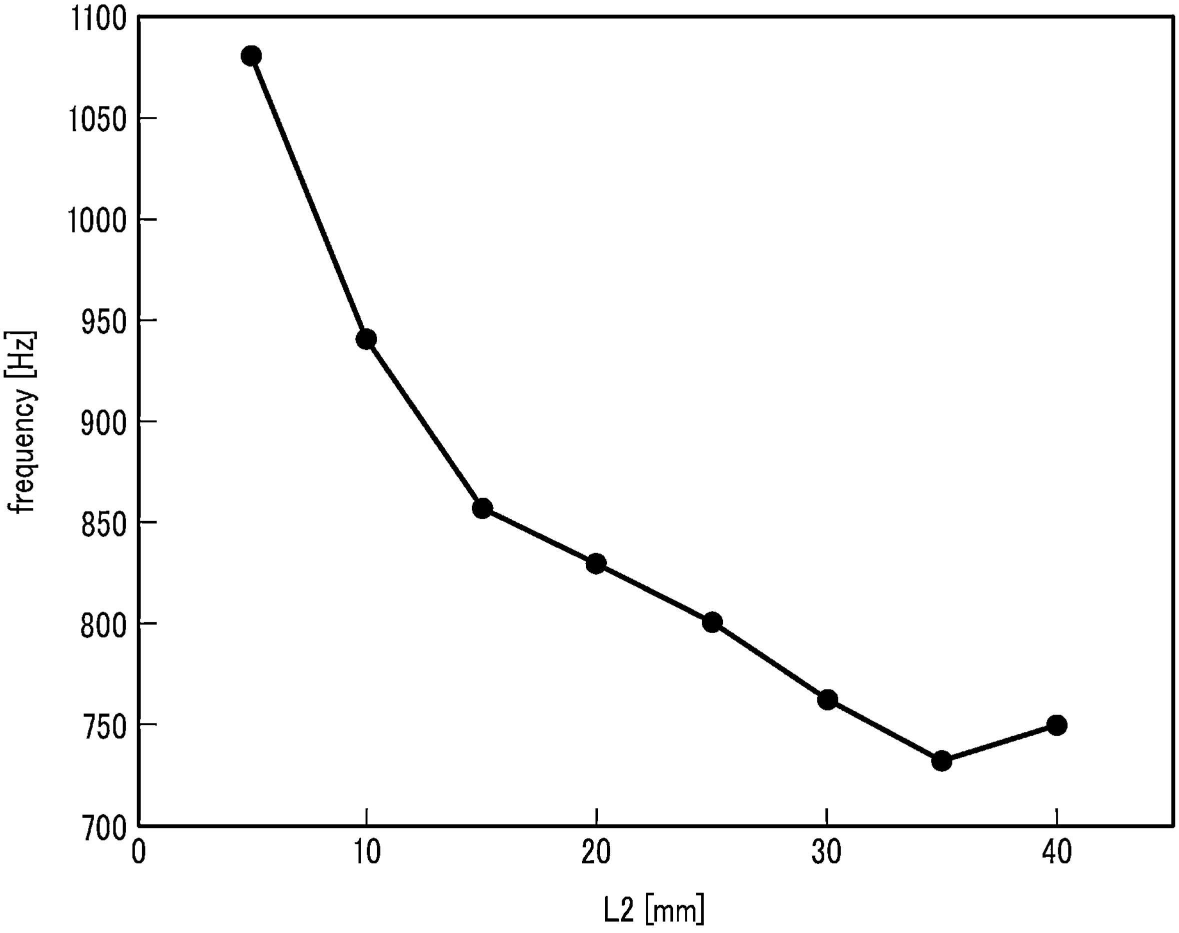
FIG. 53 is a graph showing a natural frequency of a second sound absorption characteristic with respect to a thickness L2 obtained from FIG. 52.

FIG. 52 shows results of measuring sound absorption characteristics of a combination of the diaphragm 13 and the supporting member 14 according to Example 2. From FIG. 52, the first sound absorption characteristic and the second sound absorption characteristic can be confirmed. In the second mode, the second sound absorption characteristic is used. FIG. 53 shows a plot of the natural frequency of the second sound absorption characteristic with respect to the thickness L2 of the frame 15. It can be confirmed from FIG. 53 that the natural frequency can be adjusted by adjusting the thickness L2 of the frame 15.

In the second mode, a combination of the thickness L1 of the frame 12 and the thickness L2 of the frame 15 is determined according to the following guideline.

Figure 54:
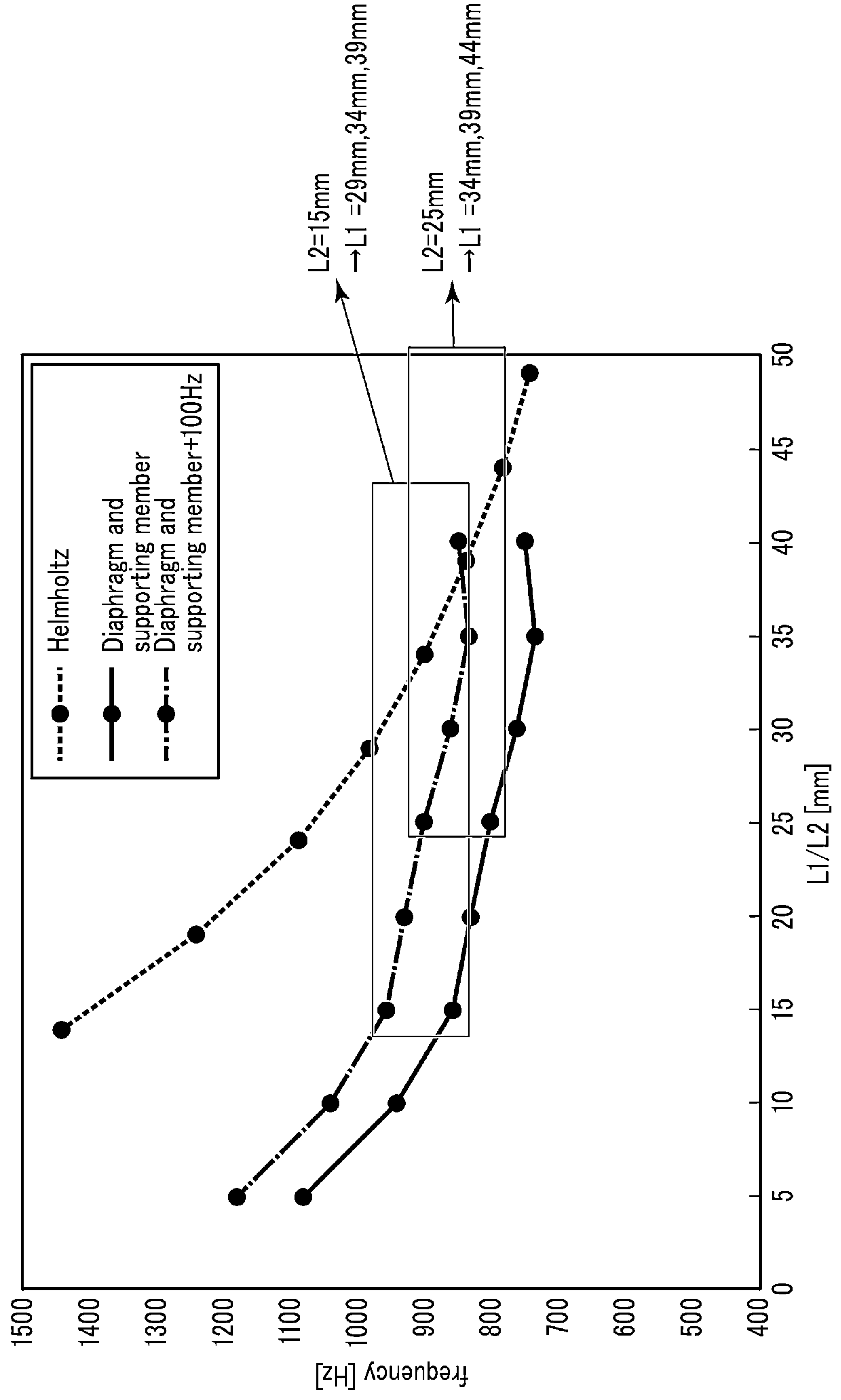
FIG. 54 is a diagram for explaining a method for determining a combination of a thickness L1 and the thickness L2 according to Example 2.

In Procedure 1, the Helmholtz resonance frequency and the natural frequency of the second sound absorption characteristic are compared with each other. The Helmholtz resonance frequency is measured using the structure 200 in which the back plate 18, which is a stiff plate, faces the front plate 11 as shown in FIG. 30A. In the sound absorption apparatus 10, the front plate 11 faces the combination of the diaphragm 13 and the supporting member 14 rather than the back plate 18. Therefore, in the sound absorption apparatus 10, the Helmholtz resonance frequency is lower than that at the time of measurement in the structure 200. In a case where a candidate for the combination of the thickness L1 and the thickness L2 is determined, a decrease in the Helmholtz resonance frequency is considered. For example, as shown in FIG. 54, the Helmholtz resonance frequency within a range of about 100 Hz and the natural frequency of the second sound absorption characteristic within a range of about 100 Hz are compared with each other to determine a candidate for the combination of the thickness L1 and the thickness L2. In this example, a combination of L1=39 mm and L2=15 mm and a combination of L1=44 mm and L2=25 mm are determined as candidates.

In Procedure 2, the sound absorption characteristics of the sound absorption apparatus 10 are measured for a candidate for the combination of the frame 12 and the frame 15 determined in Procedure 1. Further, further candidates are determined by changing the thickness L1 of the frame 12 to increase and decrease the thickness L1 under the condition that the thickness L2 of the frame 15 is fixed, and the sound absorption characteristics of the sound absorption apparatus 10 are measured for each of the further candidates. For example, a combination of L1=29 mm and L2=15 mm and a combination of L1=34 mm and L2=15 mm are determined as further candidates based on the combination of L1=39 mm and L2=15 mm, and a combination of L1=34 mm and L2=25 mm and a combination of L1=39 mm and L2=25 mm are determined as further candidates based on the combination of L1=44 mm and L2=25 mm.

In Procedure 3, a candidate satisfying a desired condition is selected as a final combination. The desired condition is, for example, a condition in which two sound absorption coefficient peaks are approximately equal and the valley between the sound absorption coefficient peaks is not deep.

Figure 55:
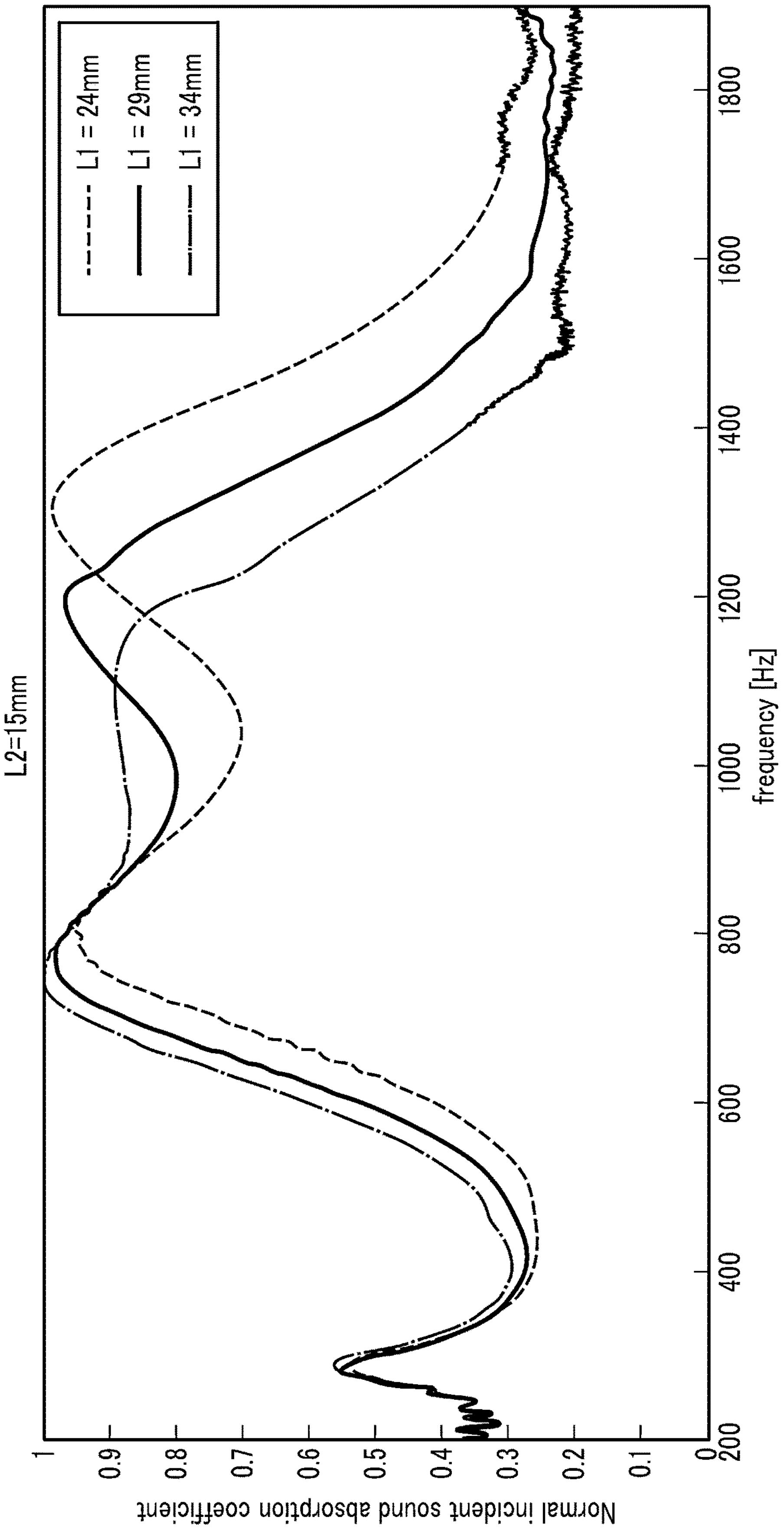
FIG. 55 is a graph showing results of measuring sound absorption characteristics of a sound absorption apparatus according to Example 2.
Figure 56:
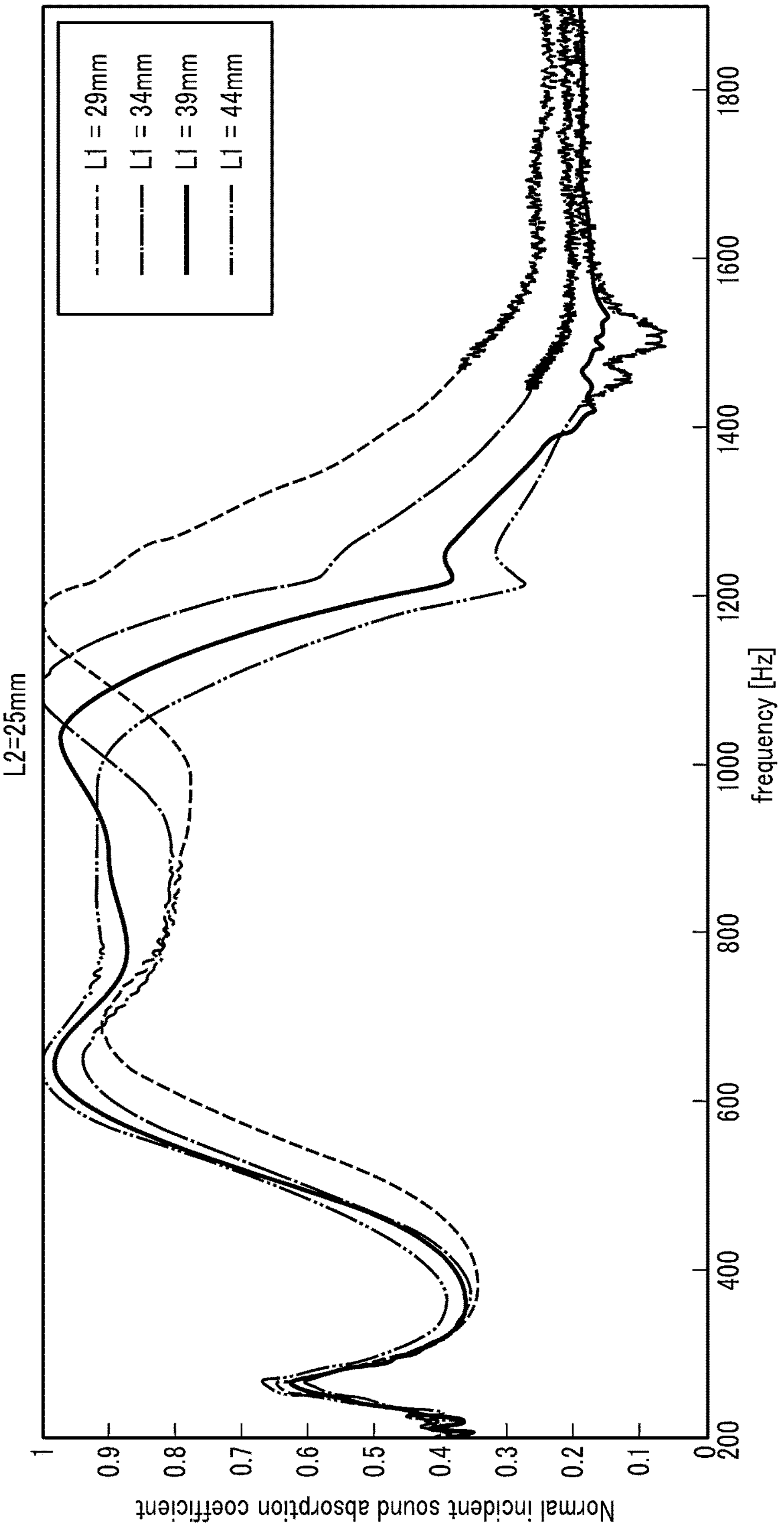
FIG. 56 is a graph showing results of measuring sound absorption characteristics of the sound absorption apparatus according to Example 2.

FIG. 55 shows results of measuring sound absorption characteristics of the sound absorption apparatus 10 in the case of L2=15 mm, and FIG. 56 shows results of measuring sound absorption characteristics of the sound absorption apparatus 10 in the case of L2=25 mm. As shown in FIG. 55, in a case where L2=15 mm, L1=29 mm satisfies the desired condition. In a case where the combination of L1=29 mm and L2=15 mm is used, the band in which the sound absorption coefficient is 0.8 or more is from 675 Hz to 1297 Hz (range of 622 Hz). As shown in FIG. 56, in a case where L2=25 mm, L1=39 mm satisfies the desired condition. In a case where the combination of L1=39 mm and L2=25 mm is used, the band in which the sound absorption coefficient is 0.8 or more is from 552 Hz to 1125 Hz (range of 573 Hz), and the sound absorption coefficient at the valley is also as very high as 0.865. In addition, in a case where the combination of L1=34 mm and L2=25 mm is used, the band in which the sound absorption coefficient is 0.8 or more is from 564 Hz to 1179 Hz (range of 615 Hz). The sound absorption coefficient at the valley is lower than that in the case of L1=39 mm, but the band in which the sound absorption coefficient is 0.8 or more is wider than in the case of L1=39 mm.

Figure 57:
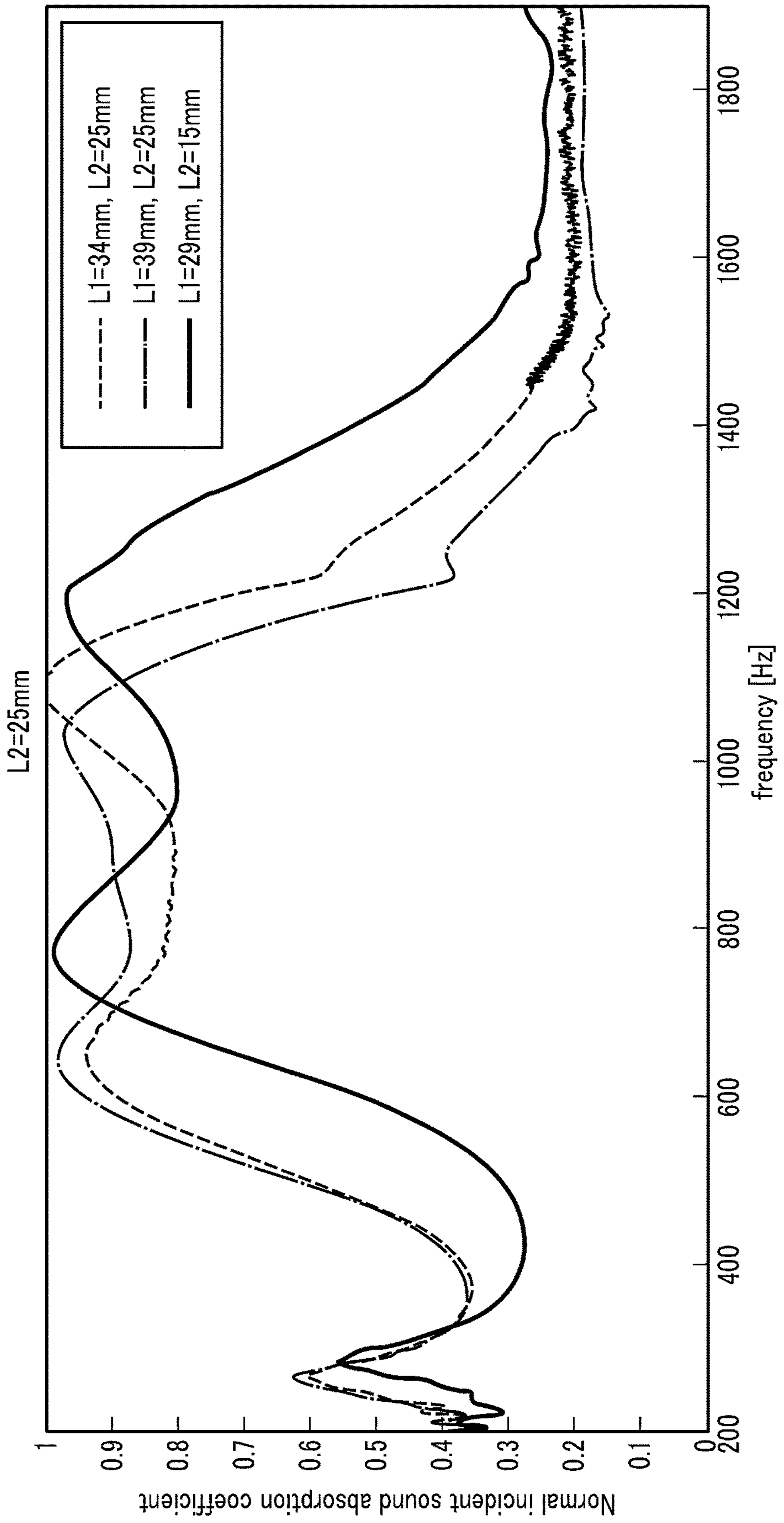
FIG. 57 is a graph showing results of measuring sound absorption characteristics of the sound absorption apparatus according to Example 2.

As a result of performing Procedure 2 and Procedure 3, the combination of L1=29 mm and L2=15 mm, the combination of L1=39 mm and L2=25 mm, and the combination of L1=34 mm and L2=25 mm are selected as the final combinations. FIG. 57 shows results of measuring sound absorption characteristics of the sound absorption apparatus 10 for the combination of L1=29 mm and L2=15 mm, the combination of L1=39 mm and L2=25 mm, and the combination of L1=34 mm and L2=25 mm.

As described above, in the sound absorption apparatus 10 according to Example 2, the sound absorption characteristics having two sound absorption coefficient peaks can be obtained by the coupling of the Helmholtz resonance and the vibration of the combination of the diaphragm 13 and the supporting member 14, and the valley characteristic between the sound absorption coefficient peaks can be suppressed with the damping effect by the viscoelasticity of the diaphragm 13. As a result, high sound absorption characteristics can be obtained in a wide frequency band. For example, representative two of the above-described measurement results are as follows.

In a case where the thickness L1 of the frame 12 is 29 mm and the thickness L2 of the frame 15 is 15 mm, the frequency bandwidth where the sound absorption coefficient is 0.8 or more is 622 Hz (675 Hz to 1297 Hz).

In a case where the thickness L1 of the frame 12 is 39 mm and the thickness L2 of the frame 15 is 25 mm, the frequency bandwidth where the sound absorption coefficient is 0.8 or more is 573 Hz (552 Hz to 1125 Hz). The sound absorption coefficient at the valley is 0.865.

In this manner, the sound absorption apparatus 10 according to Example 2 exhibited high sound absorption performance, and the validity and superiority of the sound absorption apparatus 10 according to Example 2 were demonstrated.

In addition, in a case where the combination of L1=34 mm and L2=25 mm is used, a slight difference in value between the two sound absorption coefficient peaks is present, but the frequency bandwidth where the sound absorption coefficient is 0.8 or more is 615 Hz, and high sound absorption characteristics can be obtained in a wide frequency band.

Therefore, the final combination is determined according to the purpose.

Example 3

Figure 58:
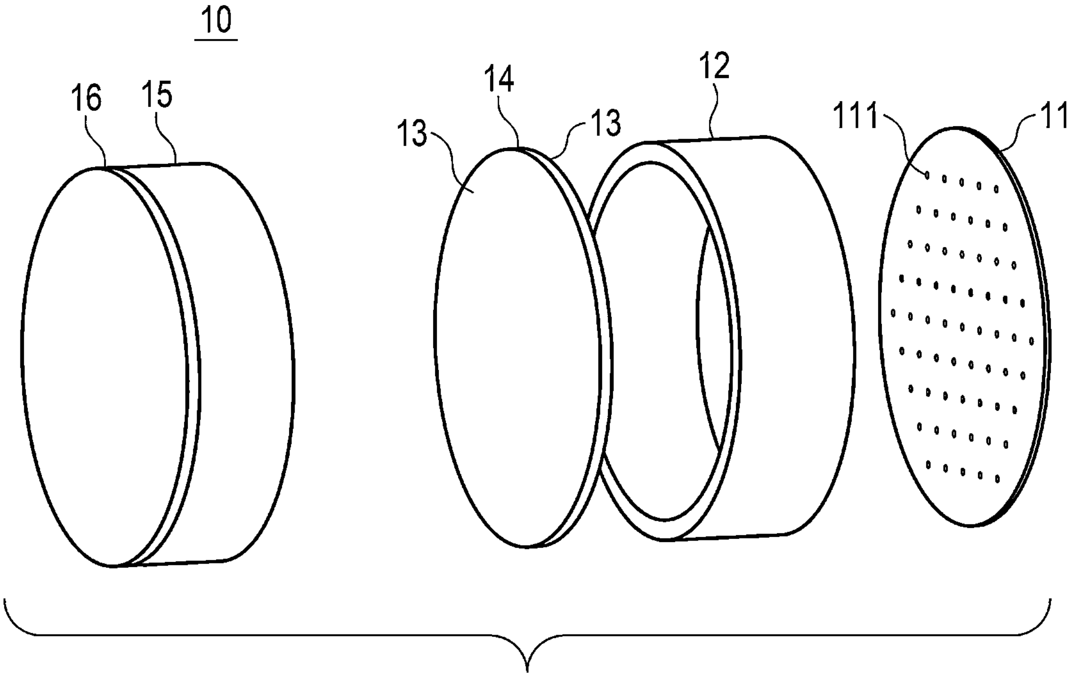
FIG. 58 is an exploded view showing a sound absorption apparatus according to Example 3.

Example 3 relates to the second mode. In Example 3, as shown in FIG. 58, the diaphragm 13 is provided on both surfaces of the supporting member 14. Example 3 is the same as Example 2 except that the diaphragm 13 is provided on both surfaces of the supporting member 14. By providing the diaphragm 13 on both surfaces of the supporting member 14, the damping effect of the diaphragm 13 can be further improved, and a valley characteristic between two sound absorption coefficient peaks can be further suppressed. This will be described below through measurement results.

Figure 59:
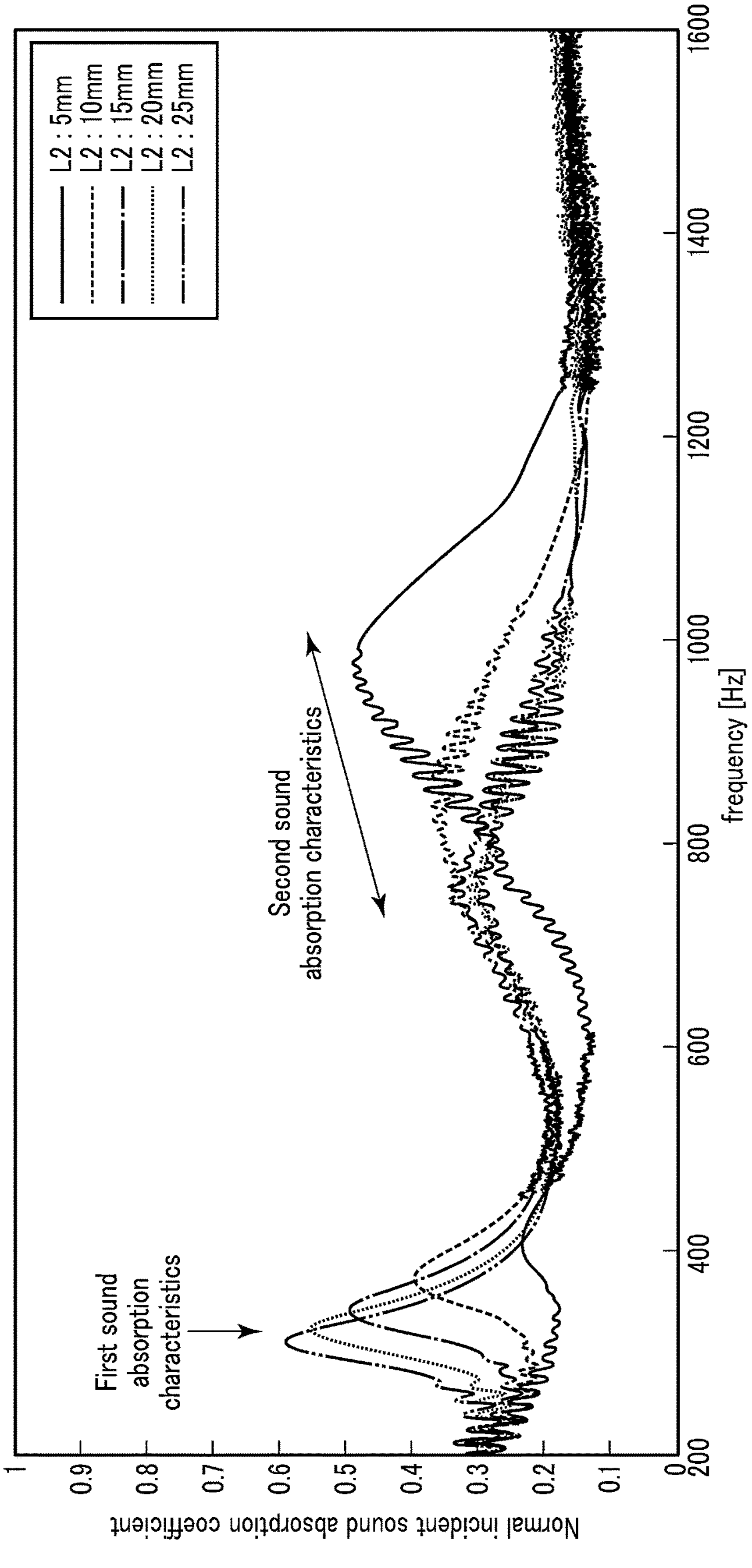
FIG. 59 is a graph showing results of measuring sound absorption characteristics of a combination of a diaphragm and a supporting member according to Example 3.
Figure 60:
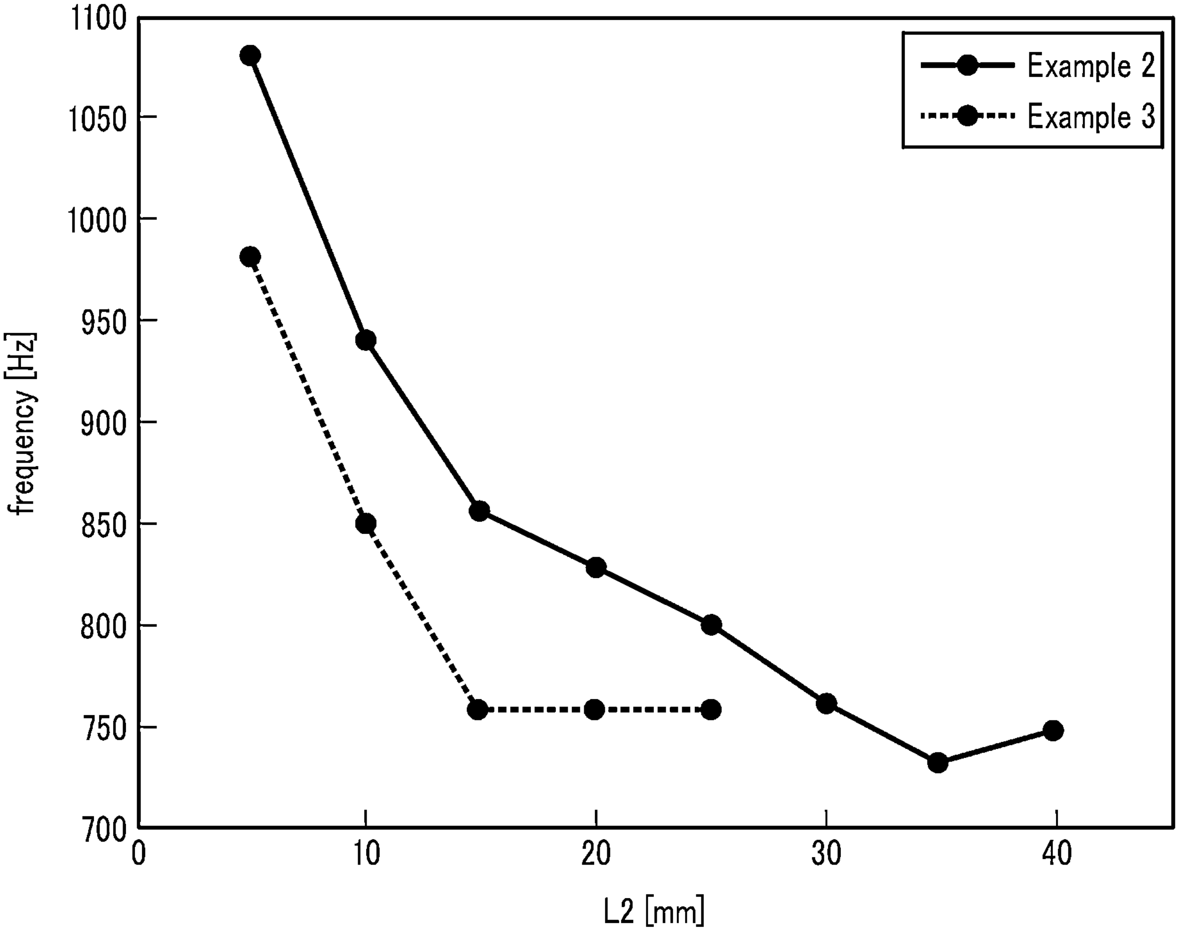
FIG. 60 is a graph showing a natural frequency of a second sound absorption characteristic with respect to a thickness L2 obtained from FIG. 59.

FIG. 59 shows results of measuring sound absorption characteristics of a combination of the diaphragm 13 and the supporting member 14. From FIG. 59, the first sound absorption characteristic and the second sound absorption characteristic can be confirmed. FIG. 60 shows a plot of the natural frequency of the second sound absorption characteristic with respect to the thickness L2 of the frame 15. FIG. 60 also shows the natural frequency of the second sound absorption characteristic according to Example 2. It can be confirmed from FIG. 60 that the natural frequency according to Example 3 decreases by about 100 Hz as compared with the natural frequency according to Example 2. This is because air between the first diaphragm and the second diaphragm of the diaphragm 13 functions as the air mass and the overall mass increases.

Figure 61:
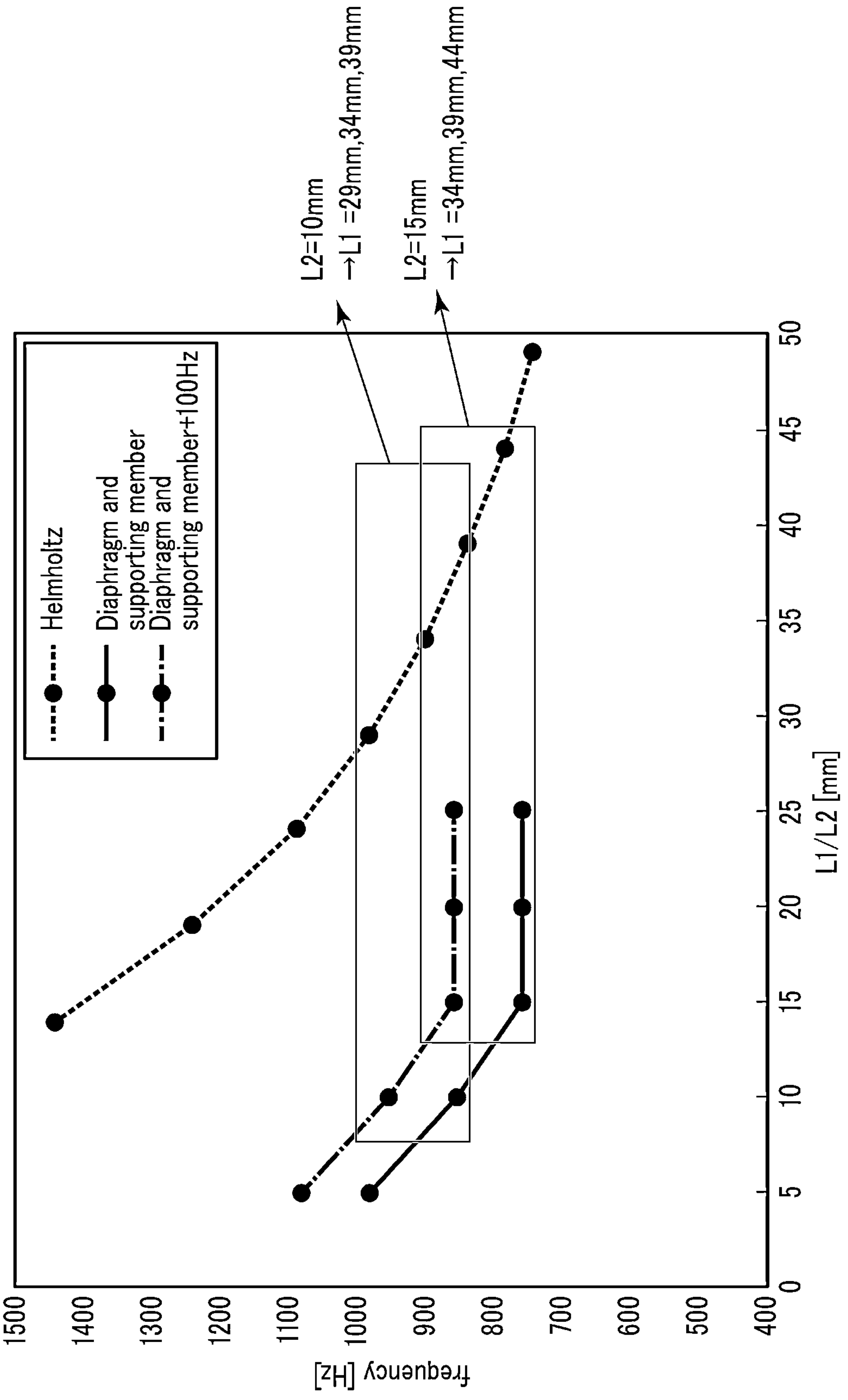
FIG. 61 is a diagram for explaining a method for determining a combination of a thickness L1 and the thickness L2 according to Example 3.

A candidate for a combination of the thickness L1 of the frame 12 and the thickness L2 of the frame 15 can be determined according to a guideline similar to that described in Example 2. In Example 3, after Procedure 1 and Procedure 2 described above are performed, as shown in FIG. 61, a combination of L1=29 mm and L2=10 mm, a combination of L1=34 mm and L2=10 mm, a combination of L1=39 mm and L2=10 mm, a combination of L1=34 mm and L2=15 mm, a combination of L1=39 mm and L2=15 mm, a combination of L1=44 mm and L2=15 mm, and a combination of L1=49 mm and L2=15 mm are determined as candidates.

Figure 62:
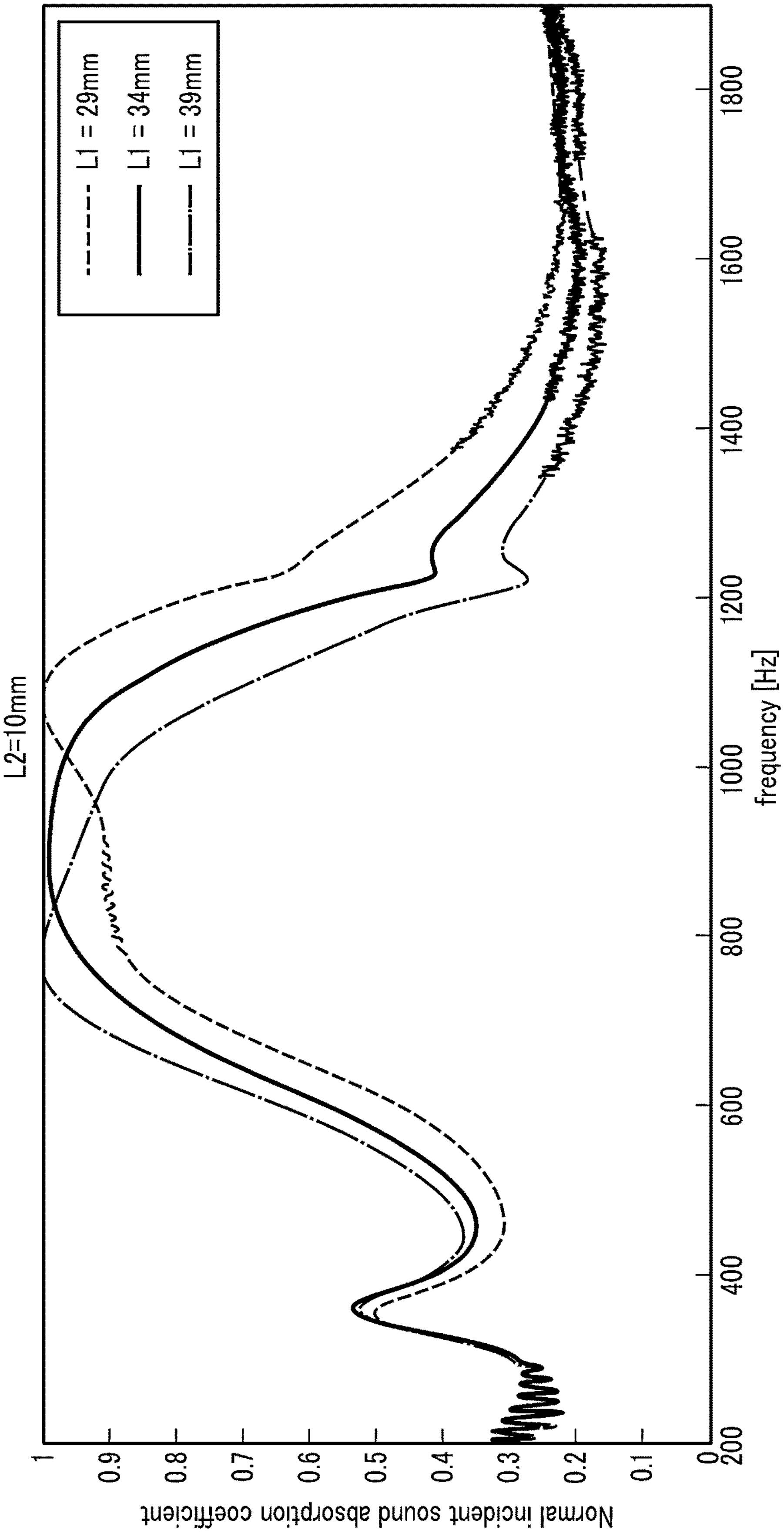
FIG. 62 is a graph showing results of measuring sound absorption characteristics of the sound absorption apparatus according to Example 3.
Figure 63:
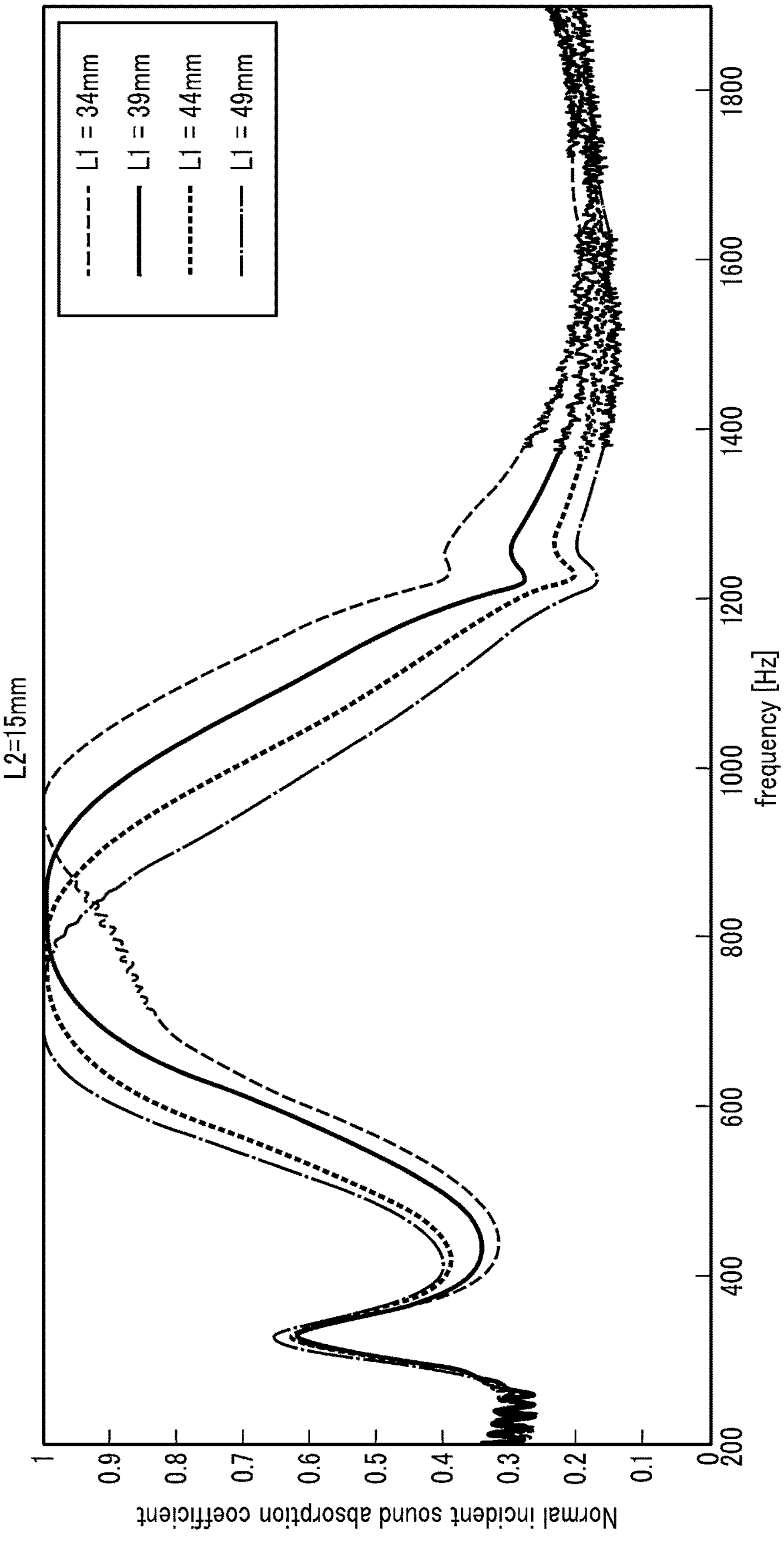
FIG. 63 is a graph showing results of measuring sound absorption characteristics of the sound absorption apparatus according to Example 3.

FIG. 62 shows results of measuring sound absorption characteristics of the sound absorption apparatus 10 for the combination of L1=29 mm and L2=10 mm, the combination of L1=34 mm and L2=10 mm, and the combination of L1=39 mm and L2=10 mm. FIG. 63 shows results of measuring sound absorption characteristics of the sound absorption apparatus 10 for the combination of L1=34 mm and L2=15 mm, the combination of L1=39 mm and L2=15 mm, the combination of L1=44 mm and L2=15 mm, and the combination of L1=49 mm and L2=15 mm.

As shown in FIG. 62, in a case where L2=10 mm, L1=34 mm satisfies the desired condition that two sound absorption coefficient peaks are approximately equal and the valley between the two sound absorption coefficient peaks is not deep. In a case where L1=34 mm and L2=10 mm, the frequency band in which the sound absorption coefficient is 0.8 or more is from 680 Hz to 1125 Hz (range of 445 Hz). The valley characteristic between the two sound absorption coefficient peaks is significantly suppressed as compared with Example 2. Specifically, sound absorption characteristics that can be regarded as substantially unimodal and maintain a high sound absorption coefficient in a wide band are obtained.

As shown in FIG. 63, in a case where L2=15 mm, L1=39 mm or 44 mm satisfies the desired condition. In a case where L1=15 mm and L2=39 mm, the frequency band in which the sound absorption coefficient is 0.8 or more is from 646 Hz to 1027 Hz (range of 381 Hz). In a case where L1=15 mm and L2=44 mm, the frequency band in which the sound absorption coefficient is 0.8 or more is from 594 Hz to 958 Hz (range of 364 Hz).

Figure 64:
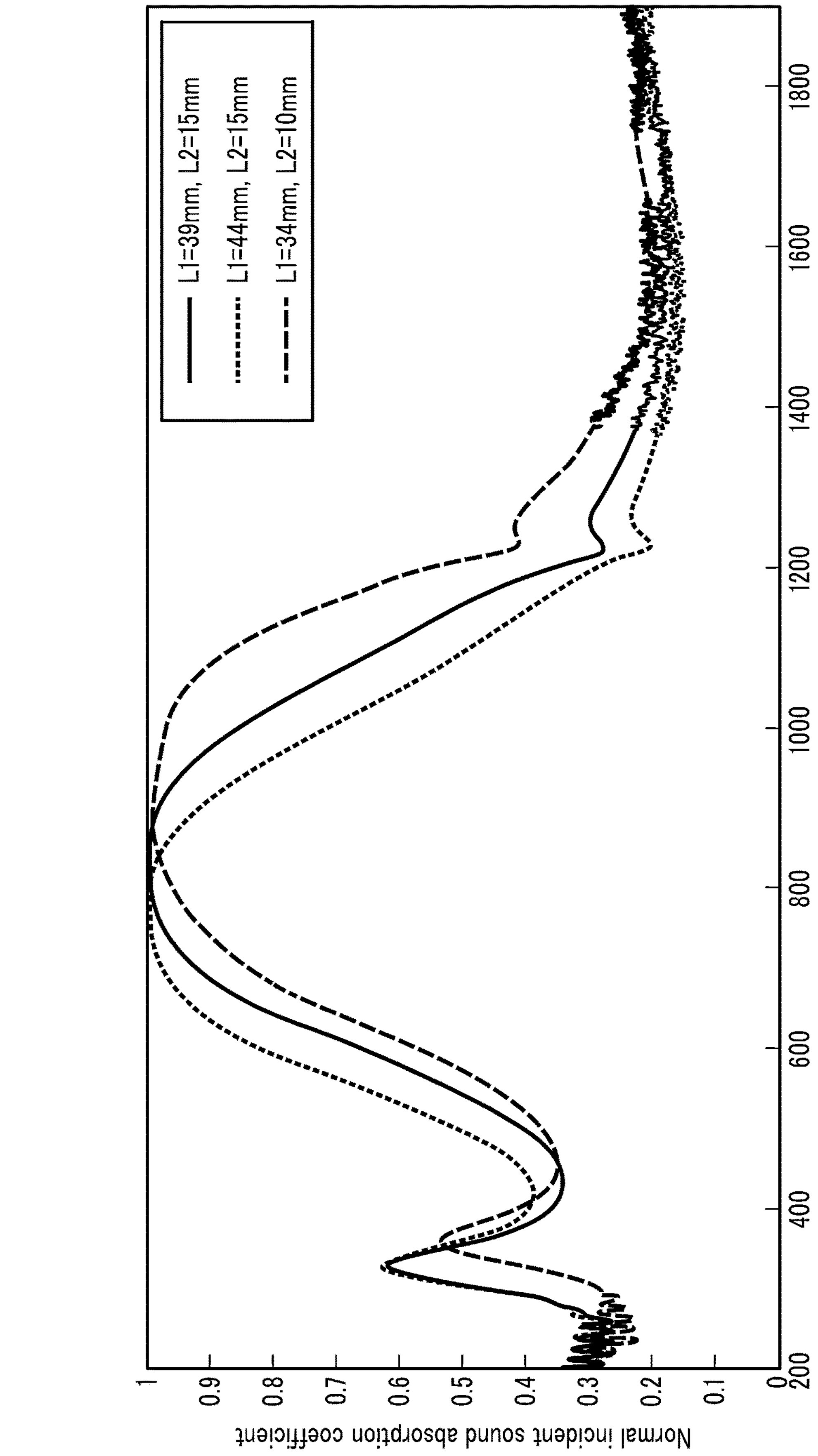
FIG. 64 is a graph showing results of measuring sound absorption characteristics of the sound absorption apparatus according to Example 3.

FIG. 64 shows results of measuring sound absorption characteristics of the sound absorption apparatus 10 for the combination of L1=34 mm and L2=10 mm, the combination of L1=39 mm and L2=15 mm, and the combination of L1=44 mm and L2=15 mm satisfying the desired condition. As shown in FIG. 64, in any case, the valley characteristic between the two sound absorption coefficient peaks is significantly suppressed as compared with Example 2, and no valley occurs. This indicates that the damping effect is improved by attaching the diaphragm 13 to both surfaces of the supporting member 14.

Figure 65:
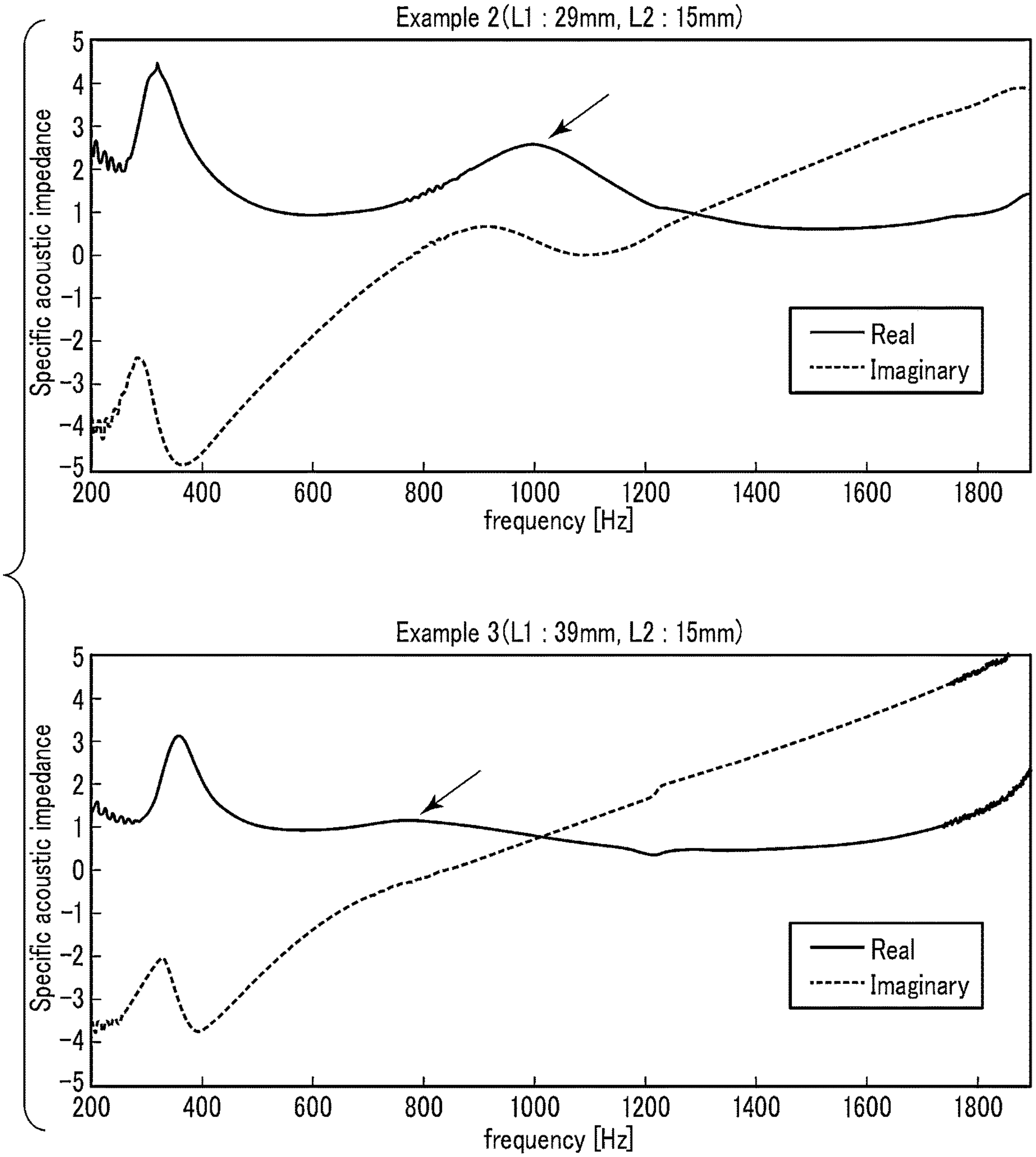
FIG. 65 is a diagram showing specific acoustic impedance in comparison between the sound absorption apparatus according to Example 2 and the sound absorption apparatus according to Example 3.

FIG. 65 shows specific acoustic impedance of the sound absorption apparatus 10 according to Example 2 and Example 3. It can be confirmed from FIG. 65 that the value of the real part of the specific acoustic impedance is smaller and the damping effect is more strongly produced in Example 3 than in Example 2.

For example, representative three of the above-described measurement results according to Example 3 are as follows.

In a case where L1=34 mm and L2=10 mm, the frequency bandwidth where the sound absorption coefficient is 0.8 or more is 445 Hz (680 Hz to 1125 Hz).

In a case where L1=39 mm and L2=15 mm, the frequency bandwidth where the sound absorption coefficient is 0.8 or more is 381 Hz (646 Hz to 1027 Hz).

In a case where L1=44 mm and L2=15 mm, the frequency bandwidth where the sound absorption coefficient is 0.8 or more is 364 Hz (594 Hz to 958 Hz).

In the sound absorption apparatus 10 according to Example 3, the sound absorption band is narrower than that of the sound absorption apparatus 10 according to Example 2, but no valley characteristic occurs, and high sound absorption characteristics can be obtained. Therefore, it was shown that the damping effect by the viscoelasticity of the diaphragm 13 was further improved by providing the diaphragm 13 on both sides of the supporting member 14.

From the above, Example 2 in which the diaphragm 13 is attached to one surface of the supporting member 14 is preferable from the viewpoint of widening the frequency band in which the sound absorption coefficient is 0.8 or more, and Example 3 in which the diaphragm 13 is attached to both surfaces of the supporting member 14 is preferable from the viewpoint of not generating a valley characteristic. It is assumed that the diaphragm 13 is attached to one side or both sides of the supporting member 14 depending on the purpose.

Example 4

Figure 66:
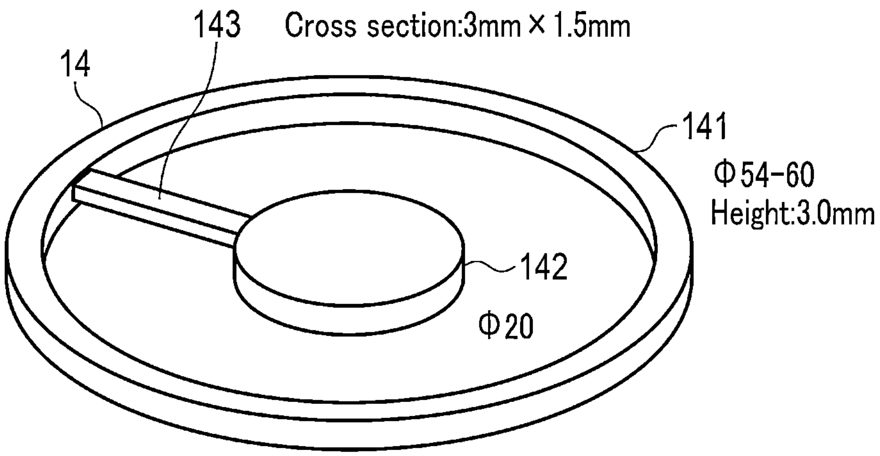
FIG. 66 is a perspective view showing a supporting member according to Example 4.

Example 4 relates to the second mode. In Example 4, the height of a connecting member 143 included in a supporting member 14 is made smaller than that in Example 2. The height of the connecting member 143 according to Example 2 is 2 mm, whereas the height of the connecting member 143 according to Example 4 is 1.5 mm as shown in FIG. 66. The supporting member 14 according to Example 4 has the same structure as that of the supporting member 14 according to Example 2 except for the height of the connecting member 143.

A change in the natural frequency of the second sound absorption characteristic due to the reduction in the height of the connecting member 143 is slight. As the stiffness of the connecting member 143 decreases, a boundary condition for the diaphragm support is relaxed, and the damping effect increases. This will be described below through measurement results.

Figure 67:
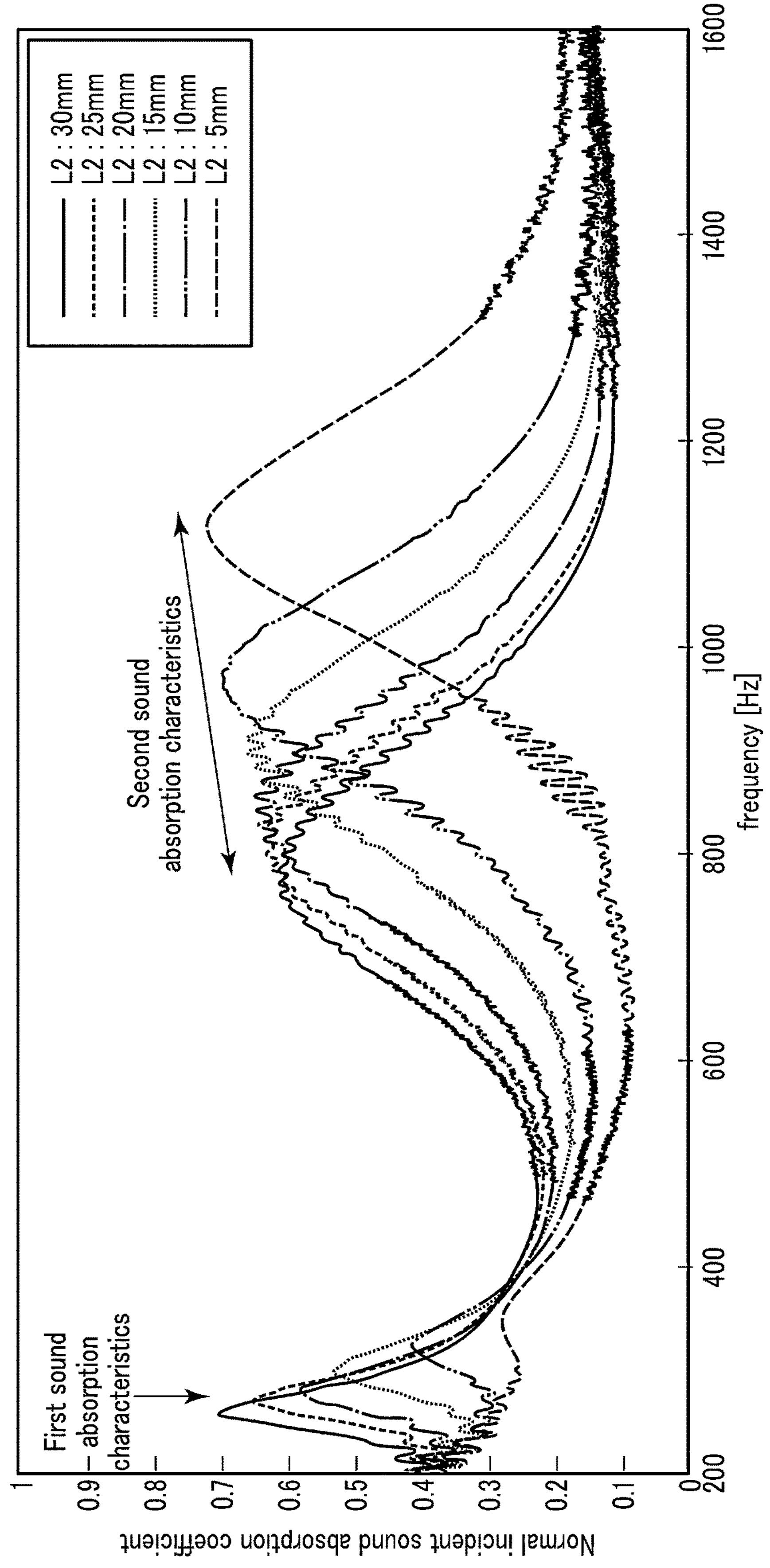
FIG. 67 is a graph showing results of measuring sound absorption characteristics of a combination of a diaphragm and the supporting member according to Example 4.

FIG. 67 shows results of measuring sound absorption characteristics of a combination of the diaphragm 13 and the supporting member 14. From FIG. 67, the first sound absorption characteristic and the second sound absorption characteristic can be confirmed. It can be confirmed from FIGS. 52 and 67 that the natural frequency of the second sound absorption characteristic is hardly changed as compared with Example 2. The natural frequency of the first sound absorption characteristic is lower than that in Example 2 in a case where the thickness L2 of the frame 15 where the effect of the air spring is reduced is 20 mm or more. This is because the connecting member 143 becomes soft (the stiffness of the connecting member 143 decreases). As a result, it is assumed that the boundary condition for the diaphragm support is relaxed and the damping effect is improved as compared with Example 2.

A candidate for a combination of the thickness L1 of the frame 12 and the thickness L2 of the frame 15 can be determined according to a guideline similar to that described in Example 2. In Example 4, after Procedure 1 described above is performed, combinations similar to those obtained in Example 2 are determined as candidates, since the natural frequency of the combination of the diaphragm 13 and the supporting member 14 hardly changes from that in Example 2.

Figure 68:
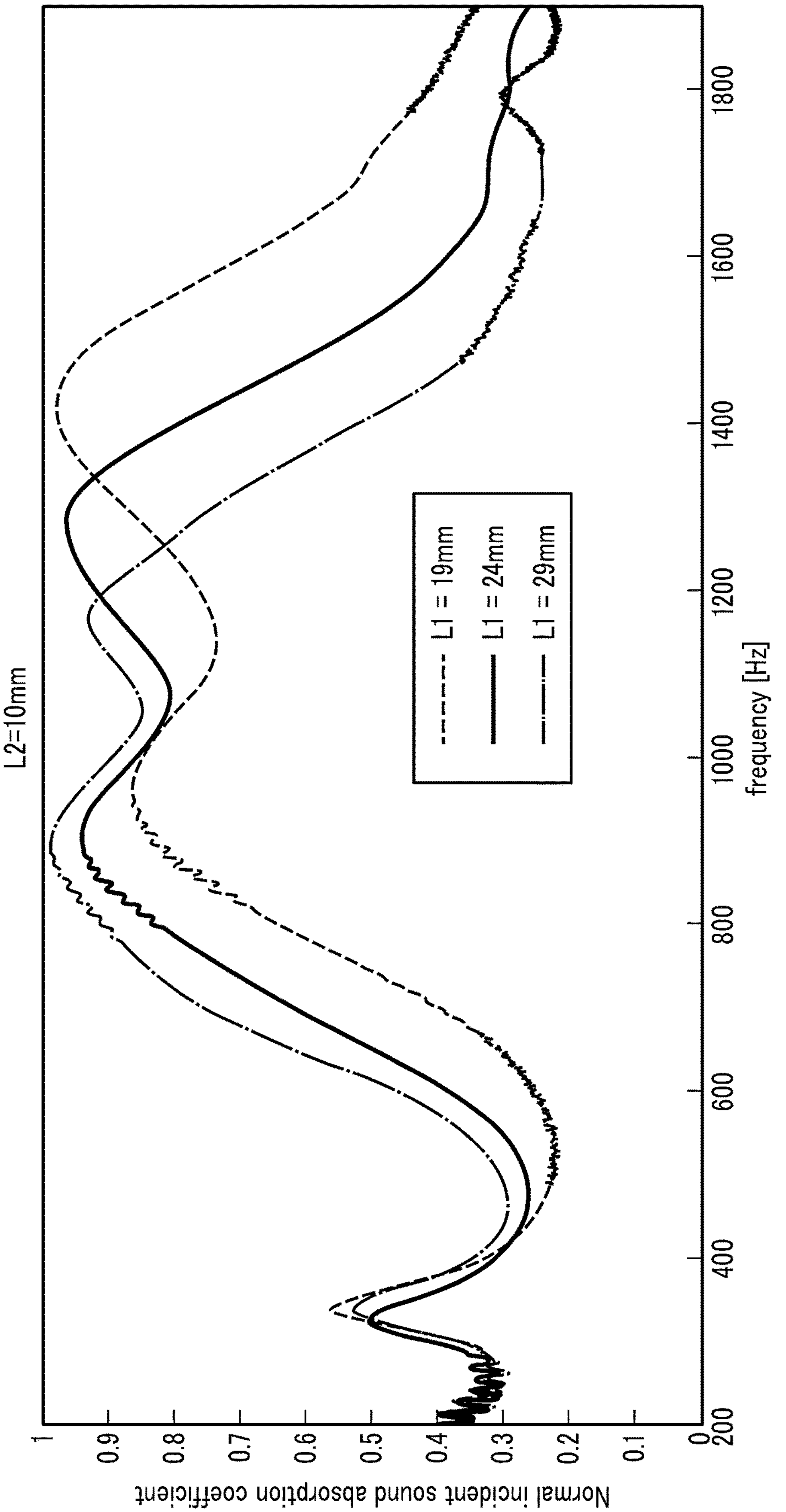
FIG. 68 is a graph showing results of measuring sound absorption characteristics of a sound absorption apparatus according to Example 4.

FIG. 68 shows results of measuring sound absorption characteristics of the sound absorption apparatus in a case where the thickness L2 of the frame 15 is 10 mm. As shown in FIG. 68, in a case where L2=10 mm, L1=24 mm satisfies the desired condition that two sound absorption coefficient peaks are approximately equal and the valley between the two sound absorption coefficient peaks is not deep. In a case where L2=10 mm and L1=24 mm, the band in which the sound absorption coefficient is 0.8 or more is from 790 Hz to 1403 Hz (range of 613 Hz).

Figure 69:
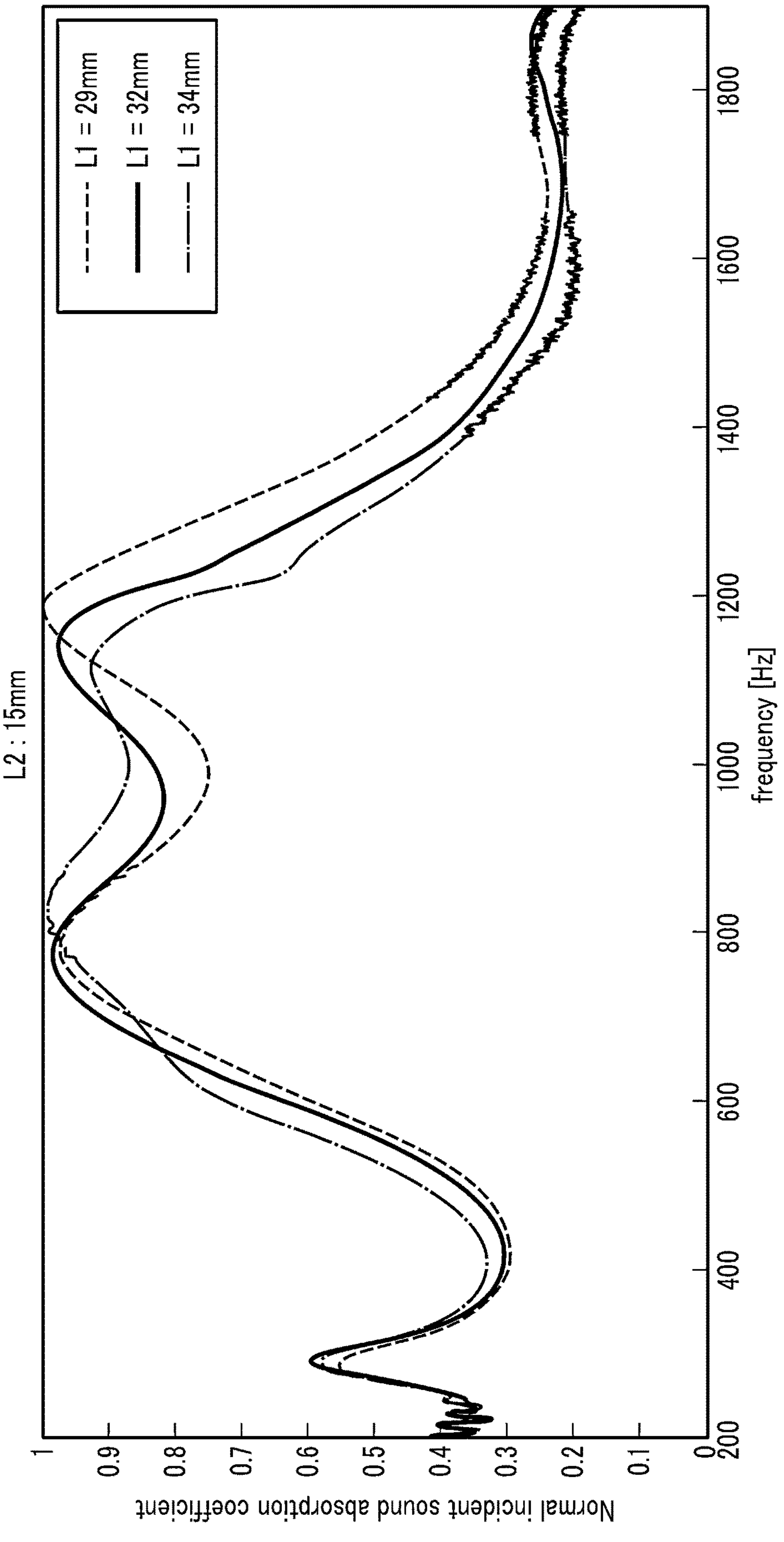
FIG. 69 is a graph showing results of measuring sound absorption characteristics of the sound absorption apparatus according to Example 4.

FIG. 69 shows results of measuring sound absorption characteristics of the sound absorption apparatus in a case where the thickness L2 of the frame 15 is 15 mm according to Example 4. As shown in FIG. 69, in a case where L2=15 mm, L1=32 mm satisfies the desired condition. In a case where L2=15 mm and L1=32 mm, the band in which the sound absorption coefficient is 0.8 or more is from 654 Hz to 1218 Hz (range of 564 Hz).

Figure 70:
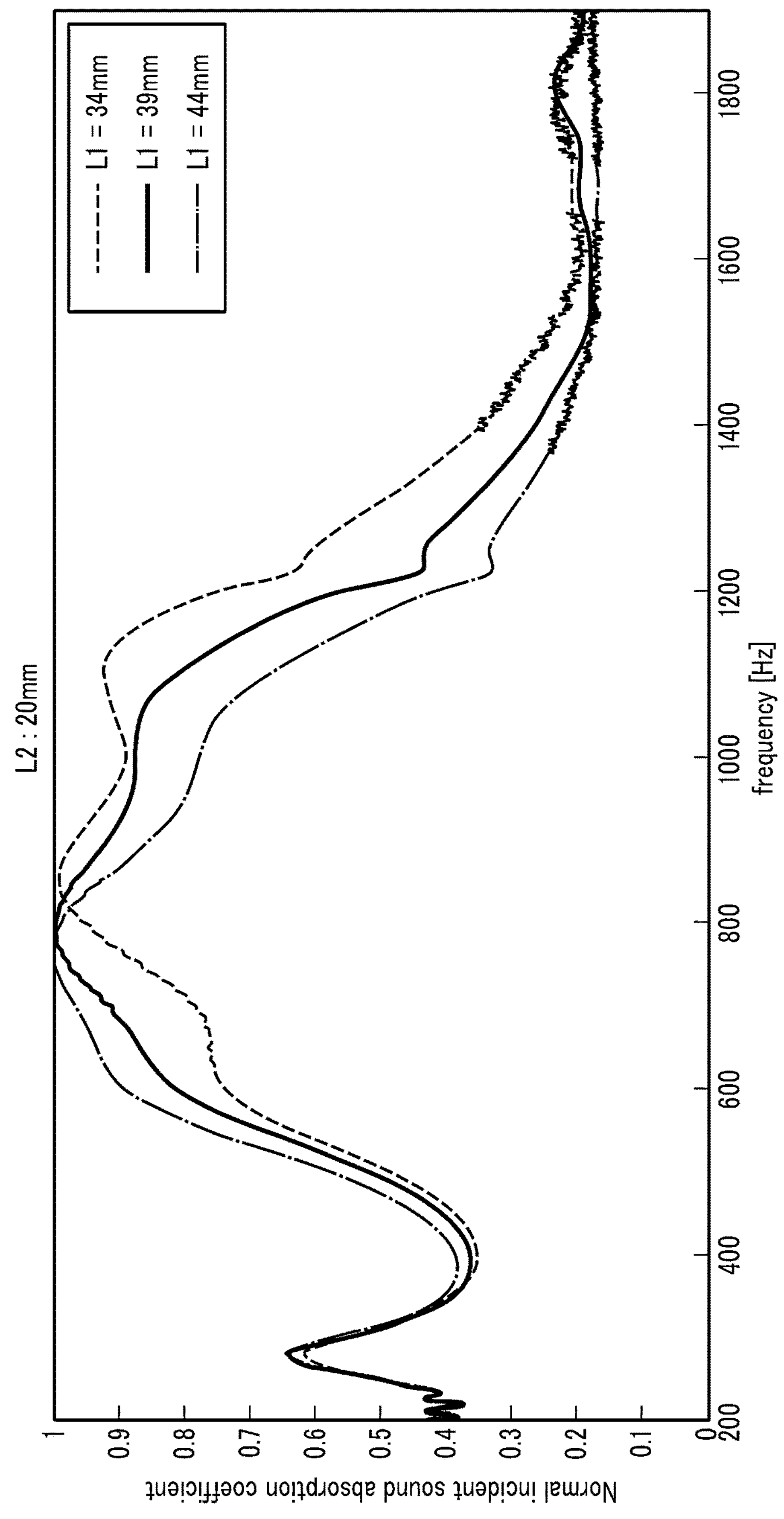
FIG. 70 is a graph showing results of measuring sound absorption characteristics of the sound absorption apparatus according to Example 4.

FIG. 70 shows results of measuring sound absorption characteristics of the sound absorption apparatus in a case where the thickness L2 of the frame 15 is 20 mm according to Example 4. As shown in FIG. 70, in a case where L2=20 mm, L1=39 mm satisfies the desired condition. In a case where L2=20 mm and L1=39 mm, the band in which the sound absorption coefficient is 0.8 or more is from 600 Hz to 1100 Hz (range of 500 Hz). In this case, a strong damping effect is produced, and no valley occurs.

Figure 71:
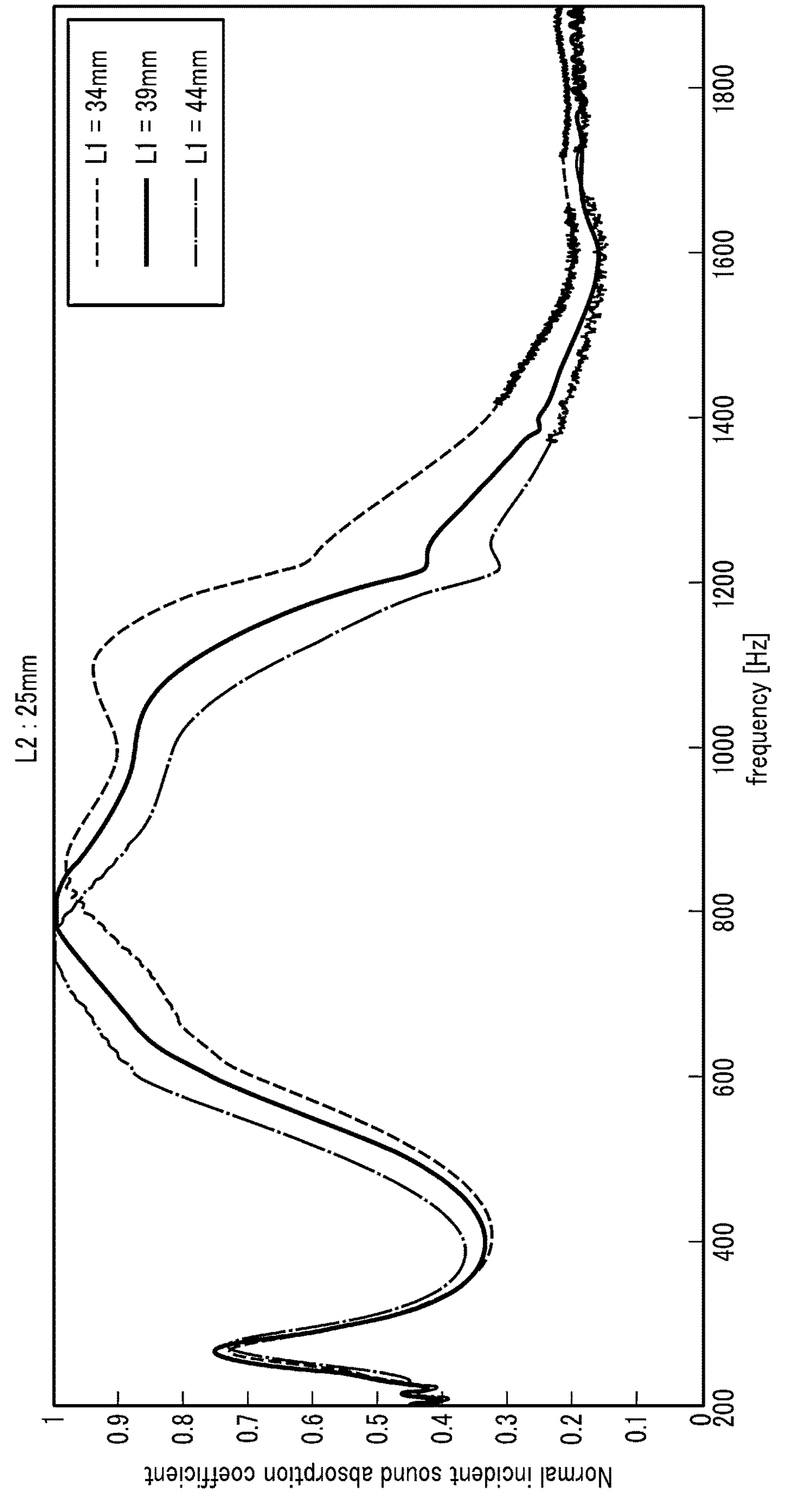
FIG. 71 is a graph showing results of measuring sound absorption characteristics of the sound absorption apparatus according to Example 4.

FIG. 71 shows results of measuring sound absorption characteristics of the sound absorption apparatus in a case where the thickness L2 of the frame 15 is 25 mm according to Example 4. As shown in FIG. 71, in a case where L2=25 mm, L1=39 mm satisfies the desired condition. In a case where L2=25 mm and L1=39 mm, the band in which the sound absorption coefficient is 0.8 or more is from 617 Hz to 1095 Hz (range of 478 Hz). In this case, a strong damping effect is produced, and no valley occurs.

Figure 72:
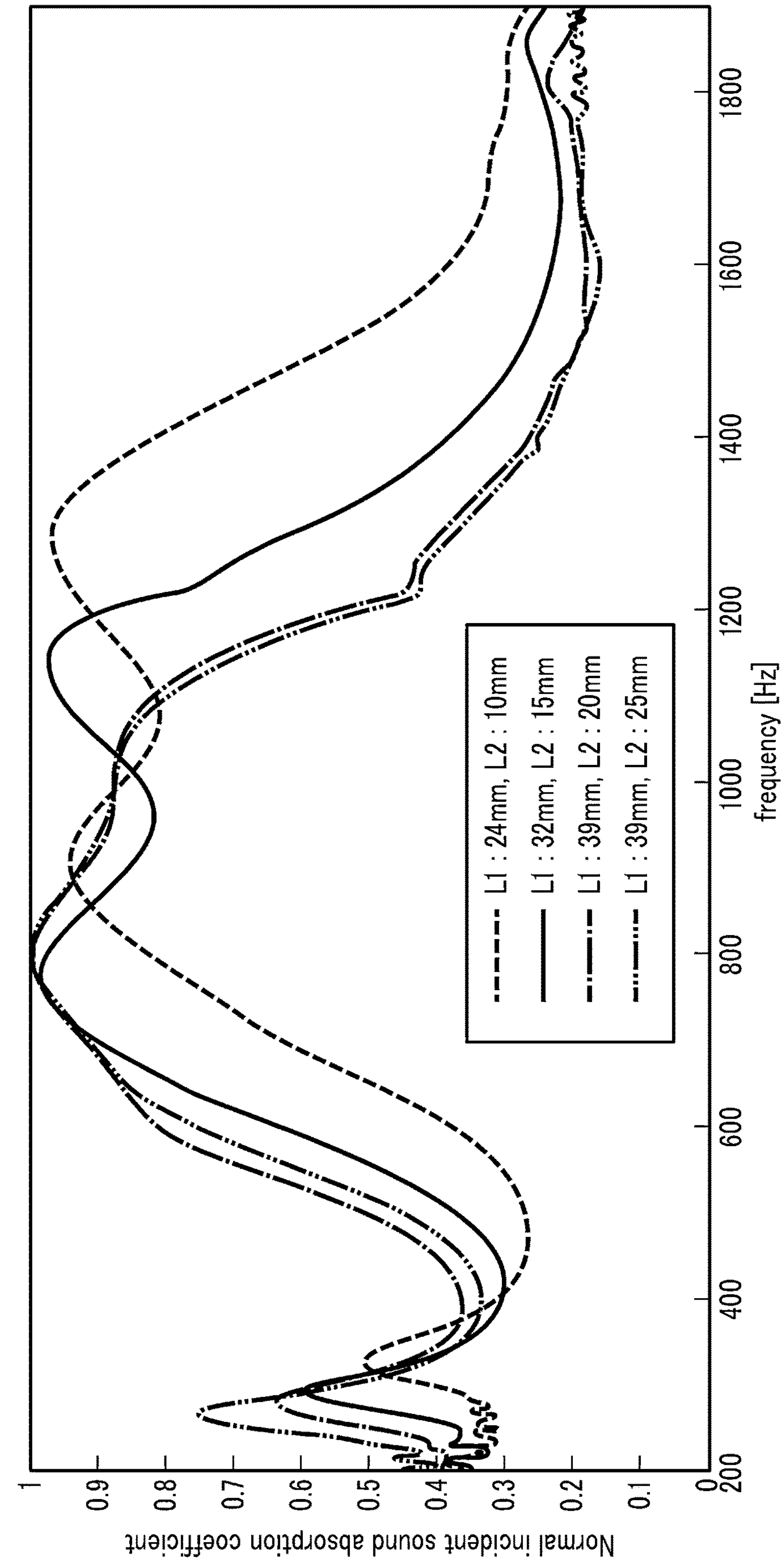
FIG. 72 is a graph showing results of measuring sound absorption characteristics of the sound absorption apparatus according to Example 4.

FIG. 72 shows results of measuring sound absorption characteristics of the sound absorption apparatus 10 for combinations of thicknesses L1 and thicknesses L2 satisfying the desired condition. The combinations of thicknesses L1 and thicknesses L2 satisfying the desired condition include a combination of L1=10 mm and L2=24 mm, a combination of L1=15 mm and L2=32 mm, a combination of L1=20 mm and L2=39 mm, and a combination of L1=25 mm and L2=39 mm.

Figure 73:
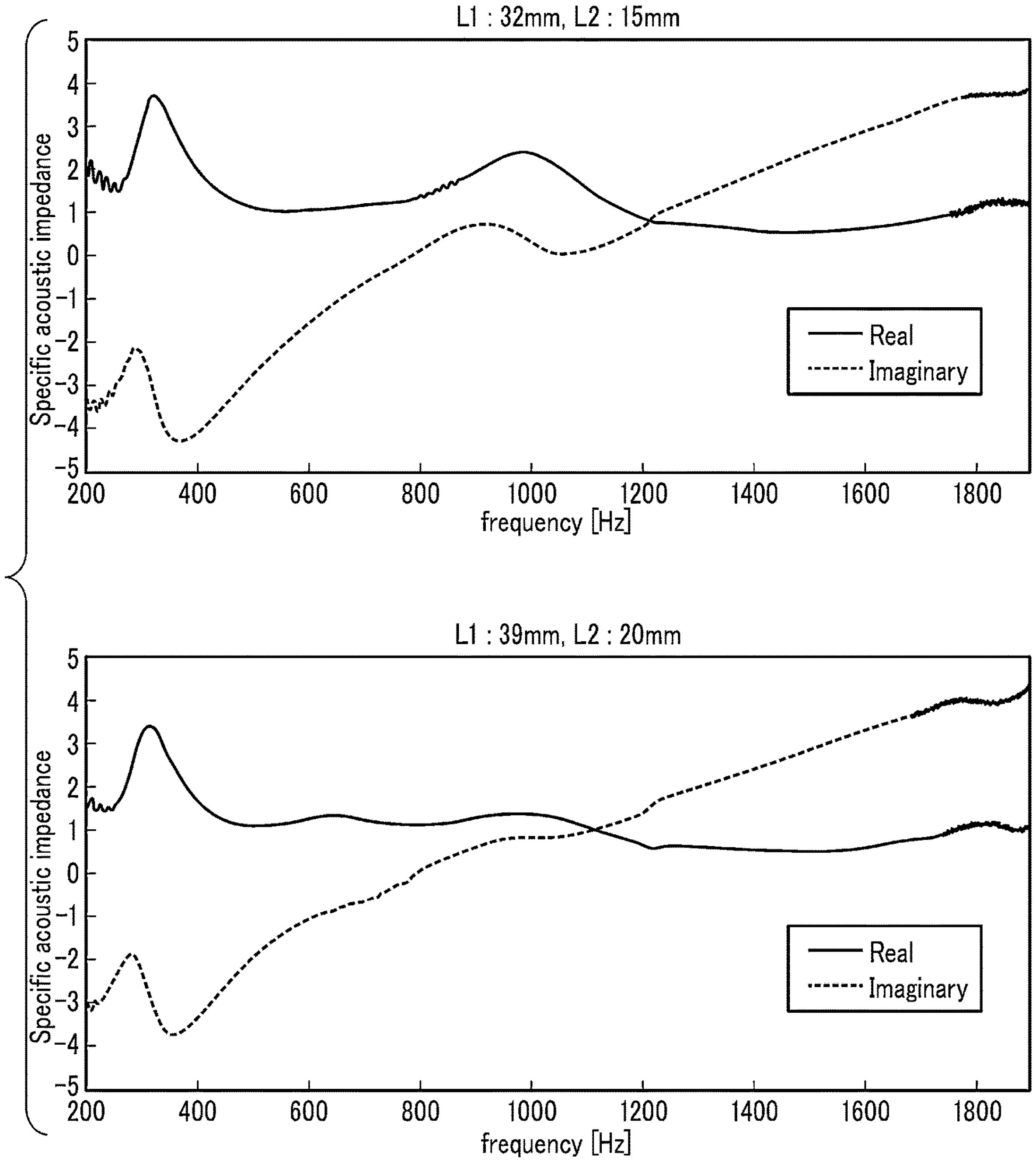
FIG. 73 is a diagram showing specific acoustic impedance of the sound absorption apparatus according to Example 4.

FIG. 73 shows specific acoustic impedance of the sound absorption apparatus 10 for the combination of L1=15 mm and L2=32 mm and the combination of L1=20 mm and L2=39 mm. It can be confirmed from FIG. 73 that the damping effect is more strongly produced in a case where the combination of L1=20 mm and L2=39 mm is used than that in a case where the combination of L1=15 mm and L2=32 mm is used.

As described above, in the sound absorption apparatus 10 according to Example 4, the stiffness of the connecting member 143 of the supporting member 14 is reduced as compared with the sound absorption apparatus 10 according to Example 2. The natural frequency of the first sound absorption characteristic of the combination of the diaphragm 13 and the supporting member 14 is lower than that in Example 2 under the condition that the thickness L2 of the frame 15 that causes a reduction in the effect of the air spring is 20 mm or more. This is because the connecting member 143 has the reduced height and becomes soft, thereby relaxing a part of the boundary condition for the diaphragm support. Since the second sound absorption characteristic of the combination of the diaphragm 13 and the supporting member 14 is brought about by the diaphragm vibration, its natural frequency hardly changes as compared with Example 2.

Representative three of the measurement results according to Example 4 are as follows.

In a case where L1=24 mm and L2=10 mm, the frequency bandwidth where the sound absorption coefficient is 0.8 or more is 613 Hz (790 Hz to 1403 Hz).

In a case where L1=32 mm and L2=15 mm, the frequency bandwidth where the sound absorption coefficient is 0.8 or more is 564 Hz (654 Hz to 1218 Hz).

In a case where L1=39 mm and L2=20 mm, the frequency bandwidth where the sound absorption coefficient is 0.8 or more is 500 Hz (600 Hz to 1100 Hz), and no valley characteristic occurs.

In a case where L2 is 15 mm or less, the sound absorption performance is substantially the same as that in Example 2. In a case where L2 is 20 mm or more, no valley characteristic occurs, and high sound absorption performance is obtained. In Example 3, the damping effect was improved by providing the diaphragm 13 on both surfaces of the supporting member 14, but it was confirmed that the damping effect could be improved by reducing the stiffness of the connecting member 143 as in Example 4.

As described in the above Examples, the sound absorption apparatus 10 according to the embodiment can absorb sound in a wide frequency band.

The shape of the sound absorption apparatus 10 viewed from the Y-axis direction is not limited to a circular shape, and may be a polygonal shape such as a quadrangle or a hexagon.

A representative dimension of the sound absorption apparatus 10 can be designed to be a length equal to or less than an upper limit wavelength λ at an applied frequency. Preferably, the representative dimension of the sound absorption apparatus 10 is designed to be a length of λ/4 or less. In addition, the sound absorption apparatus 10 is used as one unit, and a plurality of units are arranged side by side and used. In the honeycomb arrangement of hexagonal units and the grid arrangement of rectangular units, it is possible to more densely arrange the units than in the case of using circular units. As described above, a device in which acoustic devices are arranged side by side in a period equal to or less than the upper limit wavelength λ at the applied frequency is called an acoustic metamaterial. The sound absorption apparatus 10 is a part of the acoustic metamaterial.

Figure 74:
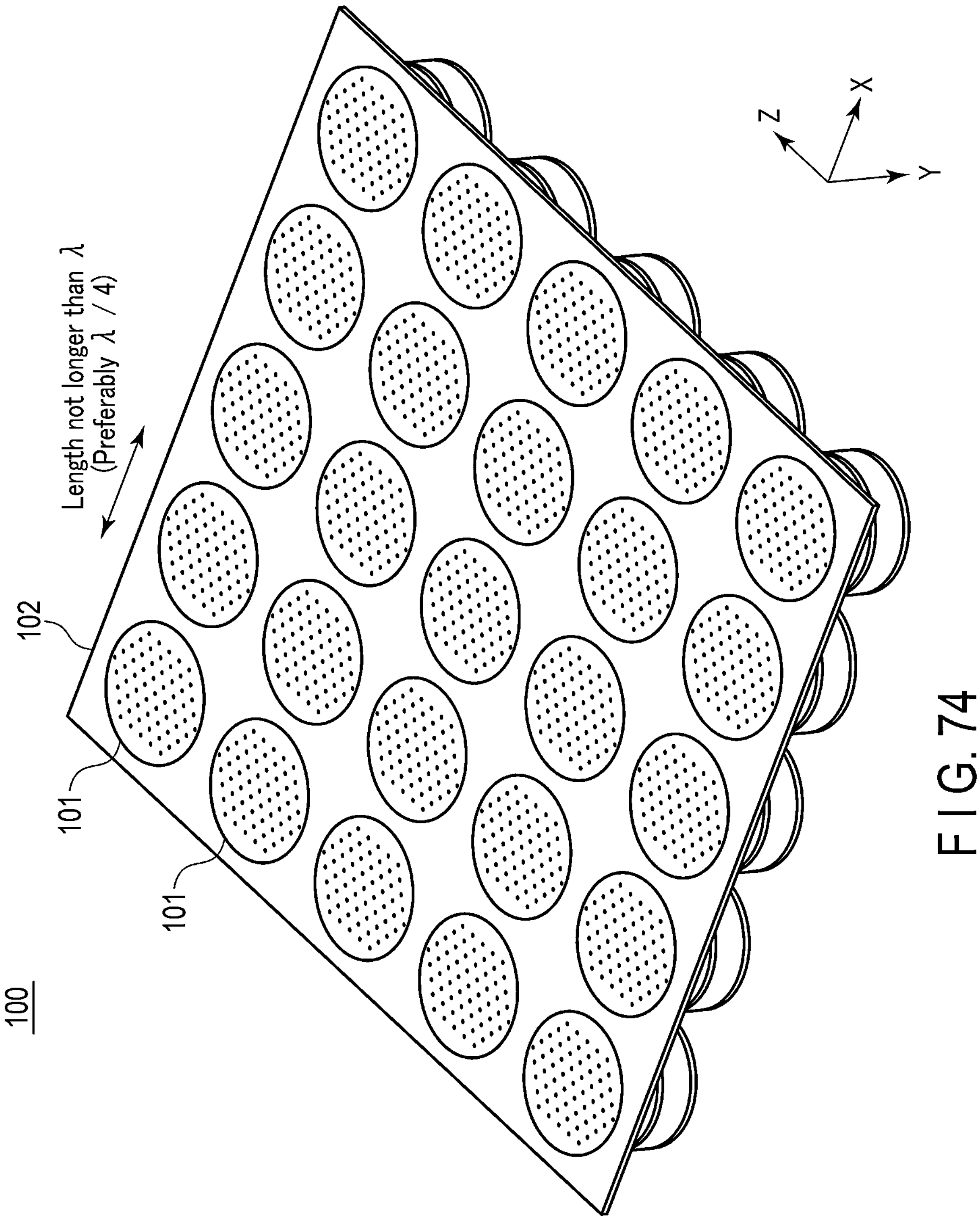
FIG. 74 is a perspective view showing a sound absorption apparatus according to an embodiment.
Figure 75:
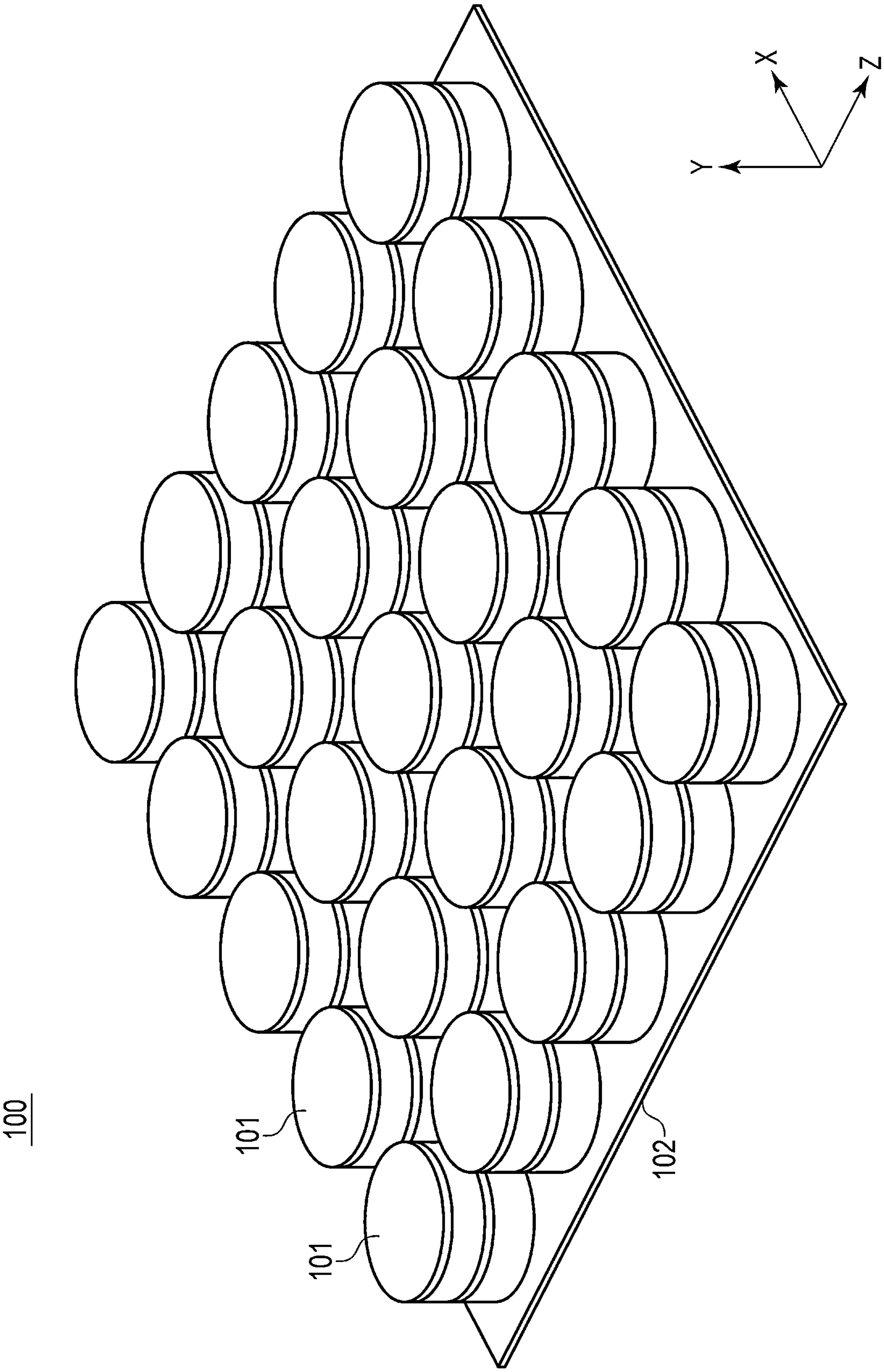
FIG. 75 is a perspective view showing the sound absorption apparatus according to the embodiment.

FIGS. 74 and 75 schematically show a sound absorption apparatus 100 as a part of the acoustic metamaterial according to an embodiment. As shown in FIGS. 74 and 75, the sound absorption apparatus 100 includes a plurality of sound absorption units 101 and a plate member 102. The sound absorption units 101 are arranged in a matrix and fixed to the plate member 102. As each of the sound absorption units 101, the sound absorption apparatus 10 shown in FIG. 1 is used. The diameter (maximum dimension in the XZ plane) of each of the sound absorption units 101 is designed to be less than or equal to λ, preferably λ/4.

Figure 76:
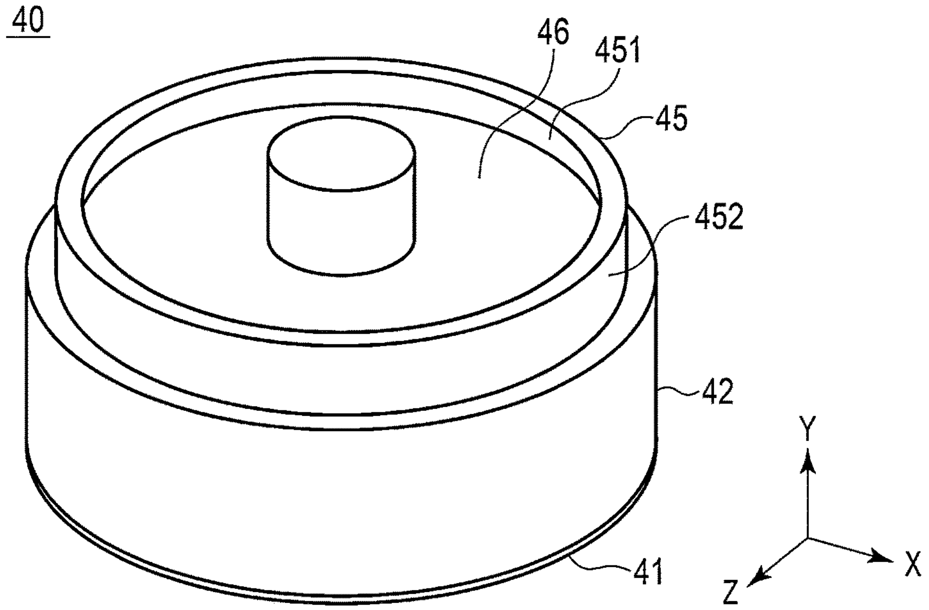
FIG. 76 is a perspective view showing a sound absorption apparatus according to an embodiment.
Figure 77:
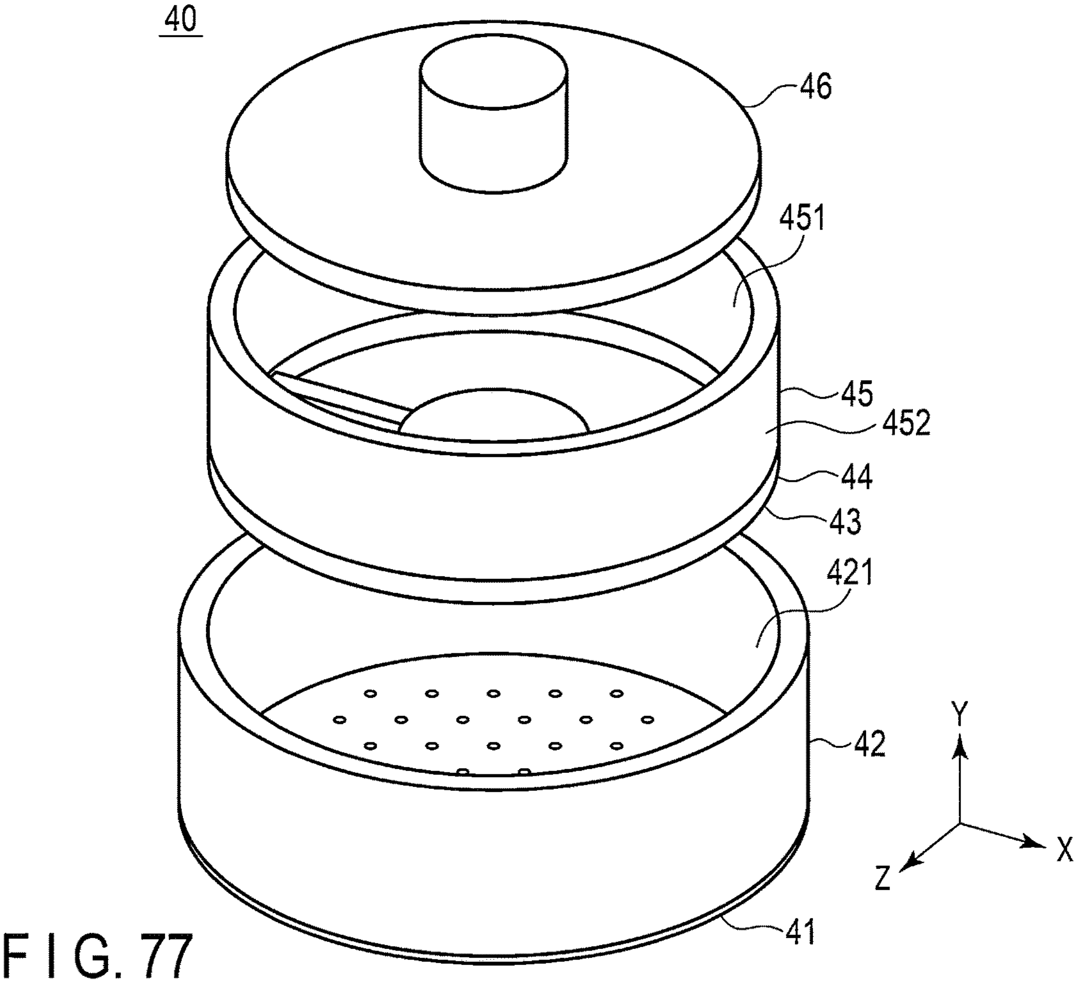
FIG. 77 is an exploded view showing the sound absorption apparatus according to the embodiment.

FIGS. 76 and 77 schematically show a sound absorption apparatus 40 according to an embodiment. Specifically, FIG. 76 shows an external appearance of the sound absorption apparatus 40, and FIG. 77 shows the sound absorption apparatus 40 in a disassembled state. As shown in FIGS. 76 and 77, the sound absorption apparatus 40 includes a front plate 41, a frame 42, a diaphragm 43, a supporting member 44, a frame 45, and a back plate 46. The front plate 41, the frame 42, the diaphragm 43, the supporting member 44, the frame 45, and the back plate 46 correspond to the front plate 11, the frame 12, the diaphragm 13, the supporting member 14, the frame 15, and the back plate 16 of the sound absorption apparatus 10 described above, respectively. Here, differences between the sound absorption apparatus 40 and the sound absorption apparatus 10 will be described, and description of the same points between the sound absorption apparatus 40 and the sound absorption apparatus 10 will be omitted.

The sound absorption apparatus 40 is configured to be able to adjust a distance between a combination of the diaphragm 43 and the supporting member 44 and the front plate 41 and a distance between the combination of the diaphragm 43 and the supporting member 44 and the back plate 46. An inner peripheral surface 451 of the frame 45 is internally threaded, a side surface 461 of the back plate 46 is externally threaded, and the back plate 46 is screwed into the frame 45. Turning the back plate 46 relative to the frame 45 changes the distance between the combination of the diaphragm 43 and the supporting member 44 and the back plate 46. Note that a projection may be provided on the back plate 46 in order to facilitate turning of the back plate 46. An outer peripheral surface 452 of the frame 45 is externally threaded, an inner peripheral surface 421 of the frame 42 is internally threaded, and the frame 45 is screwed into the frame 42. Turning the frame 45 relative to the frame 42 changes the distance between the combination of the diaphragm 43 and the supporting member 44 and the front plate 41.

Adjusting the distance between the combination of the diaphragm 43 and the supporting member 44 and the back plate 46 corresponds to changing the thickness L2 of the frame 15 described above, and adjusting the distance between the combination of the diaphragm 43 and the supporting member 44 and the front plate 41 corresponds to changing the thickness L1 of the frame 12 described above. Therefore, the sound absorption apparatus 40 can adjust sound absorption characteristics.

In a case where the degree of sealing is lowered due to gaps between the male screws and the female screws, the members may be cured with a tape, a sealing material, or the like after the distance adjustment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sound absorption apparatus comprising:
- a front plate comprising a sound hole;
- a back plate facing the front plate;
- a diaphragm provided between the front plate and the back plate;
- a supporting member configured to support the diaphragm, the supporting member including a first frame attached to the diaphragm, a first member located inside the first frame and attached to the diaphragm, and a connecting member connecting the first frame and the first member;
- a second frame configured to form a first space between the front plate and the diaphragm; and
- a third frame configured to form a second space between the back plate and the diaphragm, wherein
- the first frame of the supporting member is arranged between the second frame and the third frame, and
- a peripheral portion of the diaphragm is sandwiched between the first frame of the supporting member and the second frame or between the first frame of the supporting member and the third frame.

2. The sound absorption apparatus according to claim 1, wherein
- the connecting member is configured to support the first member so as to vibrate with respect to the first frame, and sound entering the first space through the sound hole is reduced by using a first sound absorption characteristic obtained by vibration of the diaphragm in accordance with vibration of the first member.

3. The sound absorption apparatus according to claim 2, wherein a mass of the first member is adjustable in order to adjust a natural frequency of the first sound absorption characteristic.

4. The sound absorption apparatus according to claim 1, wherein
- the first frame and the first member are attached to a first portion of the diaphragm, and
- sound that enters the first space through the sound hole is reduced by using a second sound absorption characteristic obtained by vibration of a second portion of the diaphragm different from the first portion.

5. The sound absorption apparatus according to claim 1, wherein the connecting member includes a linear beam member including a first end and a second end, the first end of the beam member is connected to the first frame, and the second end of the beam member is connected to the first member.

6. The sound absorption apparatus according to claim 1, wherein the connecting member includes a linear first beam member including a first end and a second end, an arc-shaped second beam member including a third end and a fourth end, and a linear third beam member including a fifth end and a sixth end, the first end of the first beam member is connected to the first frame, the second end of the first beam member is connected to the third end of the second beam member, the fifth end of the third beam member is connected to the fourth end of the second beam member, and the sixth end of the third beam member is connected to the first member.

7. The sound absorption apparatus according to claim 1, wherein the first member includes three or more members equidistant from each other and equidistant from a center of the supporting member.

8. The sound absorption apparatus according to claim 1, wherein the connecting member is attached to the diaphragm.

9. The sound absorption apparatus according to claim 1, wherein the supporting member has a first surface and a second surface opposite to the first surface, and the diaphragm includes a first diaphragm provided on the first surface side of the supporting member and a second diaphragm provided on the second surface side of the supporting member.

10. The sound absorption apparatus according to claim 1, wherein the first frame, the first member, and the connecting member are integrally molded.

11. The sound absorption apparatus according to claim 1, wherein the second frame and the third frame are configured to adjust a distance between a combination of the diaphragm and the supporting member and the front plate.

12. The sound absorption apparatus according to claim 1, wherein the third frame and the back plate are configured to adjust a distance between a combination of the diaphragm and the supporting member and the back plate.

13. The sound absorption apparatus according to claim 1, wherein the diaphragm is connected to the third frame via the first frame of the supporting member.

14. The sound absorption apparatus according to claim 1, wherein the diaphragm is connected to the second frame via the first frame of the supporting member.

* * * * *